United States Patent
Kusano

(10) Patent No.: US 9,766,780 B2
(45) Date of Patent: Sep. 19, 2017

(54) INFORMATION INPUT APPARATUS

(71) Applicants: SONY MOBILE COMMUNICATIONS INC., Tokyo (JP); Sony Corporation, Tokyo (JP)

(72) Inventor: Shunichi Kusano, Tokyo (JP)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 275 days.

(21) Appl. No.: 14/174,489

(22) Filed: Feb. 6, 2014

(65) Prior Publication Data
US 2014/0157126 A1 Jun. 5, 2014

Related U.S. Application Data

(63) Continuation of application No. 13/247,541, filed on Sep. 28, 2011, now Pat. No. 8,704,789.

(60) Provisional application No. 61/442,032, filed on Feb. 11, 2011.

(51) Int. Cl.
*G06F 3/0482* (2013.01)
*G06F 3/023* (2006.01)
*G06F 3/0488* (2013.01)

(52) U.S. Cl.
CPC .......... *G06F 3/0482* (2013.01); *G06F 3/0236* (2013.01); *G06F 3/0488* (2013.01)

(58) Field of Classification Search
CPC ..... G06F 3/0236; G06F 3/0488; G06F 3/0482

USPC ....... 345/156, 20, 173, 169, 172; 178/18.01, 178/18.06; 382/181, 185–189; 715/780, 715/863; 455/566, 556.2, 418
See application file for complete search history.

(56) References Cited

U.S. PATENT DOCUMENTS

| | | | |
|---|---|---|---|
| 5,790,820 A | 8/1998 | Vayda et al. | |
| 6,031,525 A * | 2/2000 | Perlin | G06F 3/04883 178/18.01 |
| 6,094,197 A | 7/2000 | Buxton et al. | |
| 6,925,611 B2 * | 8/2005 | SanGiovanni | G06F 3/0233 715/834 |
| 7,088,340 B2 * | 8/2006 | Kato | G06F 3/0236 345/168 |

(Continued)

FOREIGN PATENT DOCUMENTS

| | | |
|---|---|---|
| JP | 9-204426 | 8/1997 |
| JP | 2006-238171 | 9/2006 |

(Continued)

OTHER PUBLICATIONS

Extended European Search Report issued Jun. 13, 2012 in patent application No. 11191360.4.
(Continued)

*Primary Examiner* — Priyank Shah
(74) *Attorney, Agent, or Firm* — Oblon, McClelland, Maier & Neustadt, L.L.P.

(57) ABSTRACT

An information input apparatus including a user interface that detects a first input operation and a processor that assigns information to each of a plurality of directions from a position centered at the first input operation detected by the user interface. The user interface detects a second input operation corresponding to one of the plurality of directions, and the processor selects information assigned to the one of the plurality of directions as an input.

19 Claims, 44 Drawing Sheets

(56) References Cited

U.S. PATENT DOCUMENTS

| | | | |
|---|---|---|---|
| 7,461,355 B2* | 12/2008 | SanGiovanni | G06F 3/0233 715/786 |
| 7,895,536 B2* | 2/2011 | Fitzmaurice | G06F 3/0481 715/860 |
| 8,072,415 B2* | 12/2011 | Fukuhara | H04N 5/4403 341/20 |
| 2002/0101458 A1* | 8/2002 | SanGiovanni | G06F 3/0233 715/863 |
| 2004/0207601 A1* | 10/2004 | SanGiovanni | G06F 3/0233 345/156 |
| 2005/0099397 A1 | 5/2005 | Ono | |
| 2006/0095844 A1 | 5/2006 | Van Leeuwen | |
| 2008/0074399 A1* | 3/2008 | Lee | G06F 3/0482 345/173 |
| 2008/0098331 A1 | 4/2008 | Novick et al. | |
| 2009/0160809 A1* | 6/2009 | Yang | G06F 3/04845 345/173 |
| 2009/0262090 A1* | 10/2009 | Oh | G06F 3/04883 345/173 |
| 2009/0265664 A1* | 10/2009 | Shin | H04N 5/232 715/810 |
| 2009/0327963 A1* | 12/2009 | Mouilleseaux | G06F 3/04883 715/834 |
| 2009/0327964 A1* | 12/2009 | Mouilleseaux | G06F 3/0482 715/834 |
| 2010/0100849 A1 | 4/2010 | Fram | |
| 2010/0122194 A1 | 5/2010 | Rogers | |
| 2010/0238115 A1* | 9/2010 | Komaarashi | G06F 3/0488 345/168 |
| 2010/0299637 A1* | 11/2010 | Chmielewski | G06F 3/0482 715/834 |
| 2011/0063241 A1* | 3/2011 | Oh | G06F 3/0338 345/173 |
| 2011/0141027 A1 | 6/2011 | Ghassabian | |
| 2011/0199292 A1* | 8/2011 | Kilbride | G06F 3/017 345/156 |
| 2013/0033447 A1 | 2/2013 | Cho | |

FOREIGN PATENT DOCUMENTS

| | | |
|---|---|---|
| JP | 2010-224684 A | 10/2010 |
| WO | WO 03/098417 A2 | 11/2003 |

OTHER PUBLICATIONS

Combined Chinese Office Action and Search Report issued Mar. 25, 2014 in Patent Application No. 201110443413.3 (with English language translation).

Office Action issued Jan. 25, 2016 in Japanese Patent Application No. 2012-017345.

Notice of Reasons of Refusal issued Jul. 26, 2016 in Japanese Patent Application No. 2012-017345 (3 pages).

* cited by examiner

| INPUT EVENT | INPUT ID |
|---|---|
| TAP | 5 |
| UP-LEFT | 1 |
| UP | 2 |
| UP-RIGHT | 3 |
| LEFT | 4 |
| RIGHT | 6 |
| DOWN-LEFT | 7 |
| DOWN | 8 |
| DOWN-RIGHT | 9 |
| FAST DOWN | 0 |
| FAST LEFT | 11 |
| FAST RIGHT | 12 |

| INPUT ID | GROUP ID (ALPHABET) |
|---|---|
| 0 | UNASSIGNED (FOR APPLIED USE) |
| 1 | GROUP 1 |
| 2 | GROUP 2 |
| 3 | GROUP 3 |
| 4 | GROUP 4 |
| 5 | GROUP 5 |
| 6 | GROUP 6 |
| 7 | GROUP 7 |
| 8 | GROUP 8 |
| 9 | GROUP 9 |
| 11 | UNASSIGNED (FOR APPLIED USE) |
| 12 | UNASSIGNED (FOR APPLIED USE) |

FIG. 60

| INPUT ID | INTERNAL GROUP ID (ALPHABET) |
|---|---|
| 0 | UNASSIGNED (FOR APPLIED USE) |
| 1 | No. 1 |
| 2 | No. 2 |
| 3 | No. 3 |
| 4 | No. 4 |
| 5 | No. 5 |
| 6 | No. 6 |
| 7 | No. 7 |
| 8 | No. 8 |
| 9 | No. 9 |
| 11 | UNASSIGNED (FOR APPLIED USE) |
| 12 | UNASSIGNED (FOR APPLIED USE) |

FIG. 61

| ALPHABET (KEYPAD-RELATIVE) | INTERNAL GROUP ID (ALPHABET) | | | | | | | | |
|---|---|---|---|---|---|---|---|---|---|
| GROUP ID | No. 1 | No. 2 | No. 3 | No. 4 | No. 5 | No. 6 | No. 7 | No. 8 | No. 9 |
| GROUP 1 |  | . |  | _ |  | @ |  | - |  |
| GROUP 2 |  | a |  |  |  | b |  | c |  |
| GROUP 3 |  | d |  |  |  | e |  | f |  |
| GROUP 4 |  | g |  |  |  | h |  | i |  |
| GROUP 5 |  | j |  |  |  | k |  | l |  |
| GROUP 6 |  | m |  |  |  | n |  | o |  |
| GROUP 7 |  | p |  | s |  | q |  | r |  |
| GROUP 8 |  | t |  |  |  | u |  | v |  |
| GROUP 9 |  | w |  | z |  | x |  | y |  |

FIG. 62

| ALPHABET (4 GROUP-RELATIVE) | INTERNAL GROUP ID (ALPHABET) | | | | | | | | |
|---|---|---|---|---|---|---|---|---|---|
| GROUP ID | No. 1 | No. 2 | No. 3 | No. 4 | No. 5 | No. 6 | No. 7 | No. 8 | No. 9 |
| GROUP 1 | | | | | | | | | |
| GROUP 2 | e | | a | f | | b | g | d | c |
| GROUP 3 | | | | | | | | | |
| GROUP 4 | x | | v | y | | | z | | w |
| GROUP 5 | | | | | | | | | |
| GROUP 6 | l | | h | m | | i | n | k | j |
| GROUP 7 | | | | | | | | | |
| GROUP 8 | s | | o | t | | p | u | r | q |
| GROUP 9 | | | | | | | | | |

FIG. 63

| ALPHABET (WORD-RELATIVE) | INTERNAL GROUP ID (ALPHABET) | | | | | | | | |
|---|---|---|---|---|---|---|---|---|---|
| GROUP ID | No. 1 | No. 2 | No. 3 | No. 4 | No. 5 | No. 6 | No. 7 | No. 8 | No. 9 |
| GROUP 1 | | b | | g | | a | | n | |
| GROUP 2 | | c | | p | | h | | i | |
| GROUP 3 | | d | | k | | e | | s | |
| GROUP 4 | | f | | m | | r | | o | |
| GROUP 5 | | | | | | | | | |
| GROUP 6 | | j | | y | | u | | l | |
| GROUP 7 | | w | | e | | a | | v | |
| GROUP 8 | | t | | i | | a | | x | |
| GROUP 9 | | q | | z | | u | | i | |

FIG. 64

| INPUT ID | CONSONANT ID |
|---|---|
| 0 | w |
| 1 | a |
| 2 | k |
| 3 | s |
| 4 | t |
| 5 | n |
| 6 | h |
| 7 | m |
| 8 | y |
| 9 | r |
| 11 | APPLIED USE (SMALL CHARACTER CONVERSION) |
| 12 | APPLIED USE (DAKUTEN CONVERSION) |

FIG. 65

| INPUT ID | VOWEL ID |
|---|---|
| 0 | |
| 1 | |
| 2 | a |
| 3 | i |
| 4 | SMALL ya, yu, yo CONVERSION |
| 5 | |
| 6 | u |
| 7 | |
| 8 | o |
| 9 | e |
| 11 | |
| 12 | |

FIG. 66

| CONSONANT ID | VOWEL ID | | | | |
|---|---|---|---|---|---|
| | a | i | u | e | o |
| a | a | i | u | e | o |
| k | ka | ki | ku | ke | ko |
| s | sa | shi | su | se | so |
| t | ta | chi | tsu | te | to |
| n | na | ni | nu | ne | no |
| h | ha | hi | fu | he | ho |
| m | ma | mi | mu | me | mo |
| y | ya | | yu | | yo |
| r | ra | ri | ru | re | ro |
| w | wa | | wo | | n |

FIG. 67

| INPUT ID | NUMERAL |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 11 | * |
| 12 | # |

FIG. 68

| INPUT ID | GROUP ID (MENU) |
|---|---|
| 0 | UNASSIGNED (FOR APPLIED USE) |
| 1 | UNASSIGNED (FOR APPLIED USE) |
| 2 | GROUP 2 |
| 3 | UNASSIGNED (FOR APPLIED USE) |
| 4 | GROUP 4 |
| 5 | UNASSIGNED (FOR APPLIED USE) |
| 6 | GROUP 6 |
| 7 | UNASSIGNED (FOR APPLIED USE) |
| 8 | GROUP 8 |
| 9 | UNASSIGNED (FOR APPLIED USE) |
| 11 | UNASSIGNED (FOR APPLIED USE) |
| 12 | UNASSIGNED (FOR APPLIED USE) |

FIG. 69

| INPUT ID | INTERNAL GROUP ID (MENU) |
|---|---|
| 0 | UNASSIGNED (FOR APPLIED USE) |
| 1 | No. 1 |
| 2 | No. 2 |
| 3 | No. 3 |
| 4 | No. 4 |
| 5 | No. 5 |
| 6 | No. 6 |
| 7 | No. 7 |
| 8 | No. 8 |
| 9 | No. 9 |
| 11 | UNASSIGNED (FOR APPLIED USE) |
| 12 | UNASSIGNED (FOR APPLIED USE) |

FIG. 70

| ID→MENU | INTERNAL GROUP ID (MENU) | | | | | | | | |
|---|---|---|---|---|---|---|---|---|---|
| GROUP ID | No. 1 | No. 2 | No. 3 | No. 4 | No. 5 | No. 6 | No. 7 | No. 8 | No. 9 |
| GROUP 1 | | PLAY | | PAUSE | | OFF | | STOP | |
| GROUP 2 | | | | | | | | | |
| GROUP 3 | | | | | | | | | |
| GROUP 4 | | PLAY FIRST | | PLAY FROM BEGINNING | | SKIP | | RANDOM | |
| GROUP 5 | | | | | | | | | |
| GROUP 6 | | FRAME STEP BACK | | REWIND | | FAST FORWARD | | FRAME STEP FORWARD | |
| GROUP 7 | | AUTO | | LOW | | HIGH | | | |
| GROUP 8 | | | | | | | | MUTE | |
| GROUP 9 | | | | | | | | | |

INFORMATION INPUT APPARATUS

CROSS REFERENCE TO RELATED APPLICATION

This application is a continuation of and is based upon and claims the benefit of priority Under 35 U.S.C. §120 for U.S. Ser. No. 13/247,541, filed Sep. 28, 2011 and claims the benefit of priority of Provisional Application Ser. No. 61/442,032, filed Feb. 11, 2011, the entire contents of which are incorporated herein by reference.

BACKGROUND

1. Field of the Disclosure

The present disclosure relates to an information input apparatus provided with what is called a touchscreen, and configured to enable input of various information such as text characters, for example, by user operations on the touchscreen.

2. Description of Related Art

In the case of a conventional keypad-type character input method implemented in mobile phone devices, the 26 characters of the alphabet and several other symbols are severally grouped under respective numerals, with one key being assigned to each of these groups, for example.

With the keypad-type character input method, as a first step, the user first presses a key assigned to the group to which belongs the character, etc. that he or she wants to input. Next, as a second step, if the user repeatedly presses that key, the characters, etc. in the group assigned to the key are switched in order and become selectable according to the number of key presses. Then, as a third step, the user stops pressing the key when the switched in, selectable character has become the desired character. In so doing, input of a desired alphabetic character or a desired symbol becomes possible.

In the case of this character input method, multiple key press operations become necessary in order to select a character the user wants to input, and the user must conduct the vexing work of repeated key press operations.

For this reason, a character input method enabling input of single characters by single key operation actions is proposed in Japanese Unexamined Patent Application Publication No. 2006-238171 (Patent Citation 1), for example.

In the case of the character input method disclosed in the above patent application publication, the 26 characters of the alphabet and several other symbols, for example, are severally grouped under respective numerals, with one key being assigned to each of these groups, similarly to the conventional keypad-type character input method.

Then, with a character input sequence for this character input method, as a first step, the user first presses a key assigned to a group to which belongs the character, etc. that he or she wants to input. Next, as a second step, if the user keeps holding down that key, the characters, etc. in the group assigned to the key are switched in order at a fixed time interval and become selectable according to the amount of time the key is continuously held down. The user stops pressing the key and removes his or her finger, etc. from the key when the desired character is reached. In so doing, input of a desired alphabetic character or a desired symbol becomes possible.

In so doing, input of a desired alphabetic character or a desired symbol becomes possible.

Meanwhile, in the case where Japanese characters are input with the character input method disclosed in the above patent application publication, the respective characters in an individual "column" under an individual "row" of the gojuon syllabary are formed into a single group, with one key being assigned to each "row". Then, in a first step, the user presses a key assigned to a group of the "row" to which belong the character, etc. that he or she wants to input. Next, as a second step, if the user keeps holding down that key, the characters in each "column" in the "row" group assigned to the key are switched in order at a fixed time interval and become selectable according to the amount of time the key is continuously held down. The user stops pressing the key and removes his or her finger, etc. from the key when the desired character is reached. In so doing, a Japanese character is input.

SUMMARY OF THE DISCLOSURE

However, in the case of the character input method disclosed in the patent application publication described above, there is a problem in that it forces input work that is dependent on timings set in the character input apparatus, regardless of the user's intentions.

In other words, in the case where the character, etc. that the user wants to input is positioned lower in the order in a given group, the user must keep pressing a key until the character in that group becomes selectable, and the user must wait a somewhat long amount of time until the desired character becomes selectable. Also, when the desired key has become selectable, the user is required to do the work of releasing his or her finger from the key in accordance with that timing. If the user misses the timing, then he or she must wait even more until the desired character becomes selectable again. Furthermore, the timing at which the desired character becomes selectable depends on its rank within the group. For this reason, the timing for holding down and then released a key differs for each character, and the user must pay careful attention to match the timing for inputting a desired character.

Meanwhile, in recent years there have appeared information terminals provided with a touch panel on top of a display panel, for example, instead of what is called a keypad. Such information terminals enable character input, etc. by operating the touch panel. It is also conceivable for the character input method disclosed in the above patent application publication to be implemented as a character input method for a mobile information device provided with such a touch panel. In other words, in this case, a plurality of virtual keys, etc. respectively corresponding to each group are displayed on a display provided with a touch panel, and after confirming from among the virtual keys the position of the virtual key for the group to which a desired character belongs, the user touches the area above that virtual key. Then, the user maintains the touch state with that virtual key until the desired character becomes selectable, and when he or she has visually confirmed that the desired character has become selectable, the user cancels the touch state (removes his or her finger). In this way, during character input, the user must wait a somewhat long amount of time until a desired character becomes selectable, and he or she must pay careful attention to match the timing for inputting a desired character similarly to that described above, even with an information device provided with a touch panel. Particularly, the burden becomes extremely large in the case of this example, since the user must confirm by sight both the position to be touched and the timing when to cancel the touch state.

Given the above, the Inventor is aware of the need for an information input apparatus able to greatly reduce the burden on the user when using a touch panel to input characters, etc. on an information input apparatus provided with a touch panel on top of a display panel, for example, whereby the work of visual confirmation by the user can be decreased, and the burden of timing matching when inputting is made to be mostly unnecessary.

Thus, an information input apparatus of an embodiment of the present disclosure includes a user interface configured to detect a first input operation; a processor configured to assign information to each of a plurality of directions from a position centered at the first input operation detected by the user interface, wherein the user interface is configured to detect a second input operation corresponding to one of the plurality of directions, and the processor is configured to select information assigned to the one of the plurality of directions as an input.

According to another exemplary embodiment, the disclosure is directed to a method of controlling a user interface of an information input apparatus, the method comprising: detecting, at a user interface of the information input apparatus, a first input operation by a user; assigning, by a processor of the information input apparatus, information to each of a plurality of directions from a position of the first input operation detected by the user interface; detecting, by the user interface, a second input operation by the user corresponding to one of the plurality of directions; and selecting, by the processor, information assigned to the one of the plurality of directions as an input. According to another exemplary embodiment, the disclosure is directed to a non-transitory computer-readable medium including computer program instructions, which when executed by an information input apparatus, cause the information input apparatus to perform a method, the method comprising: detecting a first input operation by a user; assigning information to each of a plurality of directions from a position of the first input operation detected by the user interface; detecting a second input operation by the user corresponding to one of the plurality of directions; and selecting information assigned to the one of the plurality of directions as an input.

In an embodiment of the present disclosure, the user can perform input operations at a desired position on a detection surface of an input operation unit.

Consequently, according to an embodiment of the present disclosure, in the case where, as an example, the user inputs characters, etc. using a touch panel in an information device provided with a touch panel, etc. on a display panel, the work of visual confirmation by the user becomes mostly unnecessary and also timing matching during input is unnecessary, thereby enabling information input with an extremely low burden.

BRIEF DESCRIPTION OF THE DRAWINGS

FIG. 60 is a diagram that illustrates a correspondence table between input IDs and IDs corresponding to English characters, etc. included in respective group IDs referenced from the correspondence table in FIG. 59 (internal group IDs) during an English character input mode.

FIG. 61 is a diagram that illustrates a correspondence table of correspondences between group IDs in FIG. 59 and respective internal group IDs in FIG. 60, as well as respective English characters belonging to each group ID's group in the case where the English character input mode is an English character keypad-relative input mode.

FIG. 62 is a diagram that illustrates a correspondence table of correspondences between group IDs in FIG. 59 and respective internal group IDs in FIG. 60, as well as respective English characters belonging to each group ID's group in the case where the English character input mode is an English character 4 group-relative input mode.

FIG. 63 is a diagram that illustrates a correspondence table of correspondences between group IDs in FIG. 59 and respective internal group IDs in FIG. 60, as well as respective English characters belonging to each group ID's group in the case where the English character input mode is an English word-relative input mode.

FIG. 64 is a diagram that illustrates a correspondence table between input IDs and respective consonants in a Japanese character input mode.

FIG. 65 is a diagram that illustrates a correspondence table between input IDs and respective vowels in a Japanese character input mode.

FIG. 66 is a diagram that illustrates a correspondence table between consonant IDs and vowel IDs during a Japanese character input mode.

FIG. 67 is a diagram that illustrates a correspondence table between input IDs and respective numerals in a numeral input mode.

FIG. 68 is a diagram that illustrates a correspondence table with the IDs of respective menu groups in the case where menu selection is conducted.

FIG. 69 is a diagram that illustrates a correspondence table between input IDs and IDs corresponding to menu items belonging to respective group IDs referenced from the correspondence table in FIG. 68 (internal group IDs) in the case where menu selection is conducted.

FIG. 70 is a diagram that illustrates a correspondence table that gives menu items during music playback as an example of the respective menu items corresponding to internal group IDs for menus illustrated in FIG. 69.

DESCRIPTION

Hereinafter, an embodiment of the present disclosure will be described with reference to the drawings.

(Schematic Configuration of Mobile Information Device)

Figure 1:
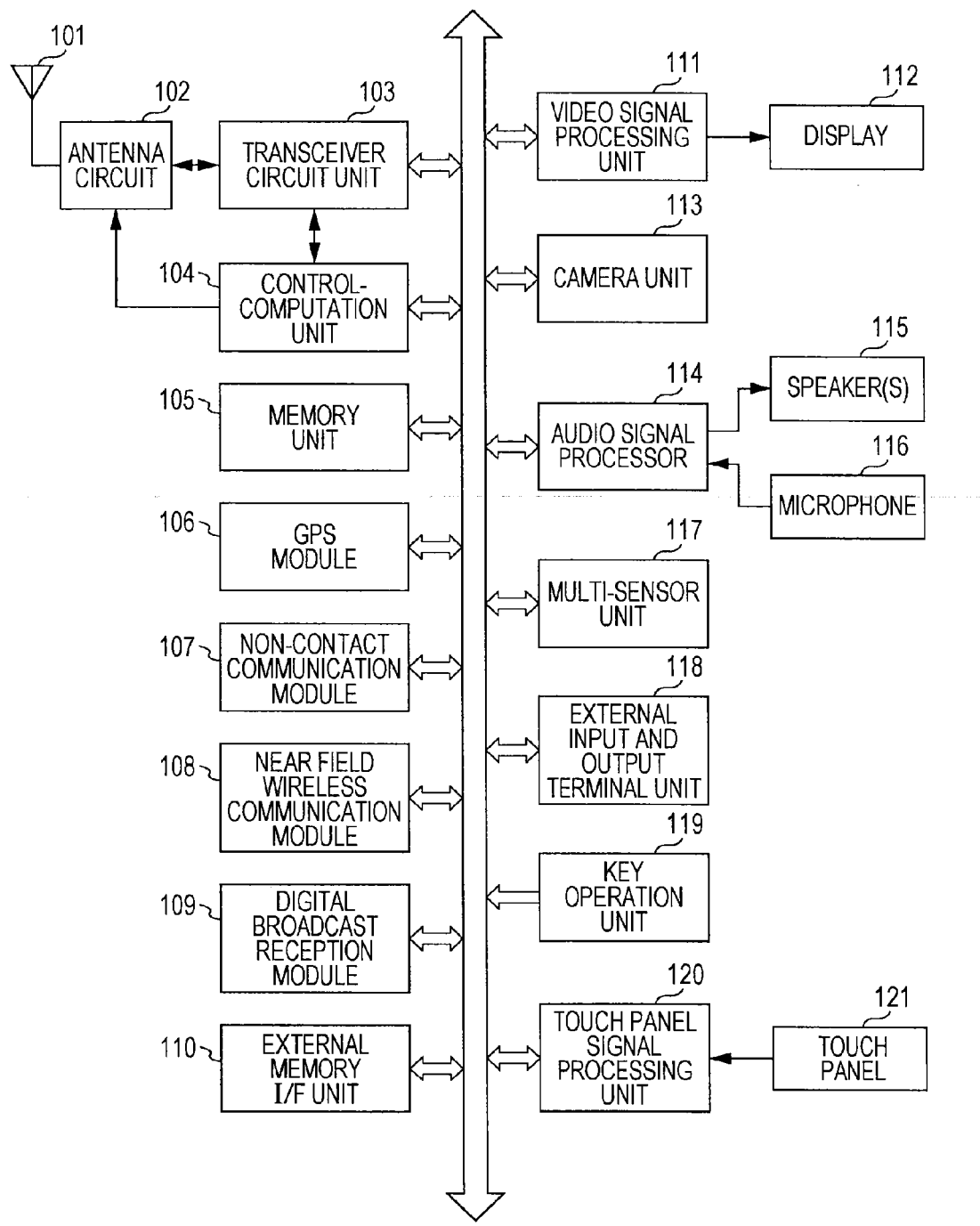
FIG. 1 is a block diagram that illustrates an exemplary schematic internal configuration of a mobile information device of an embodiment of the present disclosure.

FIG. 1 illustrates an exemplary schematic internal configuration of a mobile information device given as one example of an information input apparatus of the present embodiment. Herein, the mobile information device of the present embodiment comprises a smartphone, tablet device, etc. provided with a touch panel on top of a display panel, for example.

In FIG. 1, a communication antenna 101 is for example a built-in antenna, which transmits and receives telephony and email, downloads various application programs including an information input control program of the present embodiment, and transmits and receives signal waves for communicating on the Internet, etc. via a mobile network or public wireless communication network. An antenna circuit 102 comprises an antenna switcher, matching circuit, filter circuit, etc. while a transceiver circuit unit 103 conducts frequency conversion, modulation, demodulation, etc. of outgoing and incoming signals via a mobile phone network or public wireless communication network.

A speaker 115 is a speaker provided in the mobile information device of the present embodiment, and is used for music playback, incoming telephony output, ringer sounds (ringtones), etc. for example. A microphone 116 is used for external audio pickup and outgoing telephony audio pickup, etc. An audio signal processing unit 114 comprises an amplification circuit for the speaker 115, an amplification circuit for the microphone 116, a decompression decoding circuit that decompresses and decodes compressed and coded audio data supplied from a control-computation unit 104, a digital/analog conversion circuit that converts digital audio data after the decompression and decoding into an analog audio signal, an analog/digital conversion circuit that converts an analog audio signal input from the microphone 115 into digital audio data, and a compression coding circuit that compresses and encodes the digital audio data, etc.

A video signal processing unit 111 comprises a decompression decoding circuit that decompresses and decodes compressed and coded video data supplied from the control-computation unit 104, a display panel drive circuit that causes digital video after the decompression and decoding or digital broadcast video, etc. received at a digital broadcast reception module 109 later described to be displayed on a display panel 112. Also, in the case of the present embodiment, the video signal processing unit 111 also generates video signals for displaying desktop images, various menu images, virtual touch area images corresponding to positions on the touch panel, etc. supplied from the control-computation unit 104, and causes such images to be displayed on the display panel 112.

A key operation unit 119 comprises physical keys provided on the chassis of the mobile information device of the present embodiment and their peripheral circuits, etc. The key operation unit 119 converts physical key press operation input by the user into an electrical signal, amplifies and analog/digital converts the operation input signal, and sends the analog/digital converted operation input data to the control-computation unit 104.

An external input and output terminal unit 118 comprises one or more cable connection connectors for conducting data communication via a cable for example and an interface circuit for external data communication, a charge terminal for charging an internal battery via a power cable, etc. and an interface circuit for charging, etc. Various application programs including an information input control program of the present embodiment may also be acquired via the external input and output terminal unit 118.

Also, an external memory I/F unit 110 comprises a external memory slot into which a storage medium such as external memory is loaded and unloaded, an interface circuit for data communication with the external memory, etc. Various application programs including an information input control program of the present embodiment may also be acquired via a storage medium such as external memory loaded into the external memory I/F unit 110. Herein, the storage medium may also be a medium storing information such as an information input control application program for controlling later-described information input processes of a mobile information device of the present embodiment.

A near field wireless communication module 108 comprises a communication antenna for near field wireless radio waves such as wireless LAN or Bluetooth (registered trademark), and a near field wireless communication circuit. Various application programs including an information input program of the present embodiment may also be acquired via the near field wireless communication module 108.

A digital broadcast reception module 109 comprises an antenna and tuner for receiving what is called digital television broadcasts and digital radio broadcasts, etc. The digital broadcast reception module 109 does not only receive a digital broadcast on a single channel, but is made to be capable of receiving digital broadcasts on multiple channels simultaneously. In addition, the digital broadcast reception module 109 is also made to be capable of receiving data multiplexed into a digital broadcast. Herein, digital broadcast data received at the digital broadcast reception module 109 is also made to be capable of being stored in a memory unit 105, etc. (in other words recorded) after being compressed, etc. by the control-computation unit 104, for example. Also, various application programs including an information input control program of the present embodiment may also be broadcast as one part of the display broadcast data.

A camera unit 113 comprises an imaging element for shooting still images and moving images, optics, etc. and their peripheral circuits, as well as a drive circuit for a light for emitting shoot-assistive light. Still image data and moving image data during shooting by the camera unit 113 is sent to the video signal processing unit 111 as preview video data. In so doing, preview video is displayed on the display panel 112 during the camera shooting. Also, in the case of recording still image data or moving image data shot with the camera unit 113, the shot still image data or moving image data is sent to the control-computation unit 104 and compressed, and then stored in the memory unit 105 or in external memory connected to the external memory I/F unit 110.

A non-contact communication module 107 conducts non-contact communication via a non-contact communication antenna, which is used by for example what is called RFID (Radio Frequency-Identification) and non-contact type IC cards, etc.

A GPS (Global Positioning System) module 106 includes a GPS antenna, and uses a GPS signal from a GPS positioning satellite to compute the latitude and longitude of the current positions of the device itself. GPS data (information expressing latitude and longitude) acquired by the GPS module 106 is sent to the control-computation unit 104. In so doing, the control-computation unit 104 is able to ascertain the current position and movement of the device itself.

A multi-sensor unit 117 comprises various detection sensors such as device state sensors for detecting the state of a mobile information device 1 of the present embodiment, and their peripheral circuits. Tilt sensors, acceleration sensors, orientation sensors, temperature sensors, humidity sensors, illumination sensors, etc. can be given as examples of the multi-sensor unit 117. Detection signals from the multi-sensor unit 117 are sent to the control-computation unit 104. In so doing, the control-computation unit 104 is able to ascertain the state (tilt, acceleration, orientation, temperature, humidity, illumination, etc.) of the mobile information device 1.

A touch panel 121 is an input operation unit that includes a detection surface able to detect operation input by the user, and comprises a transparent touch sensor screen sensor distributed over the entire surface of the display panel 112. A touch panel signal processing unit 120 measures the touch detection position, touch trail, continuous touch time, touch time interval, etc. from the touch panel 121, and delivers the measured data to the control-computation unit 104 as touch detection data. Herein, the touch panel 121 and the touch panel signal processing unit 120 are compatible with what is called multi-touch.

The memory unit 105 comprises internal memory provided inside the device and removable card type memory. The removable card type memory may be a card, etc. storing what is called SIM (Subscriber Identity Module) information, etc. The internal memory comprises ROM (Read Only Memory) and RAM (Random Access Memory). The ROM stores an OS (Operating System), control programs whereby the control-computation unit 104 controls respective units, various default setting values, dictionary data, character prediction and conversion dictionary data, various sound data, various application programs including an information input control program of the present embodiment, etc. This ROM includes rewritable ROM such as NAND-type flash memory or EEPROM (Electrically Erasable Programmable Read-Only Memory), and is made to be capable of saving email data, phone book and email address book data, still image and moving image content data, other data, various user setting values, etc. The RAM is a work area when the control-computation unit 104 conducts various data processes, and stores data as needed as a buffer area.

The control-computation unit 104 comprises a CPU (Central Processing Unit), controls respective units such as the transceiver circuit unit 103, the video signal processing unit 111, the audio signal processing unit 114, the GPS module 106, the non-contact communication module 107, the near field wireless communication module 108, the digital broadcast reception module 109, the external memory I/F unit 110, the camera unit 113, the multi-sensor unit 117, the external input and output terminal unit 118, the key operation unit 119, and the touch panel signal processing unit 120, and conducts various computations as needed. Also, the control-computation unit 104 executes control programs stored in the memory unit 105 and various application programs including an information input control program of the present embodiment. Additionally, in the case of the present embodiment, by executing an information input control program, the control-computation unit 104 functions as an information assignment control unit that respectively assigns given information such as later-described characters to a plurality of directions on a touch panel surface approximately centered on a user-desired operation input position with respect to the panel surface. Also, in the case of the present embodiment, by executing an information input control program, the control-computation unit 104 functions as an information input control unit. When an operation input direction given by the user on the touch panel surface approximately matches one from the plurality of directions, the information input control unit inputs the given information assigned to the approximately matching direction as user-selected information. Herein, flows of operational control by the mobile information device 1 due to the control-computation unit 104 executing a control program or application program will be discussed later.

Otherwise, a mobile information device of the present embodiment obviously may be also provided with respective component elements typically provided in a mobile information device, such as a clock unit that measures the time and elapsed time, a battery that supplies power to each unit, and a power management IC that controls such power.

(Information Input Using a Touch Panel)

By using the touch panel, a mobile information device of the present embodiment is configured to enable character and other information input, menu operations, information input for phone book, etc. information searches, etc. as described hereinafter.

With an information input technique of the present embodiment, two gesture operations are used: a gesture operation wherein the user taps his or her finger, etc. on top of the touch panel (hereinafter designated a tap gesture); and a gesture operation wherein the user slides his or her finger, etc. that has contacted the top of the touch panel in a constant given direction while releasing the finger, etc. from the touch panel (hereinafter designated a flick gesture).

In an information input technique of the present embodiment, input character information is taken to be, for example, English characters, Japanese characters, numerals, symbols, etc. Also, an information input technique of the present embodiment is made to be not only applicable to the input of character information, but also to, for example, information input for menu selection, information input for searching an address book or phone book, etc. Hereinafter, an information input technique of the present embodiment will be described for English character input, Japanese character input, numeral input, information input for menu selection, and information input for searching an address book, etc., in that order.

(Exemplary English Character Input)

In the case of an information input technique of the present embodiment, English character input is made to be realizable by for example one tap gesture and two flick gestures per input of a single character, excluding some exceptions. Details will be discussed later, but in the present embodiment, English character input is conducted by selecting the group in which exists the character that the user wants to input with a first flick gesture after a tap gesture, and selecting a character included in the group selected by the previous flick gesture with a second flick gesture, for example.

FIGS. 2 to 17 illustrate a flow of screen transitions and gesture operations on a touch panel during the English character input. In the description hereinafter, an example is given wherein the user inputs desired English characters as a search keyword ("xmas", for example) during a web search. However, the present embodiment is obviously not limited to this example. Also, in the case of this example, the character input mode of a mobile information device of the present embodiment is taken to be set to an English character input mode.

Figure 2:
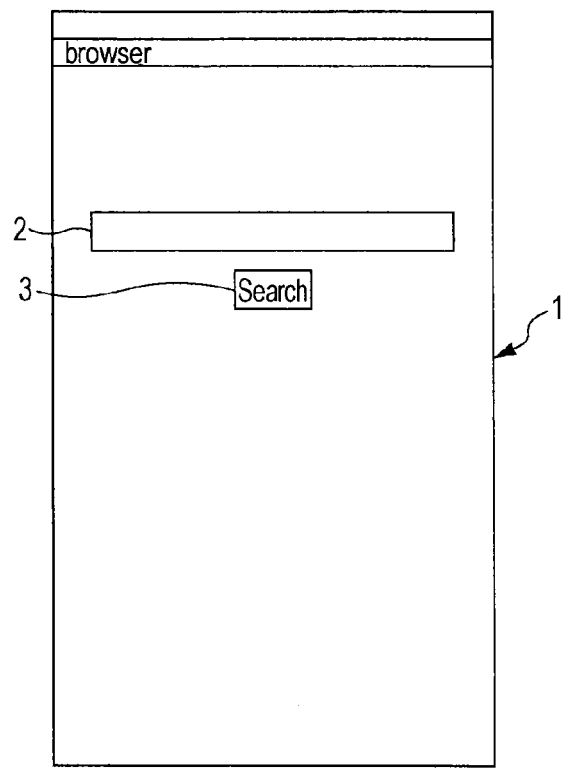
FIG. 2 is a diagram that illustrates an example wherein a mobile information device of the present embodiment is in a browser screen mode, and a browser screen with a text box and a search button disposed thereon is displayed on a display screen.

FIG. 2 illustrates an example wherein a mobile information device of the present embodiment is in a browser screen mode, and a browser screen with a text box 2 and a search button 3 disposed thereon is displayed on a display screen 1.

In this browser screen illustrated in FIG. 2, the text box 2 is an area prepared for the user to input the characters, etc. of a desired search keyword. The search button 3 is a virtual button for the user to input an instruction for initiating a web search using the search keyword after the user-desired search keyword characters have been input into the text box 2. Herein, the exemplary browser screen in FIG. 2 gives an example wherein a text box 2 and a search button 3 are disposed, but obviously other elements such as a variety of images, a link area for jumping to other websites and webpages, etc. may also be disposed. In other words, in the browser screen mode, in the case where for example the top of the touch panel corresponding to the link area, etc. is tapped, etc., by the user, a mobile information device will jump to the link destination embedded in that link area. As another example, in cases where the browser screen size is larger than the display screen size, the user may conduct a gesture of sliding his or her finger while in a state of contact with the touch panel (hereinafter designated a slide gesture) or a flick gesture, for example. In such cases, a mobile information device is also configured to enable scrolling the browser screen in the slide direction or flick direction given by those gestures.

Figure 3:
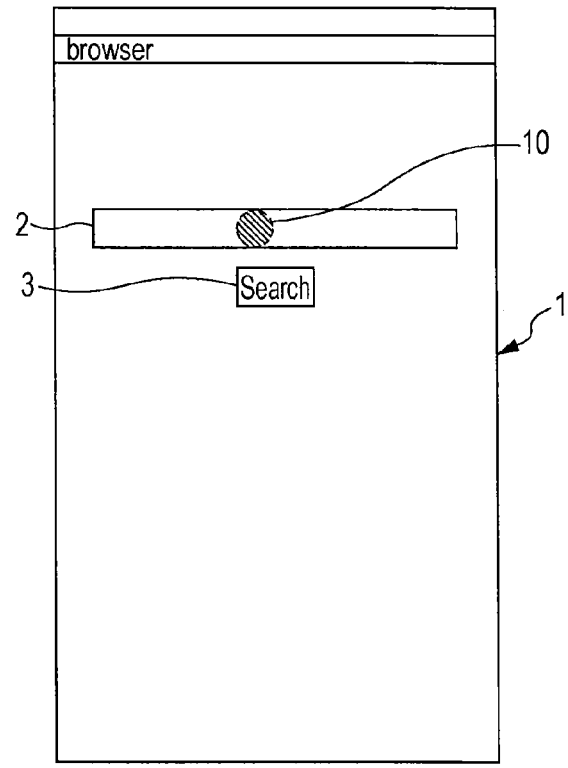
FIG. 3 is a diagram that illustrates a state wherein the user has tapped the area above a text box in browser screen mode.

In this browser screen illustrated in FIG. 2, if the user for example taps a touch panel position corresponding to the text box 2 as illustrated in FIG. 3, for example, then a mobile information device of the present embodiment will set the inside of the text box 2 to an active state, and transition to a state enabling character input of a search keyword, etc. In the example in FIG. 3, herein, during the tap gesture, a finger contact point 10 is drawn on the figure in order to easily visualize the position on the display screen (on the touch panel) contacted by the user's finger, etc. In the case of this example, a finger contact point 10 is not something that is for example displayed, etc. on the display screen, but it may displayed on the display screen to enable the user to recognize the finger contact position.

Figure 4:
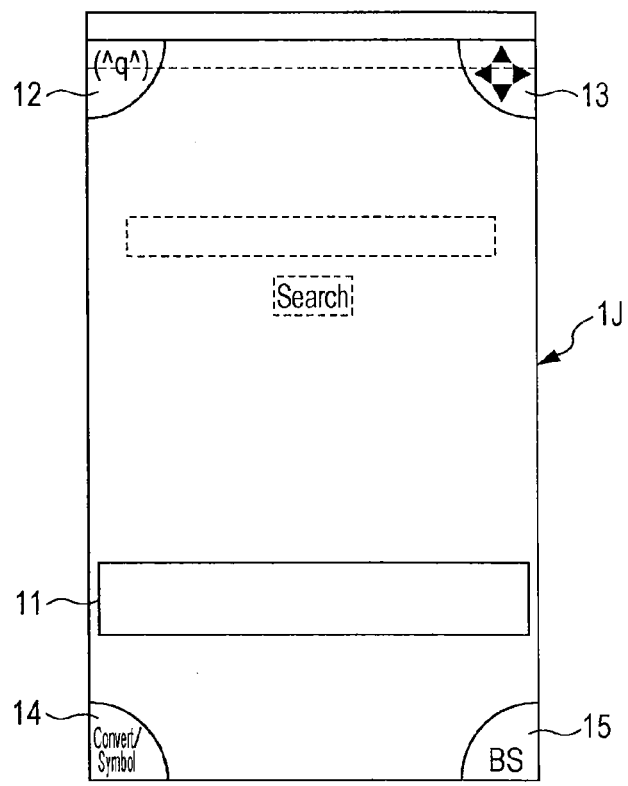
FIG. 4 is a diagram that illustrates an exemplary takeover mode screen when a mobile information device of the present embodiment enters a full screen takeover mode.

Also, as discussed earlier, if an area for character input such as the text box 2 enters an active state in response to a tap gesture, a mobile information device of the present embodiment causes the operational mode of the device itself to transition to a full screen takeover mode wherein approximately the entire screen of the touch panel is used for information input of characters, etc. At the same time, a mobile information device of the present embodiment causes the display of the display screen to transition to a takeover mode screen 1J as illustrated in FIG. 4 for example, in order to enable the user to recognize that the operational mode of the device itself has transitioned to a full screen takeover mode. Herein, a full screen takeover mode is a mode for preventing operations other than input operations during character input, menu selection, information search, etc. in the present embodiment. The full screen takeover mode is canceled when a physical key separately provided on a mobile information device of the present embodiment is pressed, or when an end input function is selected in the mode.

As illustrated in FIG. 4, the takeover mode screen 1J is made to be a screen wherein parameters such as the color, brightness, transparency, etc. of the browser screen illustrated in the above FIG. 2 are changed to dedicated full screen takeover mode parameters. Herein, in the case of the example in FIG. 4, the takeover mode screen 1J is made to be a screen wherein it appears that a semi-transparent image has been overlaid on top of the browser screen illustrated in the above FIG. 2.

Also, as illustrated in FIG. 4, the takeover mode screen 1J is provided with a current input text display area 11 disposed at a given position on the screen, and respective function areas 12 to 15 disposed at the four corners of the screen, for example.

In the present embodiment, the current input text display area 11 is made to be an area that enlarges and displays characters in the process of being input, a cursor, etc. Meanwhile, in the case where characters in the process of being input, a cursor, etc. are being displayed in the current input text display area 11, those characters in the process of being input, cursor, etc. are also displayed in the text box 2.

The respective function areas 12 to 15 are areas to which are assigned given functions used during the input of characters, etc.

In the case of the present embodiment, the function area 12 disposed at the upper-left corner of the screen is made to be, for example, an area instructed when inputting what are called face marks and other such special characters, etc. (hereinafter designated the special character instruction area 12 as appropriate). In the case where for example this special character instruction area 12 receives a tap gesture, etc., a mobile information device for example switches approximately the entire area of the touch panel to a special character selection takeover mode, and also displays a list of various special characters such as face marks, etc. on the screen. Also, when entering a special character selection takeover mode, a mobile information device is configured such that respective special characters in the list can be scrolled by slide gestures and flick gestures, for example, and is additionally configured such that a desired special character in the list can be selected by performing a tap gesture on that special character. Then, when a desired special character from the list is indicated by the user by means of a tap gesture, a mobile information device takes that special character as having been selected by the user, and inputs that special character into a character input area such as the text box 2.

The function area 13 disposed at the upper-right corner of the screen is made to be an area instructed when for example moving the cursor, etc. (hereinafter designated the cursor instruction area 13 as appropriate). In the case where for example the cursor instruction area 13 receives a tap gesture, etc., a mobile information device for example switches approximately the entire area of the touch panel to a cursor movement takeover mode. When entering the cursor movement takeover mode, a mobile information device for example causes cursor movement instruction marks, etc., which represent respective directions in which to move the cursor up, down, left, or right, to be displayed on the screen, and also switches the touch panel to input for moving the cursor. Then, when a desired cursor movement instruction mark from among the marks is indicated by for example a tap gesture, etc., a mobile information device moves the cursor in that direction on the screen.

The function area 14 disposed at the lower-left corner of the screen is made to be an area to which is assigned a convert/symbol selection function used when selecting various symbols used in character input or when conducting later-described kana-kanji conversion, etc. (hereinafter designated the convert/symbol instruction area 14 as appropriate). Herein, in cases such as when a character input mode is a later-described Japanese character input mode, a conversion function for Japanese kana-kanji conversion is assigned to the convert/symbol instruction area 14. In the case where the convert/symbol instruction area 14 for example receives a tap gesture, etc., a mobile information device for example switches approximately the entire area of the touch panel to a symbol selection takeover mode, and also displays a list of various symbols on the screen. Also, when entering a symbol selection takeover mode, a mobile information device is configured such that respective symbols in the list can be scrolled by slide gestures and flick gestures, for example, and is additionally configured such that a desired symbol in the list can be selected by performing a tap gesture on that symbol. Then, when a desired symbol from the list is indicated by the user by means of a tap gesture, a mobile information device takes that symbol as having been selected by the user, and inputs that symbol into a character input area such as the text box 2. Meanwhile, the kana-kanji conversion function of the convert/symbol instruction area 14 during a Japanese character input mode will be discussed later.

The function area 15 disposed at the lower-right corner of the screen is made to be for example an area instructed when inputting a backspace (hereinafter designated the backspace input area 15 as appropriate). When the backspace input area 15 is instructed by for example a tap gesture, etc., a mobile information device for example backs up the cursor in a character input area by one character, while also deleting that character.

Also, in the case of transitioning to the full screen takeover mode, a mobile information device temporarily suspends functions that where active during the browser screen mode, for example. In other words, in the case of transitioning to a full screen takeover mode, even if a position on the touch panel corresponding to a link area, etc. of the browser screen is tapped, etc., a mobile information device will not jump, etc. to the link destination given by the link area, and will instead maintain the full screen takeover mode. Similarly, in the case of transitioning to a full screen takeover mode, even if the user performs a slide gesture or flick gesture for the purpose of screen scrolling as described earlier, a mobile information device will not scroll the browser screen, and will instead maintain the full screen takeover mode.

Figure 5:
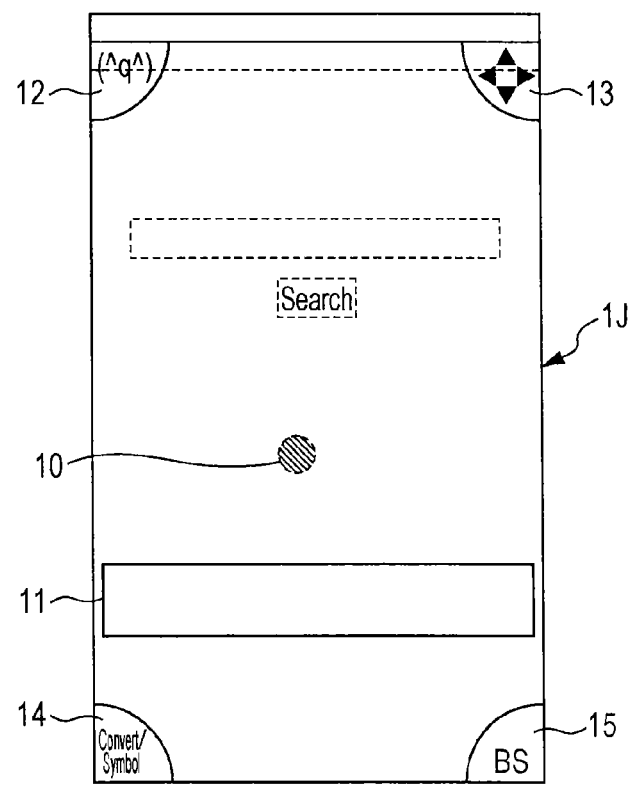
FIG. 5 is a diagram that illustrates the position of a finger contact point when the user contacts his or her finger with a desired position in the case where a mobile information device of the present embodiment has entered a full screen takeover mode.
Figure 6:
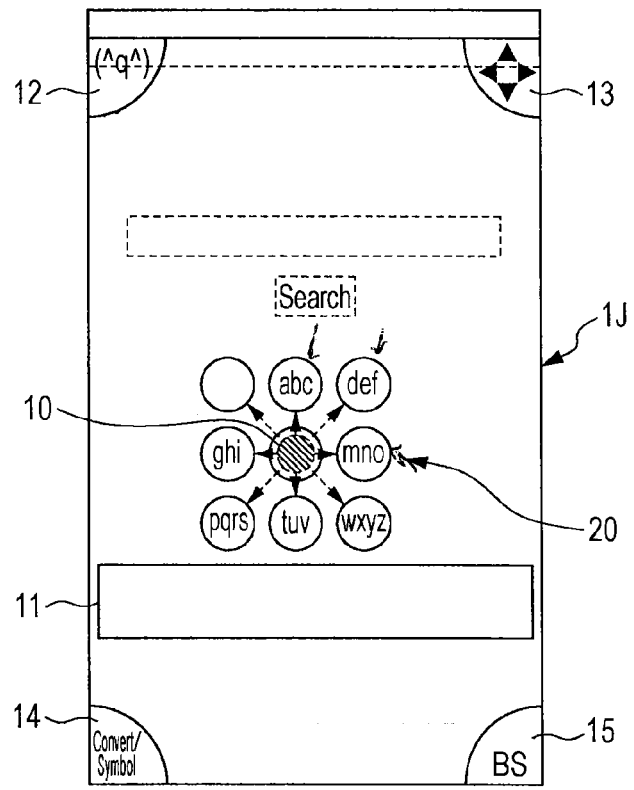
FIG. 6 is a diagram used to explain the position of a finger contact point when the user contacts his or her finger with a desired position, as well as a group object group and flick directions corresponding to that position during an English character keypad-relative input mode.

Then, when the user's finger contacts a desired position on the touch panel as illustrated in FIG. 5 for example while in a state wherein a takeover mode screen 1J is being displayed due to transitioning to the full screen takeover mode, a mobile information device of the present embodiment causes a group object group 20 as illustrated in FIG. 6 to be displayed on the takeover mode screen 1J. Herein, in the examples in FIG. 5 and FIG. 6, a finger contact point 10 is drawn on the figures in order to easily visualize the position on the touch panel contacted by the user's finger, etc., similarly to the example in the above FIG. 3. Similarly to that discussed earlier, the finger contact point 10 is not something that is for example displayed, etc. on the display screen in practice, but obviously it may also be displayed on the display screen.

In the present embodiment, the group object group 20 illustrated in FIG. 6 is a group of objects corresponding to respective groups disposed on the basis of what is called a keypad layout, for example. The group object positioned at the center of the keypad layout is positioned to correspond with the position of the finger contact point 10. Also, in the group object group 20, arrow objects are drawn from the group object at the finger contact point 10 position (in other words the center of the keypad layout) to the other respective group objects. The arrow directions of these respective arrow objects are made to be indicators for informing the user of a flick direction when performing a flick gesture from the finger contact point 10 position (the center of the keypad layout). Meanwhile, in the description hereinafter, an English character input mode wherein respective group objects are approximately associated with a keypad layout, or in other words, an English character input mode wherein the flick directions of flick gestures are approximately associated with a keypad layout, will be designated the English character keypad-relative input mode as appropriate.

In the present embodiment, each group object belonging to the group object group 20 is respectively associated with an alphabetic character group during English character input by what is called a keypad layout. In other words, as one example, in the case of English character input, a character group with the alphabetic characters "jkl" is assigned to the group object corresponding to the finger contact point 10 (in other words the group object positioned at the center of the keypad layout). Also, a character group with the alphabetic characters "abc" is assigned to the group object disposed at a given position on the screen and in the vicinity of the finger contact point 10, such as in the upward direction, for example. Similarly, a character group "def" is assigned to a group object disposed at a given position approximately 45 degrees upward and to the right in the vicinity of the finger contact point 10, a character group "ghi" is assigned to a group object disposed at a given position in the right horizontal direction in the vicinity of the finger contact point 10, a character group "mno" is assigned to a group object disposed at a given position in the left horizontal direction in the vicinity of the finger contact point 10, a character group "pqrs" is assigned to a group object disposed at a given position approximately 45 degrees downward and to the left in the vicinity of the finger contact point 10, a character group "tuv" is assigned to a group object disposed at a given position in the downward direction in the vicinity of the finger contact point 10, and a character group "wxyz" is assigned to a group object disposed at a given position approximately 45 degrees downward and to the right in the vicinity of the finger contact point 10.

Meanwhile, in the case of this example, since the number of groups into which the 26 characters of the alphabet are divided is made to be 8 groups, character groups are not assigned to all 9 group objects of the keypad layout, and an assignment like that illustrated in FIG. 6 is configured as one example. Obviously, a character group may also be assigned to for example the group object approximately 45 degrees upward and to the left of the finger contact point 10. Also, it is also possible to separately assign for example a user-desired character group or symbol group as function information, or other functions, etc. to a group object that is not assigned with a character group in advance in this way. Besides the above, a mobile information device of the present embodiment is configured to enable the assignment of character groups, etc. even for the group objects assigned with character groups in advance to be appropriately changed to other character groups and symbol groups, or to other functions.

Also, although the example in FIG. 6 illustrates how a group object group 20 is displayed on a takeover mode screen 1J, the group object group 20 may also not be displayed in cases such as when the user has memorized the positional relationships of the respective group objects and the assignments between each group object and alphabetic character group, for example. Also, in the present embodiment, the display and non-display of the group object group 20 may also be appropriately switched according to an arbitrary setting by the user, for example.

Figure 7:
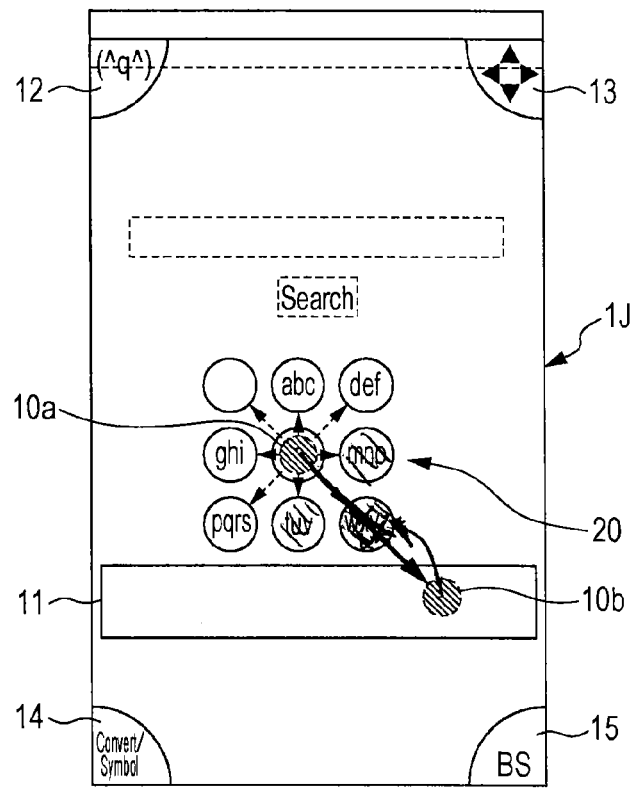
FIG. 7 is a diagram used to explain how a desired character group is selected by a flick gesture during an English character keypad-relative input mode.
Figure 8:
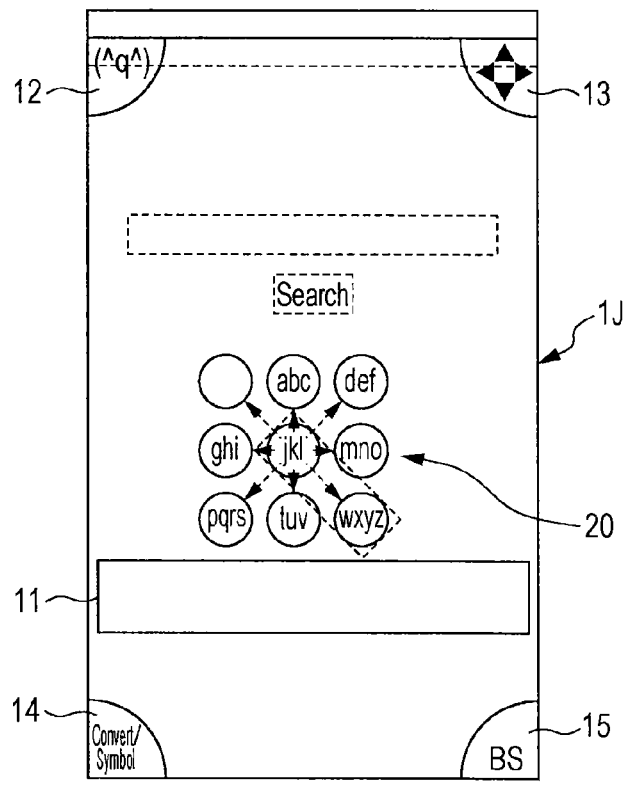
FIG. 8 is a diagram used to explain how a desired character group is selected by the user by means of a flick gesture during an English character keypad-relative input mode.

Next, if the user performs a flick gesture toward the disposed direction of a desired character group while in a state wherein respective character groups are assigned on the basis of a keypad layout that takes the finger contact point 10 as illustrated in the above FIG. 5 as the center position, a mobile information device of the present embodiment determines that the character group in the direction of that flick gesture has been selected by the user. As in the present embodiment, given an example wherein the characters "xmas" are input, when the character "x" is input, the flick gesture direction becomes approximately 45 degrees downward and to the right from the finger contact point 10 as illustrated in FIG. 7. In so doing, the character group "wxyz" is selected as illustrated in FIG. 8. Meanwhile, in the present embodiment, the selection of a character group assigned to the group object corresponding to the finger contact point 10 is executed in the case where a tap gesture is performed, such as when the user touches the top of the touch panel corresponding to the group object with his or her finger, and then releases his or her finger, etc. from the touch panel as-is without flicking, etc. Also, in the example in FIG. 7, and similarly to the example in the above FIG. 6, the finger contact point 10a is a point drawn on the figure in order to visualize the contact position of the finger during a tap gesture, and the arrow extending from the finger contact point 10a to the finger contact point 10b is an arrow drawn in order to visualize the flick direction of the flick gesture. Also, the broken lines enclosing an arrow object in FIG. 8 are lines drawn in order to visualize the direction input from the user by the flick gesture. The finger contact points 10a and 10b, the arrow extending from the finger contact point 10*a* to the finger contact point 10*b*, and the broken lines enclosing an arrow object are not something that is for example displayed, etc. on the display screen, but they may also be displayed on the display screen to enable the user to recognize them.

Figure 9:
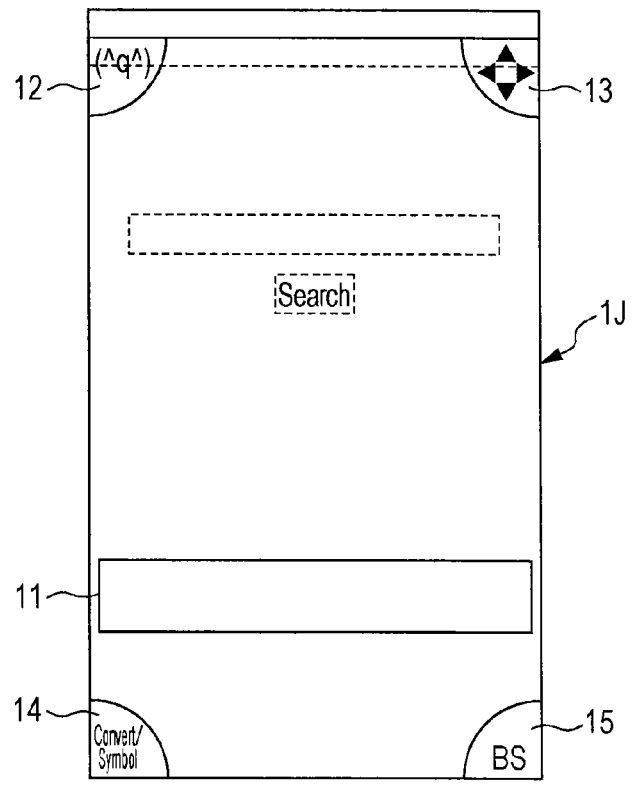
FIG. 9 is a diagram that illustrates a takeover mode screen in a standby state with respect to a second flick gesture during an English character keypad-relative input mode.

If a user-desired character group is selected as in the above FIG. 7 and FIG. 8, a mobile information device of the present embodiment goes back to a takeover mode screen 1J similar to FIG. 4 as illustrated in FIG. 9, and in a state wherein the character group selected by the user is remembered. This takeover mode screen 1J illustrated in FIG. 9 becomes a standby state with respect to a second flick gesture.

Figure 10:
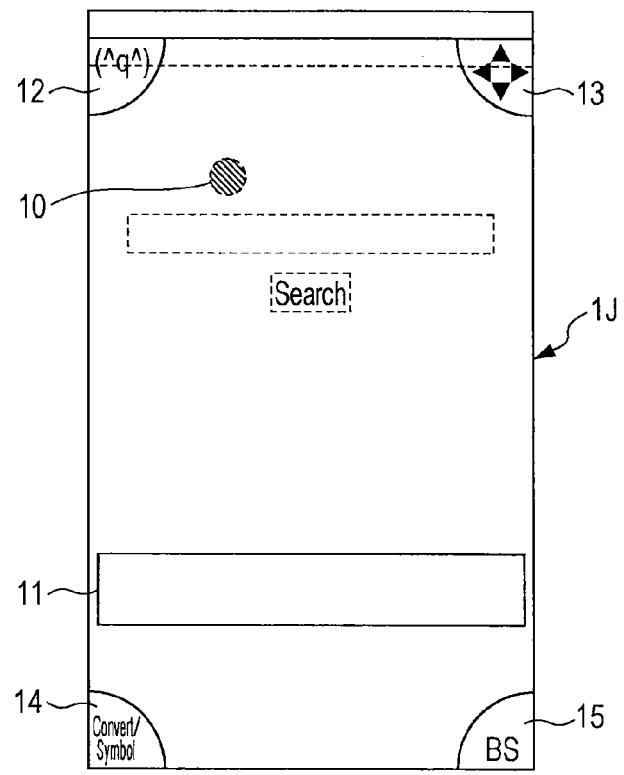
FIG. 10 is a diagram that illustrates the position of a finger contact point when the user contacts his or her finger with a desired position on a takeover mode screen in a standby state with respect to a second flick gesture during an English character keypad-relative input mode.
Figure 11:
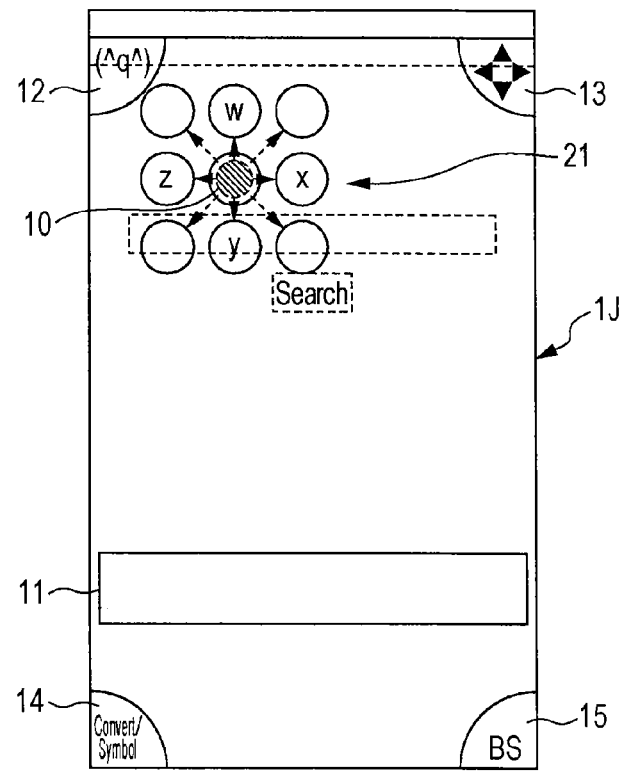
FIG. 11 is a diagram used to explain the position of a finger contact point when the user contacts his or her finger with a desired position, as well as a character object group and flick directions corresponding to that position for a second flick gesture during an English character keypad-relative input mode.

Then, if for example the user contacts his or her finger, etc. with a desired position on the touch panel as illustrated in FIG. 10 while in a state wherein a character group selected by the user is being remembered, a mobile information device of the present embodiment causes a character object group 21 as illustrated in FIG. 11 to be displayed on the takeover mode screen 1J. Herein, in the examples in FIG. 10 and FIG. 11, and similarly to that discussed earlier, a finger contact point 10 is drawn in order to visualize the contact position of the user's finger, etc. In this case, similarly to that discussed earlier, the finger contact point 10 is not something that is displayed, etc. on the display screen, but obviously it may also be displayed on the display screen.

In the present embodiment, the character object group 21 illustrated in FIG. 11 is a group of objects corresponding to respective characters belonging to the previously selected character group and disposed on the basis of a keypad layout similar to that discussed earlier. The object positioned at the center of the keypad layout is positioned in correspondence with the position of the finger contact point 10. Also, in the character object group 21, arrow objects are drawn from the character object at the finger contact point 10 position (the center of the keypad layout) to the other respective character objects. The arrow directions of these respective arrow objects are made to be indicators for informing the user of a flick direction when performing a flick gesture from the finger contact point 10 position (the center of the keypad layout).

In the present embodiment, each character object belonging to the character object group 21 is respectively associated with a respective alphabetic character belonging to the previously selected character group. In other words, in the case of this example, since the previously selected character group is the above "wxyz", the alphabetic character "w" is assigned to a character object disposed at a given position on the screen and in the vicinity of the finger contact point 10, such as in the upward direction, for example. Similarly, the character "z" is assigned to a character object disposed at a given position in the right horizontal direction in the vicinity of the finger contact point 10, the character "x" is assigned to a character object disposed at a given position in the left horizontal direction in the vicinity of the finger contact point 10, and the character "y" is assigned to a character object disposed at a given position in the downward direction in the vicinity of the finger contact point 10.

Meanwhile, in the case of this example, since the number of characters belonging to the previously selected character group 4 characters, characters are not assigned to all 9 character objects of the keypad layout, and instead characters are assigned to the four character objects up, down, left, and right with respect to the finger contact point 10 as one example. Obviously, the 4 characters may also be assigned to for example the four character groups approximately 45 degrees upward and to the left, approximately 45 degrees upward and to the right, approximately 45 degrees downward and to the left, and approximately 45 degrees downward and to the right, or additionally to other character objects. A character may also be assigned to the character object corresponding to the finger contact point 10. In cases such as when a character is assigned to the character object corresponding to the finger contact point 10, the character assigned to the character object corresponding to the finger contact point 10 is selected when a tap gesture is performed while in a state wherein a character group selected by the user is remembered, wherein the user touches a desired position on the touch panel with his or her finger, etc., and then directly releases his or her finger, etc. from the touch panel. In addition, it is also made possible to separately assign for example user-desired characters or symbols as function information, or other functions, etc. to respectively group objects that are not assigned with a character, etc. in advance. Furthermore, it is also made possible to appropriately change the assignment of characters, etc. even for the character objects assigned with characters, etc. in advance to other characters and symbols, or to other functions.

Also, although the example in FIG. 11 illustrates how a character object group 21 is displayed on a takeover mode screen 1J, the character object group 21 may also not be displayed in cases such as when the user has mostly memorized the positional relationships of the respective character objects and the assignments between each character object and each character, for example. Also, in the present embodiment, the display and non-display of the character object group 21 may also be appropriately switched according to an arbitrary setting by the user, for example.

Figure 12:
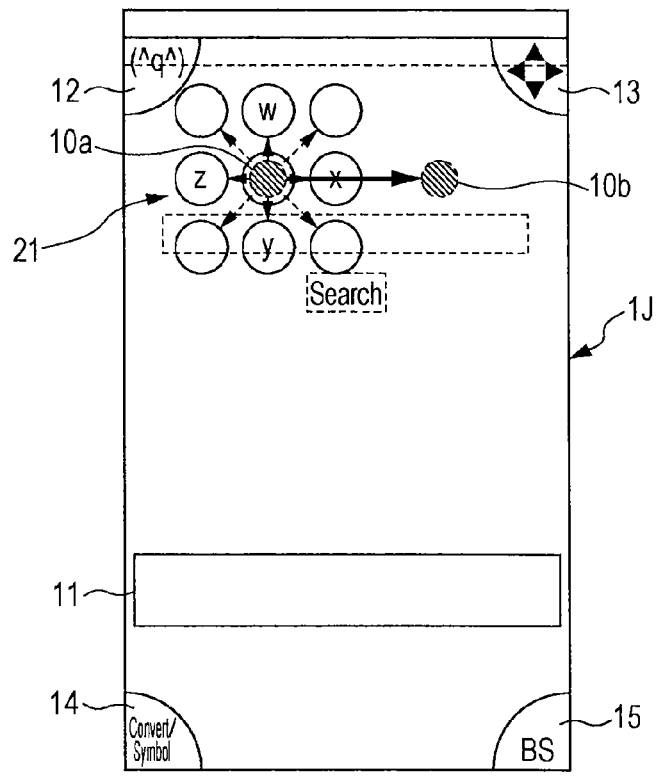
FIG. 12 is a diagram used to explain how a desired character group is selected by a second flick gesture during an English character keypad-relative input mode.
Figure 13:
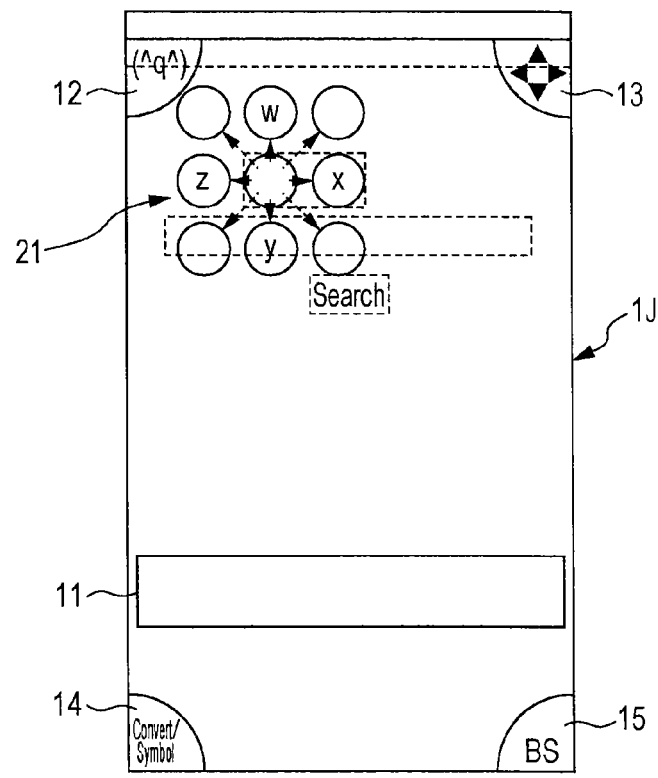
FIG. 13 is a diagram used to explain how a desired character is selected by the user by means of a second flick gesture during an English character keypad-relative input mode.

Next, if for example the user performs a flick gesture toward the disposed direction of a desired character while in a state wherein respective characters are assigned on the basis of a keypad layout that takes the finger contact point 10 as illustrated in FIG. 10 discussed earlier as the center position, a mobile information device of the present embodiment determines that the character in the direction of that flick gesture has been selected by the user. As in the present embodiment, in the case of an example of inputting into the text box 2 the character "x" from "xmas" as the search keyword, the flick gesture direction becomes the right horizontal direction from the finger contact point 10 as illustrated in FIG. 12. In so doing, the character "x" is selected as illustrated in FIG. 13. Meanwhile, similarly to that discussed earlier, the finger contact point 10*a* is a point drawn in order to visualize the contact position of the finger during a tap gesture, and the arrow extending from the finger contact point 10*a* to the finger contact point 10*b* is an arrow drawn in order to visualize the flick direction. Also, the broken lines enclosing an arrow object in FIG. 13 are lines drawn in order to visualize the direction input by the user by the flick gesture. The finger contact points 10*a* and 10*b*, the arrow linking them, and the broken lines enclosing an arrow object are not something that is for example displayed, etc. on the display screen, but they may also be displayed on the display screen to enable the user to recognize them.

Figure 14:
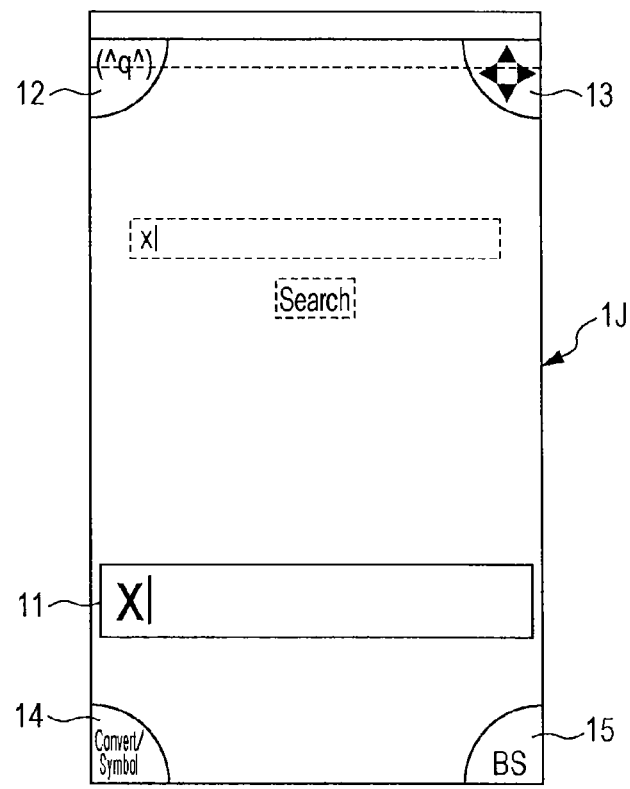
FIG. 14 is a diagram that illustrates a state wherein a character "x" and a cursor following the character are displayed in a current input text display area and a text box due to the character "x" being selected, for example.

In so doing, if for example the character "x" is selected, a mobile information device of the present embodiment displays the character "x" followed by a cursor in the current input text display area 11, and also similarly displays the character "x" followed by a cursor in the text box 2, as illustrated in FIG. 14.

Figure 15:
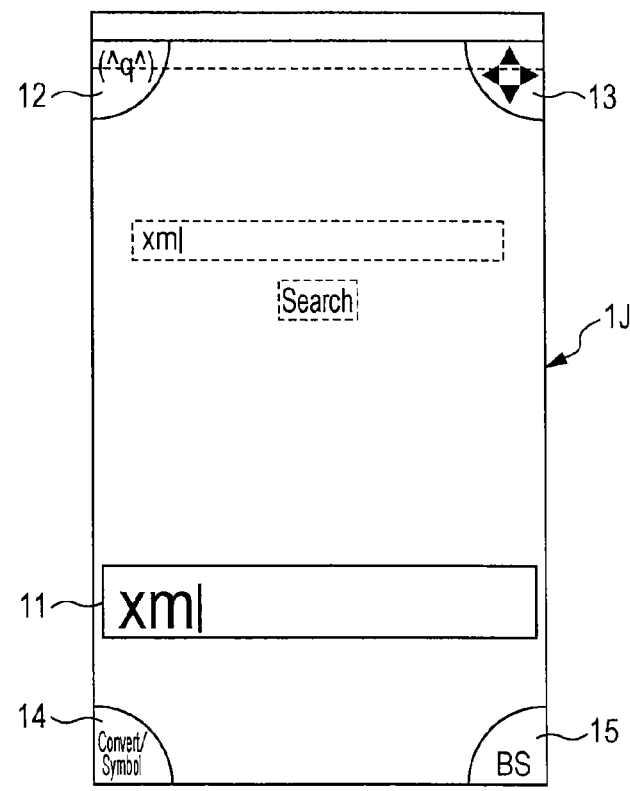
FIG. 15 is a diagram that illustrates a state wherein for example the characters up to "xm" from the characters in "xmas" have been input.
Figure 16:
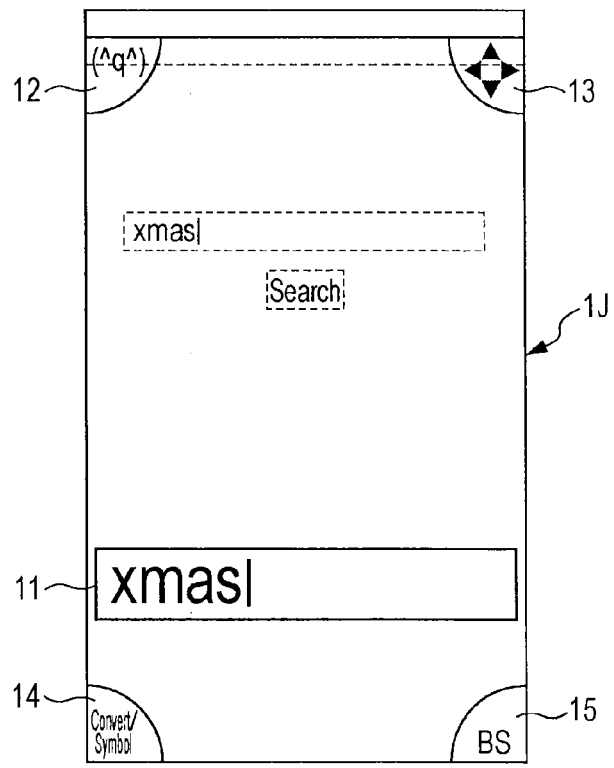
FIG. 16 is a diagram that illustrates a state wherein the input of all the characters in "xmas" has finished.

Among the characters in "xmas" input as the search keyword, input is conducted similarly to that discussed above for the respective characters "m", "a", and "s" following the above "x". FIG. 15 illustrates the state wherein the characters up to "xm" from the characters in "xmas" have been input. FIG. 16 illustrates a state wherein the input of all the characters in "xmas" has finished.

Figure 17:
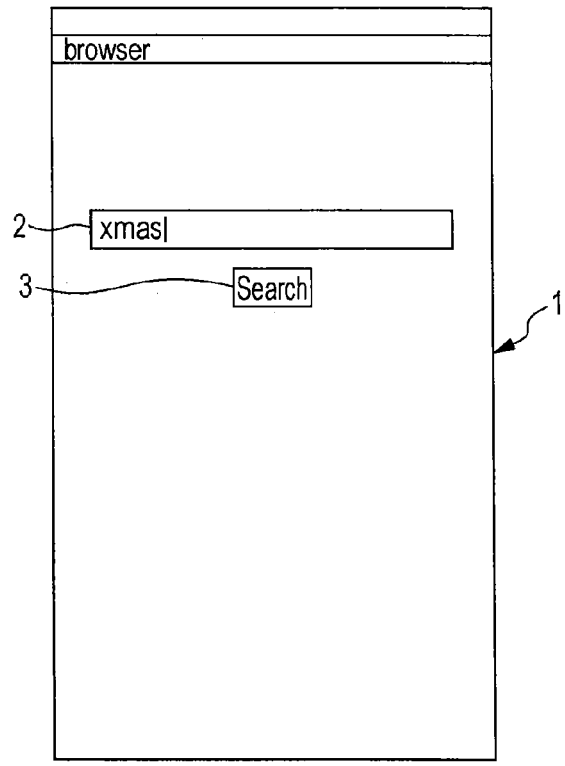
FIG. 17 is a diagram that illustrates a screen of a browser screen mode after the input of all the characters "xmas" has finished.

After the input of all user-desired characters has finished as illustrated in the above FIG. 16, if the user performs a press operation on a key from among the physical keys provided on the key operation unit 119 discussed earlier that is provided with a "Back" function for returning the device mode, etc. to a previous state, then a mobile information device of the present embodiment cancels the full screen takeover mode, and transitions to a browser screen mode like that illustrated in FIG. 17. The browser screen mode in FIG. 17 is in a state wherein the input of the characters "xmas" in the text box 2 has completed. Consequently, if for example the search button 3 receives a tap gesture, etc. while in this state, a mobile information device of the present embodiment executes a web search, etc. in the browser screen, taking the above "xmas" as the search keyword.

Meanwhile, if a touch panel position corresponding to the text box 2 receives a tap gesture similarly to FIG. 3 as discussed earlier while in the browser screen mode in FIG. 17, a mobile information device of the present embodiment transitions to a full screen takeover mode similar to that discussed earlier, and enters a state enabling further characters, etc. to be added starting at a cursor position following the characters "xmas" in the text box 2. Also, movement of the cursor position in the text box 2 is made to be capable of being instructed by a tap gesture on the cursor instruction area 13 discussed earlier followed by a flick gesture, etc. Also, in the present embodiment, operations for backing up the cursor by one character while also deleting that character, for example, are made to be capable of being instructed by a tap gesture operation on the backspace input area 15 discussed earlier.

A more detailed description of the case wherein a mobile information device of the present embodiment executes an English character input process by means of an English character keypad-relative input mode as discussed above will be given later.

Also, in the present embodiment, besides an English character keypad-relative input mode wherein flick gesture directions are approximately associated with a keypad layout as discussed earlier, English character input may also be for example an English character 4 group-relative input mode or an English word-relative input mode as follows.

The English character 4 group-relative input mode is an English character input mode wherein the respective characters of the alphabet are divided into 4 groups, with both flick gesture directions as well as four group objects being associated with these 4 groups. A group "a, b, c, d, e, f g", a group "h, i, j, k, l, m, n", a group "o, p, q, r, s, t, u" and a group "v, w, x, y, z" can be given as one example of the 4 groups. Also, the 4 directions up, down, left, and right from the finger contact point 10 or the direction 45 degrees upward and diagonally left degrees, the direction 45 degrees upward and diagonally right, the direction 45 degrees downward and diagonally left, and the direction 45 degrees downward and diagonally right, for example, are conceivable as the flick gesture directions in this example. Obviously, these flick gesture directions are an example, and other directions may be used, and it is also possible for the user to arbitrarily set directions. A more detailed description of the case wherein a mobile information device of the present embodiment executes an English character input process by means of the English character 4 group-relative input mode will be given later.

The English word-relative input mode is an English character input mode wherein for example a plurality of meaningful English words consisting of 4 characters are used, with both flick gesture directions as well as group objects being respectively associated with each of these English words. The 8 words "bang", "chip", "desk", "from", "july", "wave", "taxy", "quiz" can be given as one example of the 4 character English words. All 26 characters of the alphabet are included in these English words. Also, an association based on for example the keypad layout discussed earlier can be given as an association between each of these words and the flick gesture directions. Herein, a more detailed description of the case wherein a mobile information device of the present embodiment executes an English character input process by means of the English word-relative input mode will be given later.

(Exemplary Japanese Character Input)

In the case of an information input technique of the present embodiment, Japanese character input is realized by for example one tap gesture and two flick gestures per character, excluding some exceptions. Details will be discussed later, but in the present embodiment, Japanese character input is conducted by for example selecting a "row" group desired for input with a first flick gesture after a tap gesture, and selecting a "column" character included in the "row" group selected by the previous flick gesture with a second flick gesture. In other words, with Japanese character input, the "consonant" of a character desired for input is selected by a first flick gesture, and the "vowel" of the character desired for input is selected by a second flick gesture. In so doing, the hiragana character obtained from the combination of this "consonant" and "vowel" is determined. Herein, since in Japanese characters there exist characters including what are called small characters such as the small "ya", small "yu", and small "yo", and the dakuten, etc., the present embodiment is configured such that flick gestures corresponding to these small characters and the dakuten, etc. can be set.

FIGS. 18 to 35 illustrate a flow of screen transitions and gesture operations on a touch panel during Japanese character input. In the description hereinafter, an example is given wherein the user inputs a desired character string as a search keyword ("KENSAKU suru", for example) during a web search. However, the present embodiment is obviously not limited to the example of this embodiment. Also, in the case of this example, the character input mode of a mobile information device of the present embodiment is taken to be set to a Japanese character input mode.

The browser screen in which are disposed a text box 2 where a search keyword is input and a search button 3, and the state until transitioning to a full screen takeover mode by performing a tap gesture on the text box 2 in that browser screen, are the same as FIG. 2 and FIG. 3 discussed earlier.

Figure 18:
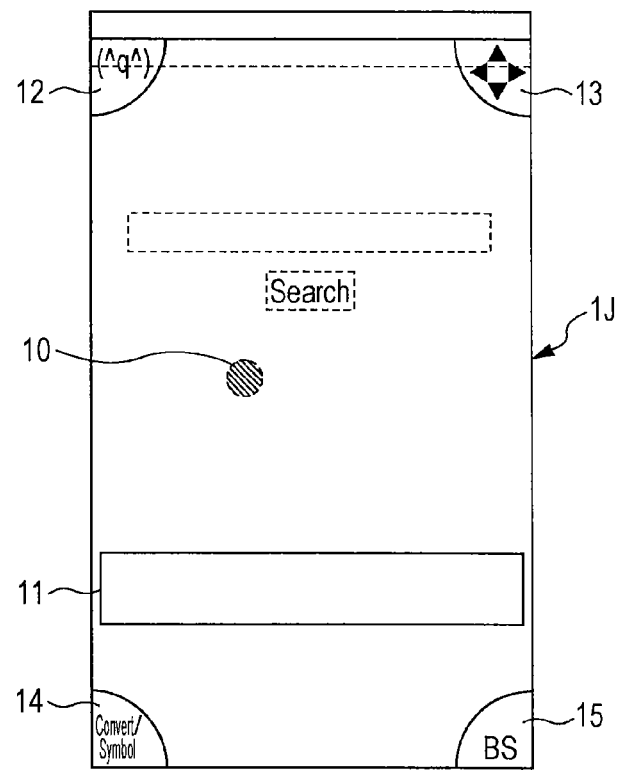
FIG. 18 is a diagram that illustrates the position of a finger contact point when the user contacts his or her finger with a desired position during a Japanese character input mode.
Figure 19:
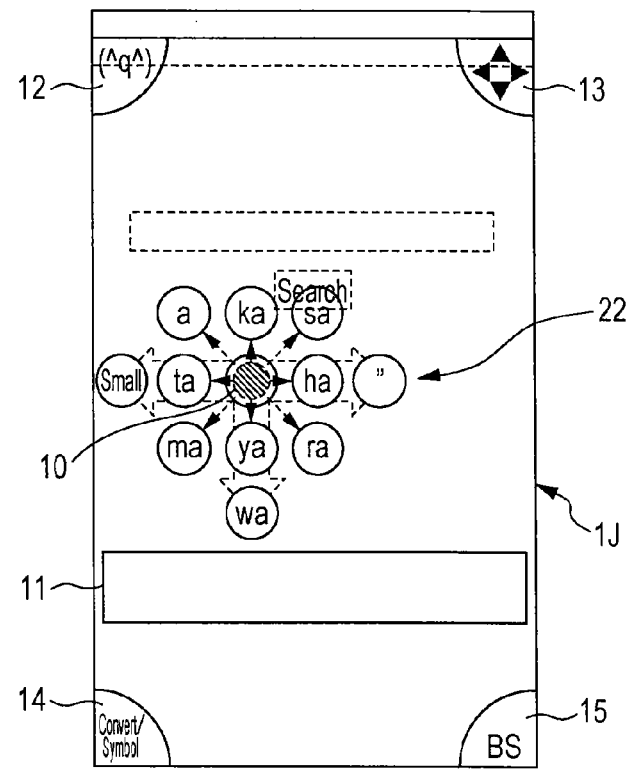
FIG. 19 is a diagram used to explain the position of a finger contact point when the user contacts his or her finger with a desired position, as well as a group object group and flick directions corresponding to that position during a Japanese character input mode.

If the user's finger, etc. touches a desired position on the touch panel as illustrated in FIG. 18 for example after transitioning to the full screen takeover mode, a mobile information device causes a group object group 22 as illustrated in FIG. 19 to be displayed on the takeover mode screen 1J. Herein, the finger contact point 10 in FIG. 18 and FIG. 19 is similar to that discussed earlier.

In the present embodiment, the group object group 22 illustrated in FIG. 19 is a group of objects corresponding to respective character groups disposed on the basis of what is called a keypad layout, for example, similar to that discussed earlier. The group object positioned at the center of the keypad layout is positioned to correspond with the position of the finger contact point 10.

In the case of Japanese character input as in the present embodiment, each group object belonging to the group object group 22 is respectively associated with a hiragana character group during Japanese character input by what is called a keypad layout. In other words, in the case of a Japanese character input mode, a character group that includes the consonant "n", or in other words a character group of the respective hiragana characters "na ni nu ne no" belonging to the "na row" of the hiragana gojuon syllabary, is assigned to the group object corresponding to the finger contact point 10 (the group object positioned at the center of the keypad layout). Also, a character group that includes the consonant "a", or in other words a character group of the respective hiragana characters "a i u e o" belonging to the "a row" of the hiragana gojuon syllabary, is assigned to a group object disposed at a given position on the screen and in the vicinity of the finger contact point 10, such as approximately 45 degrees upward and to the left, for example. Similarly, a character group that includes the consonant "k", or in other words a character group of the "ka row", is assigned to a group object disposed at a given position in the upward direction in the vicinity of the finger contact point 10. A character group that includes the consonant "s", or in other words a character group of the "sa row", is assigned to a group object disposed at a given position approximately 45 degrees upward and to the right in the vicinity of the finger contact point 10. A character group that includes the consonant "t", or in other words a character group of the "ta row", is assigned to a group object disposed at a given position in the left horizontal direction in the vicinity of the finger contact point 10. A character group that includes the consonant "h", or in other words a character group of the "ha row", is assigned to a group object disposed at a given position in the right horizontal direction in the vicinity of the finger contact point 10. A character group that includes the consonant "m", or in other words a character group of the "ma row", is assigned to a group object disposed at a given position approximately 45 degrees downward and to the left in the vicinity of the finger contact point 10. A character group that includes the consonant "y", or in other words a character group of the "ya row", is assigned to a group object disposed at a given position in the downward direction in the vicinity of the finger contact point 10. A character group that includes the consonant "r", or in other words a character group of the "ra row", is assigned to a group object disposed at a given position approximately 45 degrees downward and to the right in the vicinity of the finger contact point 10. Additionally, a character group that includes the consonant "w", or in other words a character group of the "wa row", is assigned to a group object disposed at a given position farther in the downward direction than the group object corresponding to the character group of the consonant "r". Also, in the case of the Japanese character input mode, an embellish function used when making a character smaller, for example, is assigned to a group object in the group object group 22 disposed at a given position farther in the left horizontal direction than the group object corresponding to the character group that includes the consonant "t". Furthermore, an embellish function used when applying the dakuten, etc. to a character, for example, is assigned to a group object disposed at a given position farther in the right horizontal direction than the group object corresponding to the character group of the consonant "h". Herein, the assignments between each of these group objects and their character groups are configured such that the user can also appropriately change them. Also, it is configured such that the information assigned to respective group objects can be appropriately changed to symbols or other functions, etc. instead of just characters.

Also, in the group object group 22 in the case of a Japanese character input mode, arrow objects are drawn from the group object at the finger contact point 10 position (the center of the keypad layout) to the other respective group objects. The arrow directions of these respective arrow objects are made to be indicators for informing the user of a flick direction when performing a flick gesture from the finger contact point 10 position (the center of the keypad layout). However, in the group object group 22 in the case of the Japanese character input mode, there are arrow objects pointing to group objects group objects disposed at a positioned separated from the finger contact point 10 by for example the equivalent of one group object, such as the group object for the consonant "w" and the group objects to which are assigned the small character, and dakuten, etc. embellish functions, for example. For these arrow objects, there are drawn given arrow objects that are made to be indicators for informing the user of a flick direction when performing a flick gesture, while simultaneously informing the user that the flick speed should be fast.

Although the example in FIG. 19 illustrates how a group object group 22 is displayed on a takeover mode screen 1J, the group object group 22 may also not be displayed in cases such as when the user has mostly memorized the positional relationships of the respective group objects and the assignments between each group object and each character group corresponding to respective consonants, for example. Also, in the present embodiment, the display and non-display of the group object group 22 may also be appropriately switched according to an arbitrary setting by the user, for example.

Next, if the user performs a flick gesture toward the disposed direction of a desired character group while in a state wherein respective character groups are assigned as illustrated in FIG. 18 discussed earlier, a mobile information device of the present embodiment determines that the character group in the direction of that flick gesture has been selected by the user. As in the present embodiment, in the case of an example wherein the user inputs the characters "KENSAKU sum" into the text box 2 as a search keyword, the direction of the flick gesture performed first becomes a direction so as to select the character group of the consonant "k" that includes the character "ke" in the hiragana reading "kensaku" of "KENSAKU". For this reason, the first flick gesture direction when inputting the characters "KENSAKU" is made to be the direction in which is disposed the character group of the consonant "k", or in other words the upward direction from the finger contact point 10, as illustrated by the example in FIG. 20. In so doing, the character group of the consonant "k" is selected as illustrated in FIG. 21. Herein, the finger contact point 10a and the finger contact point 10b in FIG. 20, the arrow linking them, the broken lines enclosing an arrow object, etc. are similar to that discussed earlier.

Figure 20:
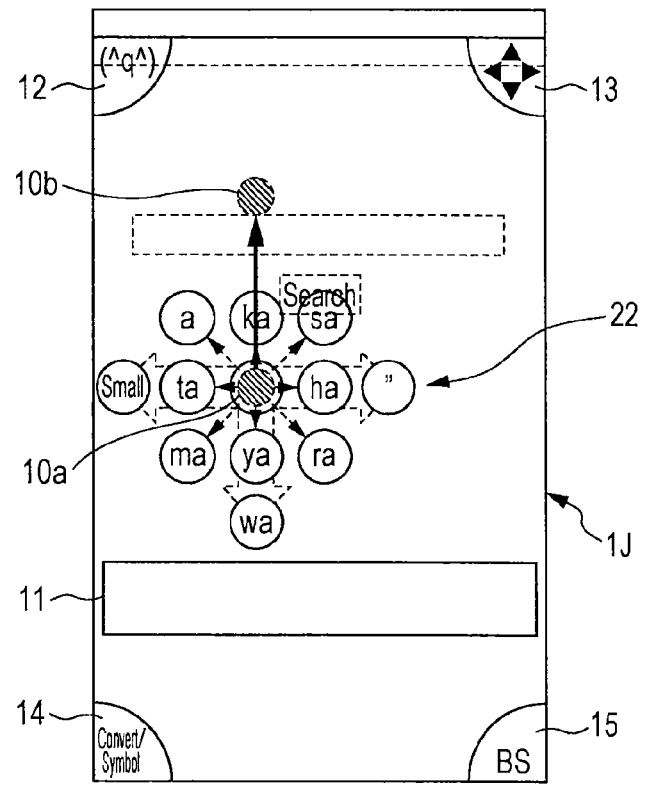
FIG. 20 is a diagram used to explain how a desired character group is selected by a flick gesture during a Japanese character input mode.
Figure 21:
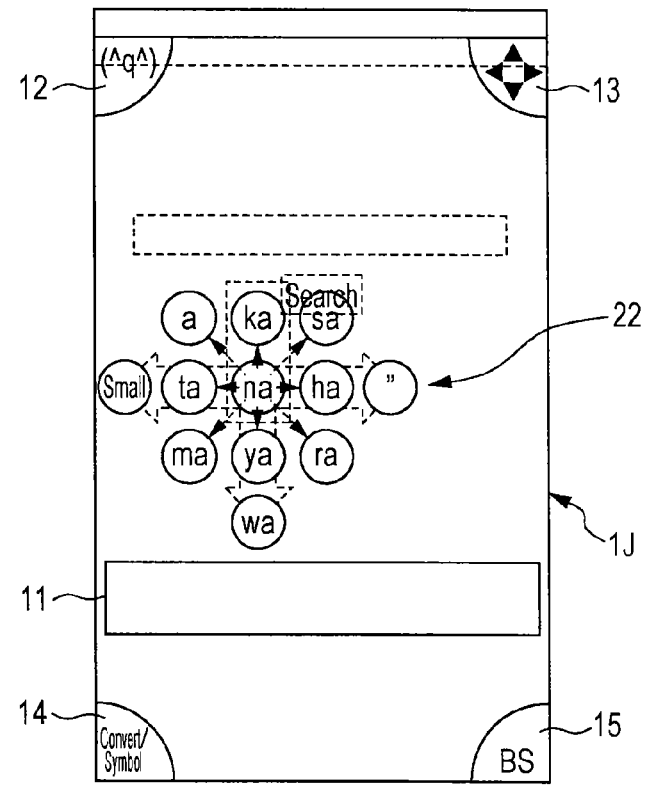
FIG. 21 is a diagram used to explain how a desired character group (consonant) is selected by the user by means of a flick gesture during a Japanese character input mode.
Figure 22:
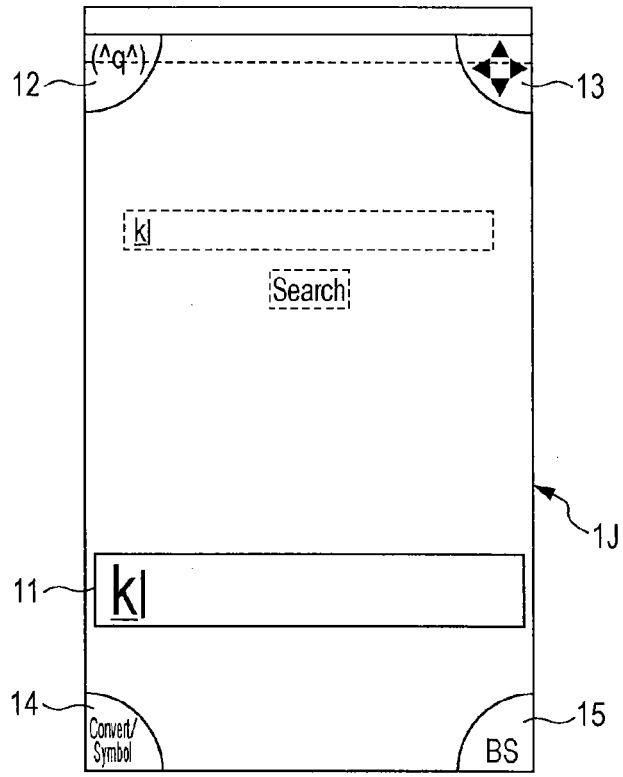
FIG. 22 is a diagram that illustrates a takeover mode screen in a standby state with respect to a second flick gesture during a Japanese character input mode.

If a user-desired character group is selected as in the above FIG. 20 and FIG. 21, a mobile information device of the present embodiment goes back to a takeover mode screen 1J as illustrated in FIG. 22, and in a state wherein the character group selected by the user is remembered. In the case of the example in FIG. 22, since the consonant "k" has entered a selected state, the single character "k" followed by a cursor is displayed in the current input text display area 11, and similarly, the single character "k" followed by a cursor is also displayed in the text box 2.

Figure 23:
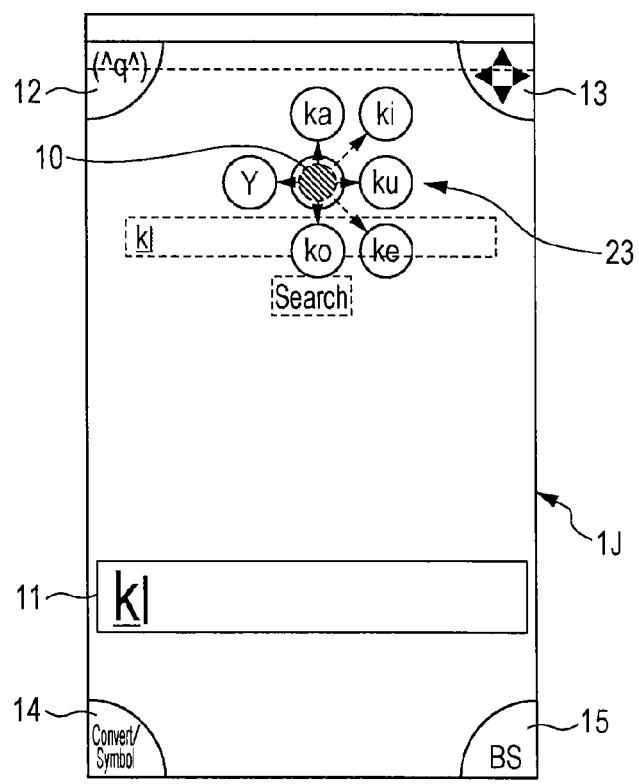
FIG. 23 is a diagram used to explain the position of a finger contact position when the user contacts his or her finger with a desired position, as well as a character object group and flick directions corresponding to that position for a second flick gesture during a Japanese character input mode.

Then, if the user's finger, etc. touches a desired position on the touch panel while in a state wherein the character group selected by the user is remembered, a mobile information device of the present embodiment causes a character object group 23 as illustrated in FIG. 23 to be displayed on the takeover mode screen 1J. Herein, in the example in FIG. 23, and similarly to that discussed earlier, a finger contact point 10 is drawn in order to visualize the contact position of the user's finger, etc.

In the case of this Japanese character input, the character object group 23 illustrated in FIG. 23 is a group of objects corresponding to respective characters belonging to a previously selected character group and disposed on the basis of a keypad layout similar to that discussed earlier. The object positioned at the center of the keypad layout is positioned so as to correspond with the position of the finger contact point 10. Also, in the character object group 23, arrow objects similar to that discussed earlier are drawn from the character object at the finger contact point 10 position (the center of the keypad layout) to the other respective character objects. Similarly to that discussed earlier, the arrow directions of these respective arrow objects are made to be indicators for informing the user of a flick direction when performing a flick gesture from the finger contact point 10 position (the center of the keypad layout).

In the present embodiment, the respective character object belonging to the character object group 23 are disposed on the basis of a keypad layout while in a state of being respectively associated with respective hiragana characters obtained by combining the consonant "k" of the previously selected character group with respective vowels. In other words, in the case of this example, since the previously selected character group is the above consonant "k", character objects for the respective hiragana characters "ka", "ki", "ku", "ke", and "ko" obtained by means of the consonant "k" and the respective vowels "a", "i", "u", "e" and "o" are disposed on the basis of the keypad layout. For example, the character "ka" obtained from the consonant "k" and the vowel "a" is assigned to a character object disposed at a given position on the screen and in the vicinity of the finger contact point 10, such as in the upward direction, for example. Similarly, the character "ki" obtained from the consonant "k" and the vowel "i" is assigned to a character object disposed at a given position approximately 45 degrees upward and to the right in the vicinity of the finger contact point 10. The character "ku" obtained from the consonant "k" and the vowel "u" is assigned to a character object disposed at a given position in the right horizontal direction in the vicinity of the finger contact point 10. The character "ke" obtained from the consonant "k" and the vowel "e" is assigned to a character object disposed at a given position approximately 45 degrees downward and to the right in the vicinity of the finger contact point 10. The character "ko" obtained from the consonant "k" and the vowel "o" is assigned to a character object disposed at a given position in the downward direction in the vicinity of the finger contact point 10. Meanwhile, yoon characters ("small ya, small yu, small yo", etc.) usable with the character group of the consonant "k" are assigned to a character object disposed at a given position in the left horizontal direction in the vicinity of the finger contact point 10. Consequently, in the case where for example a flick gesture is performed in the left horizontal direction in the vicinity of the finger contact point 10 after the character group of the consonant "k" is selected by the user, a mobile information device of the present embodiment determines that the characters "kya", "kyu", "kyo" have been selected by the user. Herein, the 5 vowels "a", "i", "u", "e", and "o" used in Japanese character input are assigned to respective character objects as in FIG. 23 as an example, but obviously these assignments are an example, and the assignments may be changed as discussed earlier, and other characters and symbols, other symbols, etc. may also be assigned as function information.

Also, although the example in FIG. 23 illustrates how a character object group 23 is displayed on a takeover mode screen 1J, the character object group 23 may also not be displayed in cases such as when the user has mostly memorized the positional relationships of the respective character objects and the assignments between each character object and each character, for example. Also, in the present embodiment, the display and non-display of the character object group 23 may also be appropriately switched according to an arbitrary setting by the user, for example.

Figure 24:
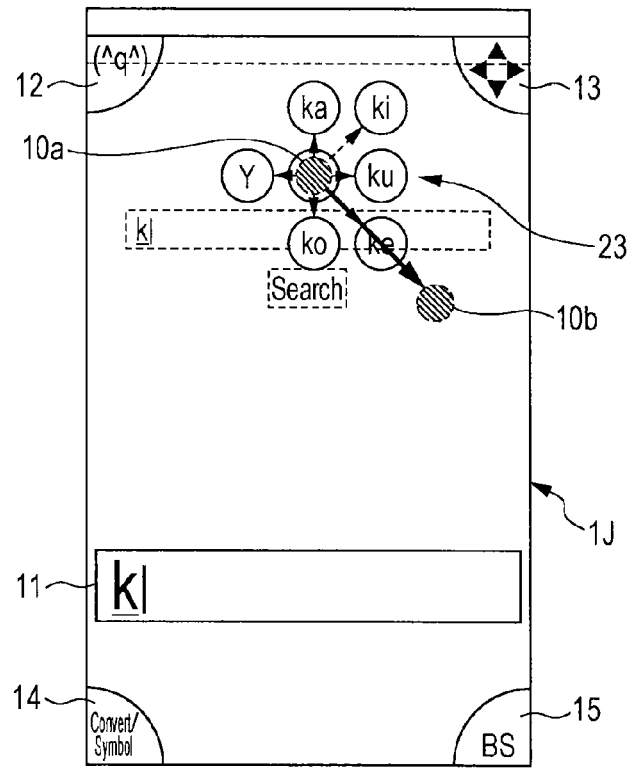
FIG. 24 is a diagram used to explain how a desired character group is selected by a second flick gesture during a Japanese character input mode.
Figure 25:
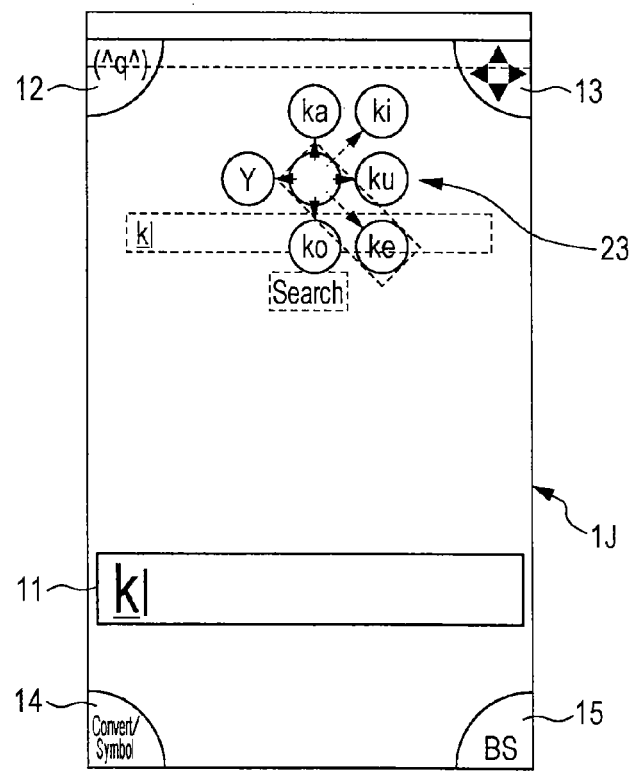
FIG. 25 is a diagram used to explain how a desired character group is selected by a second flick gesture during a Japanese character input mode.

Next, if for example the user performs a flick gesture toward the disposed direction of a desired character while in a state wherein respective characters are assigned to respective character objects in the character object group 23 as illustrated in the above FIG. 23, a mobile information device of the present embodiment determines that the character in the direction of that flick gesture has been selected by the user. As in the present embodiment, in the case of an example wherein the user inputs into the text box 2 the characters "KENSAKU suru" as the search keyword, the character group of the vowel "e" included in "ke" from the hiragana reading "kensaku" will be selected. For this reason, the flick gesture direction becomes approximately 45 degrees downward and to the right from the finger contact point 10 as illustrated in FIG. 24, and as a result the character "ke" is selected as illustrated in FIG. 25. Meanwhile, the finger contact points 10*a*, 10*b*, etc. in FIG. 23 are similar to that discussed earlier, and in addition, the broken lines enclosing an arrow object in FIG. 24 are similar to that discussed earlier.

Figure 26:
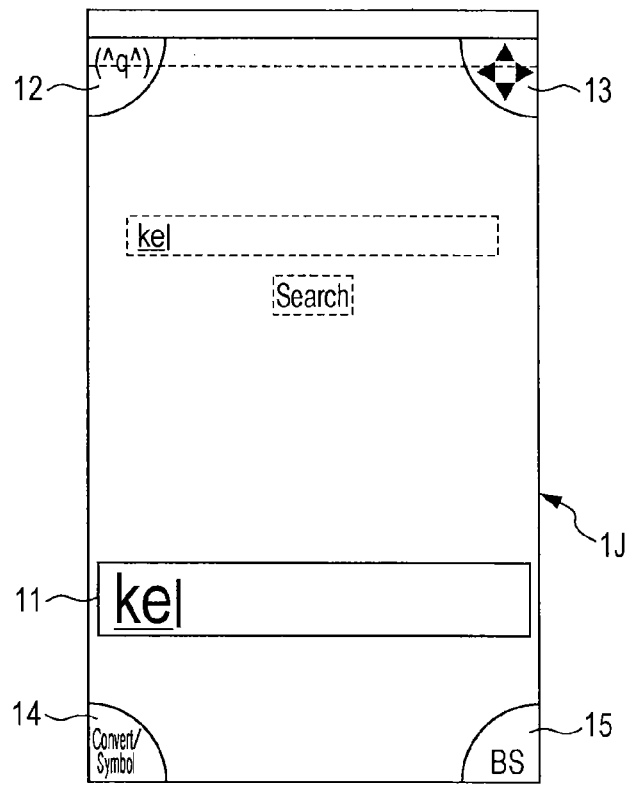
FIG. 26 is a diagram that illustrates a state wherein for example an unconfirmed character "ke" and a cursor following the character are displayed in a current input text display area and a text box during a Japanese character input mode.

In so doing, if for example the character "ke" is selected, a mobile information device of the present embodiment displays the character "ke" followed by a cursor in a current input text display area 11, and also similarly displays the character "ke" followed by a cursor in a text box 2, as illustrated in FIG. 26.

Figure 27:
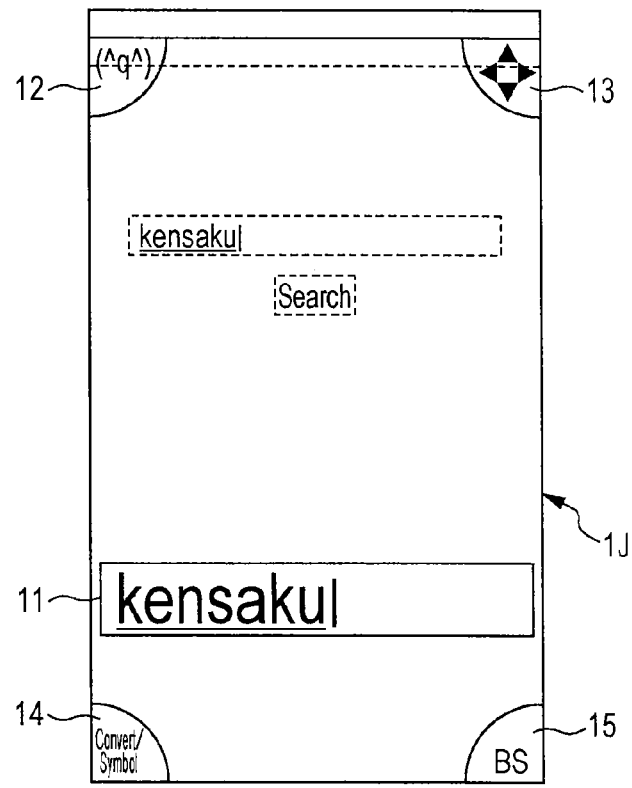
FIG. 27 is a diagram that illustrates a state wherein the unconfirmed characters "kensaku" and a cursor following the characters are displayed in a current input text display area and a text box during a Japanese character input mode.

Among the characters in the hiragana reading "kensaku" of "KENSAKU" input as the search keyword, input is conducted similarly to that discussed above for the respective characters "n", "sa", and "ku" following the above "ke". FIG. 27 illustrates a state wherein the input of all the characters in "kensaku" has finished.

Next, although the above-discussed hiragana reading "kensaku" may be directly used as a search keyword, a mobile information device of the present embodiment is also capable of converting that hiragana "kensaku" into the kanji "KENSAKU".

Figure 28:
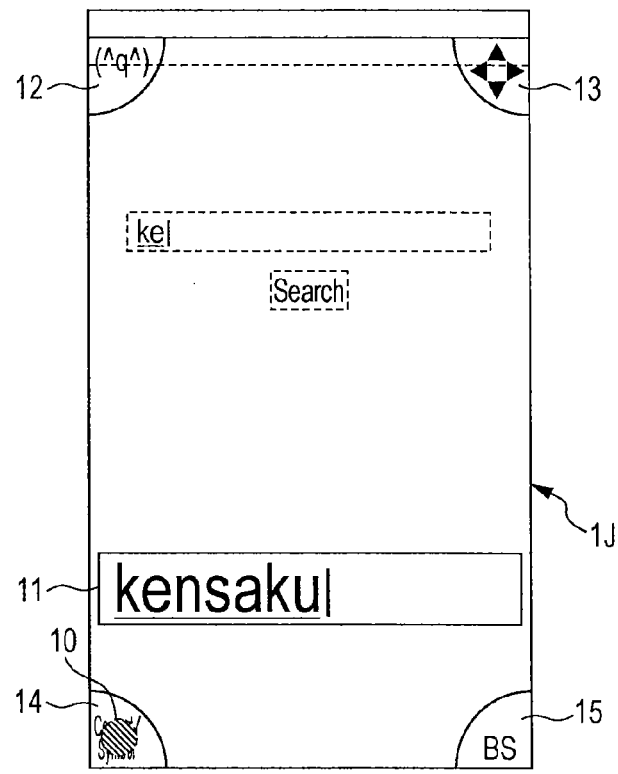
FIG. 28 illustrates how a convert/symbol instruction area is tapped during a Japanese character input mode.

In the present embodiment, kana-kanji conversion is configured to be executable via a tap gesture on a convert/symbol instruction area 14 disposed at the lower-left corner of the takeover mode screen 1J. FIG. 28 illustrates how a tap gesture is conducted on the convert/symbol instruction area 14. Herein, the finger contact point 10 in the drawing is similar to that discussed earlier.

In the case where a mobile information device has entered a Japanese character input mode, the convert/symbol instruction area 14 has conversion functions for Japanese kana-kanji conversion. In the case where for example the convert/symbol instruction area 14 receives a tap gesture, etc., a mobile information device switches approximately the entire area of the touch panel to a symbol selection takeover mode as discussed earlier. (In the case of Japanese character input, this becomes a kana-kanji conversion takeover mode.)

Figure 29:
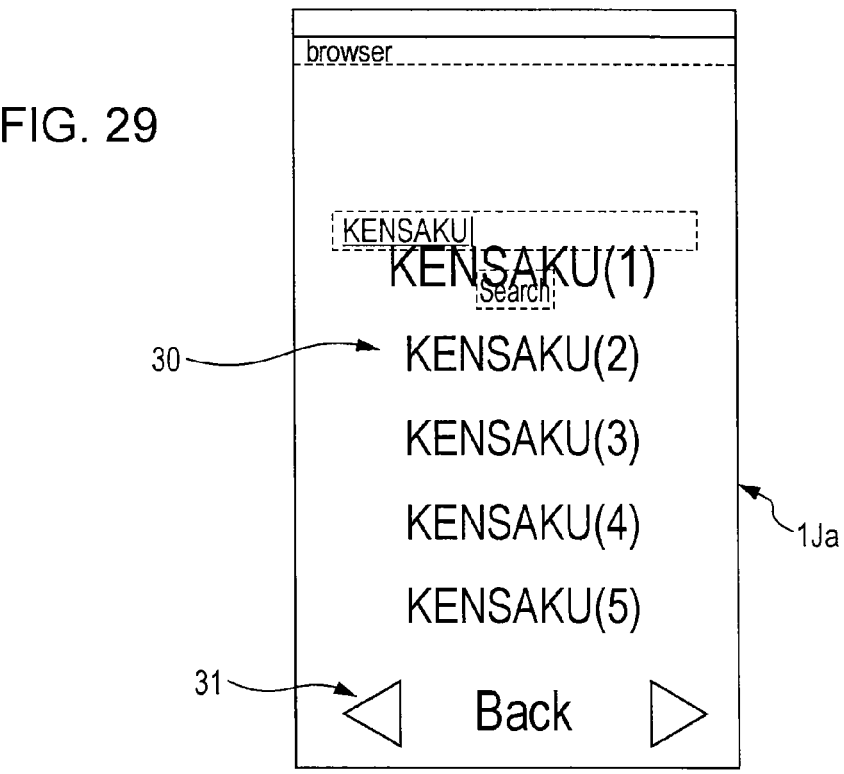
FIG. 29 is a diagram that illustrates an example wherein a conversion kanji candidate list corresponding to the unconfirmed characters "kensaku" is displayed on a display screen.

Then, when transitioning to the kana-kanji conversion takeover mode, a mobile information device of the present embodiment transitions to a kana-kanji conversion takeover screen 1Ja wherein there is displayed on the display screen a conversion kanji candidate list 30 corresponding to the hiragana string input into the text box 2, as illustrated in FIG. 29.

Also, a mobile information device is at this time configured to enable scrolling respective conversion kanji candidates in the conversion kanji candidate list by for example slide gestures or flick gestures, and is additionally configured to enable selection of a desired conversion kanji candidate in that list by a tap gesture.

Figure 30:
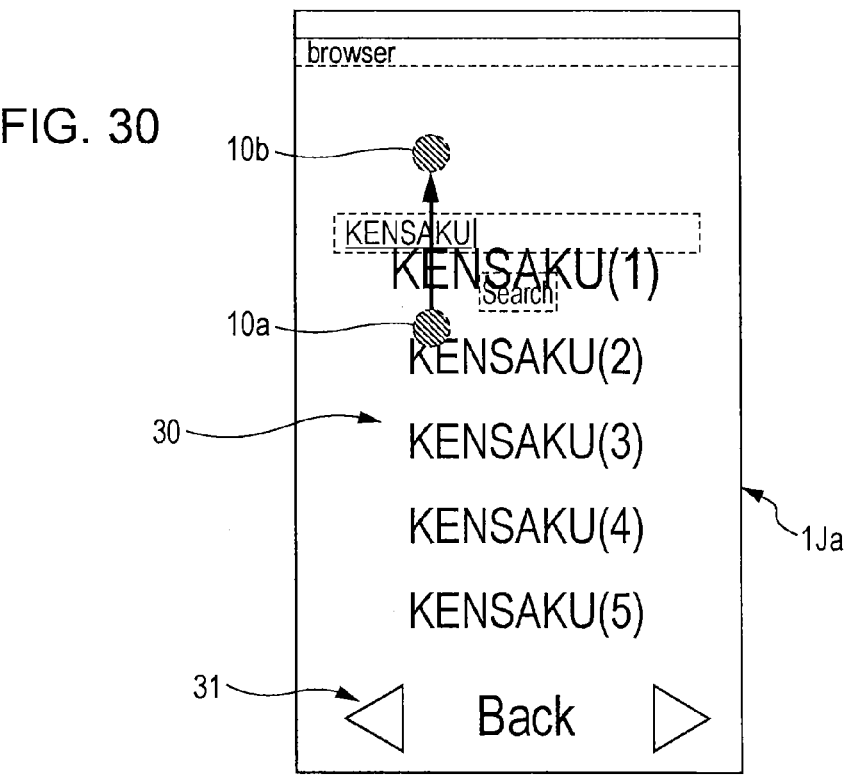
FIG. 30 is a diagram that explains how a flick gesture is conducted while in a state wherein a conversion kanji candidate list corresponding to the unconfirmed characters "kensaku" is displayed on a display screen.
Figure 31:
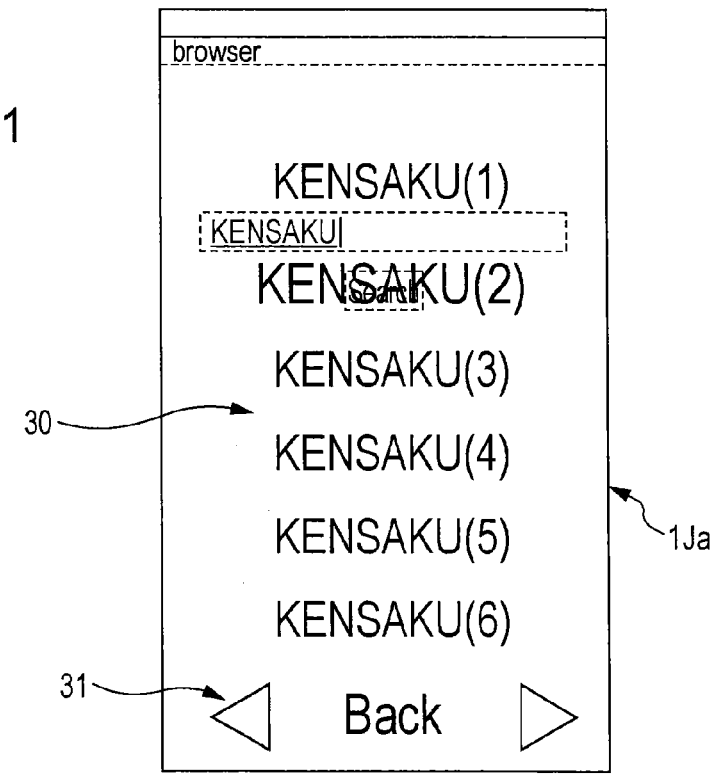
FIG. 31 is a diagram that illustrates an example wherein a conversion kanji candidate list is displayed on a display screen after scrolling by a flick gesture.

Herein, in the case of a kana-kanji conversion takeover mode, scroll instructions for respective conversion kanji candidates in the conversion kanji candidate list are for example configured to be realizable by slide gestures or flick gestures as illustrated in FIG. 30. In other words, in the case of this example, a conversion kanji candidate list is being displayed in a state wherein respective conversion kanji candidates are for example disposed vertically on a kana-kanji conversion takeover screen 1Ja. Then, in the case where for example a flick gesture is made in the direction of a finger contact point 10b from a finger contact point 10a as in FIG. 30, a mobile information device of the present embodiment scrolls the respective conversion kanji candidates in the upward direction on the screen. Obviously, in the case where a flick gesture is made in the opposite direction, the respective conversion kanji candidates scroll in the downward direction on the screen 1Ja. Herein, FIG. 31 illustrates an example after respective conversion kanji candidates have been scrolled by the flick gesture of the example in FIG. 30.

Also, a mobile information device of the present embodiment disposes within the kana-kanji conversion takeover screen 1Ja a character count reduction object 31 as an object for the user to issue instructions for adjusting the character count in the case where the readings of conversion candidates in the conversion kanji candidate list differ from a desired characters count. Consequently, a mobile information device of the present embodiment adjusts the conversion character count in the case where the character count reduction object 31 receives a tap gesture from the user because the readings of conversion candidates in the conversion kanji candidate list differ from a desired character count. Also, a mobile information device of the present embodiment disposes within the kana-kanji conversion takeover screen 1Ja an object with the characters "Back" displayed thereon as an object for the user to issue instructions for going back to the takeover mode screen 1J in the case where an insufficiency in the input characters, etc. occurs. Consequently, a mobile information device of the present embodiment goes back to the full screen takeover mode 1J in the case where the object with the characters "Back" displayed thereon receives a tap gesture from the user.

Also, in the present embodiment, the conversion kanji candidate list is configured such that for example a conversion kanji candidate corresponding to a given position in the screen 1Ja is distinguishable from other candidates by a different size and color, or by having a given mark, etc. attached thereto. In the case where the conversion kanji candidate displayed at the given position is changed due to the above scrolling being performed, that conversion kanji candidate is made to be distinguishable from other candidates. Herein, the approximate center position of the screen, etc. can be given as an example of the given position, but obviously another position may be used, and in addition, the position may be appropriately changed by the user. A conversion kanji candidate being displayed at the given position indicates that it has become a selectable candidate at that time.

Figure 32:
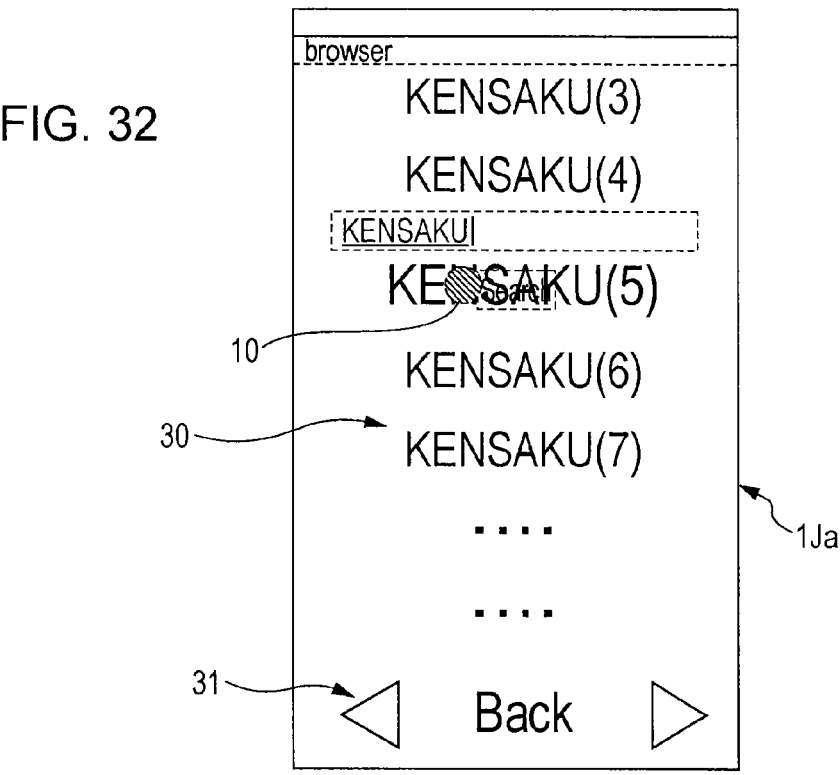
FIG. 32 is a diagram that illustrates how the user's finger contacts a touch panel at a position corresponding to a user-desired conversion kanji candidate from a conversion kanji candidate list.
Figure 33:
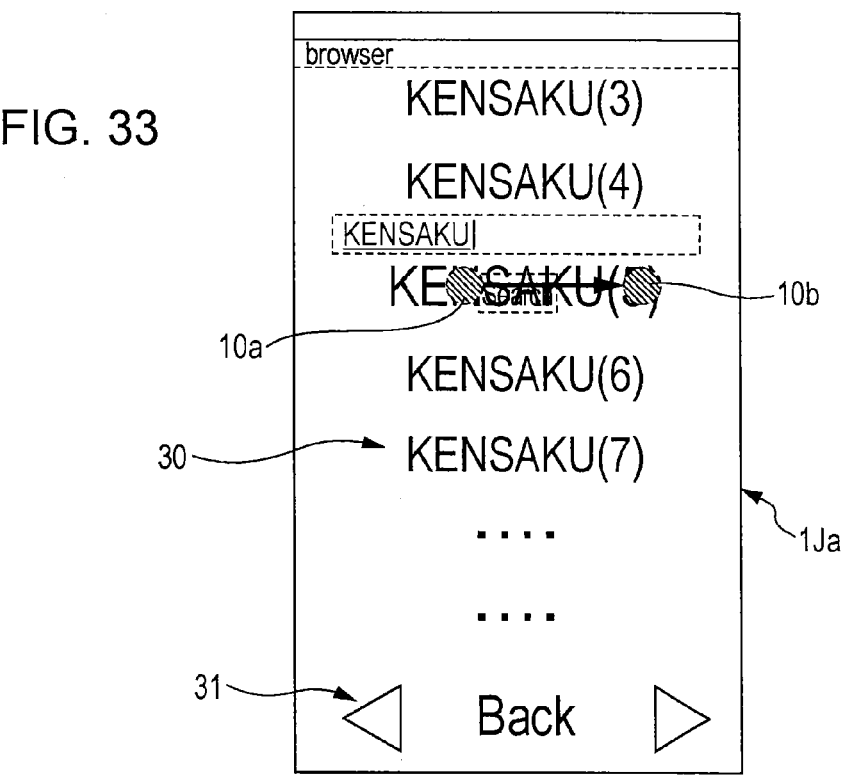
FIG. 33 is a diagram that illustrates how the user conducts a flick gesture at a position corresponding to a user-desired conversion kanji candidate from a conversion kanji candidate list.

Then, in the case where for example the user's finger contacts a position on the touch panel corresponding to a conversion kanji candidate being displayed at the given position as illustrated in FIG. 33, and additionally where for example a flick gesture is conducted in a direction cutting across that conversion kanji candidate, a mobile information device of the present embodiment determines that that conversion kanji candidate has been selected by the user. Herein, the finger contact points 10, 10a, 10b, and the arrow pointing from the finger contact point 10 to 10b in FIG. 32 and FIG. 33 are similar to that discussed earlier.

Figure 34:
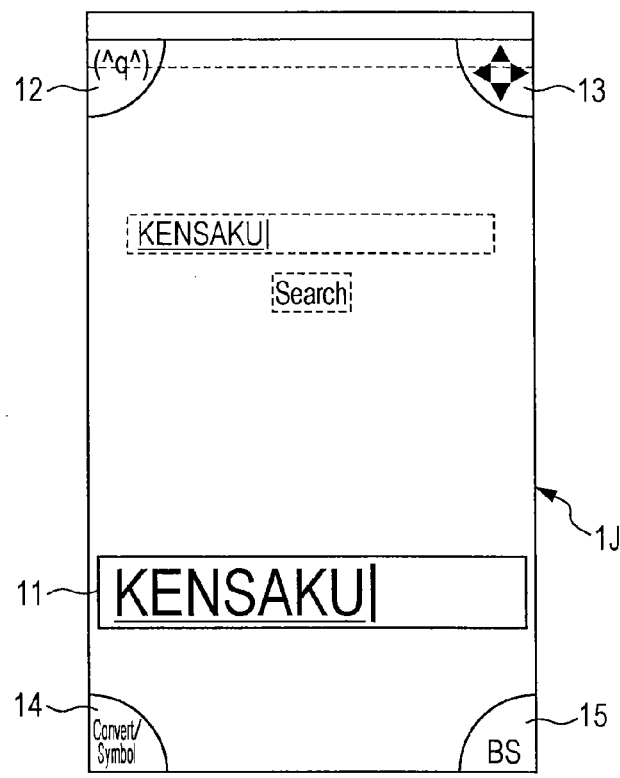
FIG. 34 is a diagram that illustrates a state wherein the characters "KENSAKU" are displayed in a current input text display area and a text box due to a user-desired conversion kanji candidate being selected from a conversion kanji candidate list.

If a conversion kanji candidate is selected by the user as discussed above, a mobile information device inputs that selected conversion kanji candidate into the current input text display area 11 and text box 2 as a kanji conversion of the hiragana characters, as illustrated in FIG. 34. Also, a mobile information device at this time goes back to the full screen takeover mode 1J.

After the input of the characters "KENSAKU" is finished, the characters "suru" are input similarly to that discussed earlier. In so doing, the characters "KENSAKU suru" are input into a current input text display area 11 and a text box 2, as illustrated in FIG. 35.

Figure 35:
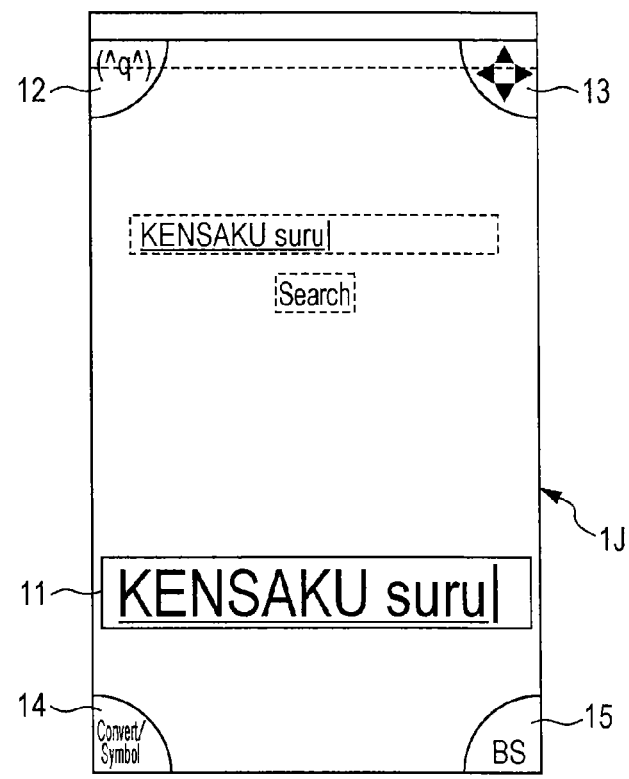
FIG. 35 is a diagram that illustrates a state wherein the characters "KENSAKU suru" are displayed in a current text display area and a text box during a Japanese character input mode.

After the input of all user-desired characters has finished as illustrated in the above FIG. 35, if the user performs a press operation on a physical "Back" key of the key operation unit 119, then a mobile information device of the present embodiment cancels the full screen takeover mode, and transitions to a browser screen mode. The browser screen mode at this time is in a state wherein the input of the characters "KENSAKU suru" into the text box 2 has completed. Consequently, if for example the search button 3 receives a tap gesture, etc. while in this state, a mobile information device of the present embodiment executes a web search, etc. in the browser screen, taking the above "KENSAKU suru" as the search keyword.

A detailed process flow for realizing Japanese character input as discussed above in a mobile information device of the present embodiment will be given later.

(Exemplary Numeral Input)

In the case of an information input technique of the present embodiment, numeral input is realized by for example one tap gesture and one flick gesture per numeral.

Herein, an example will be described for inputting numerals into a text box 2 as discussed earlier.

Figure 36:
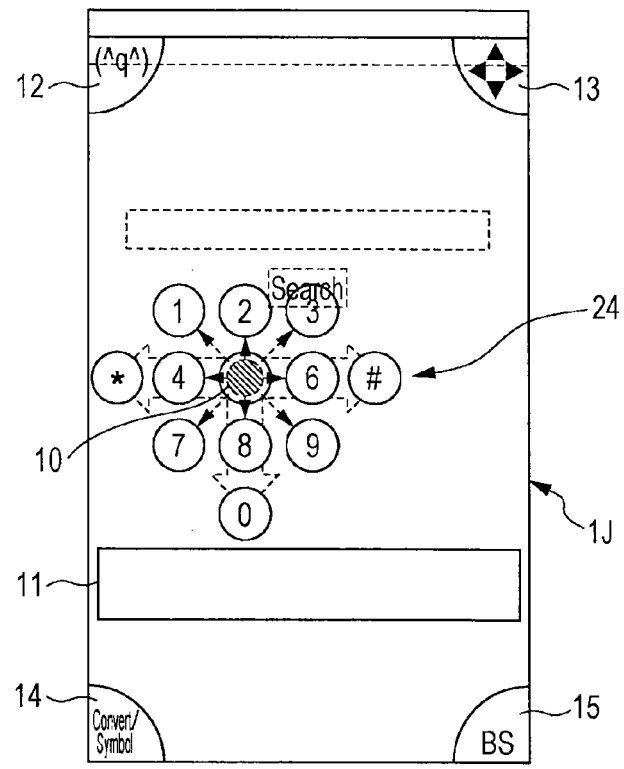
FIG. 36 is a diagram used to explain the position of a finger contact point when the user contacts his or her finger with a desired position, as well as a numeral object group and flick directions corresponding to that position during a numeral input mode.

If the user's finger, etc. touches a desired position on the touch panel after transitioning to a full screen takeover mode as discussed earlier in the case where the character input mode is configured to be a numeral input mode, a mobile information device causes a numeral object group 24 to be displayed on the takeover mode screen 1J as illustrated in FIG. 36. Herein, the finger contact point 10 in FIG. 36 is similar to that discussed earlier.

In the present embodiment, the numeral object group 24 illustrated in FIG. 36 is a group of objects corresponding to the respective numerals "1", "2", "3", "4", "5", "6", "7", "8", "9", "0", and for example the two symbols "*" and "#" (these are collectively designated numeral objects), which are disposed on the basis of what is called a keypad layout, for example. The group object positioned at the center of the keypad layout is positioned to correspond with the position of the finger contact point 10. Also, in the numeral object group 24, arrow objects similar to that discussed earlier are drawn from the character object at the finger contact point 10 position (the center of the keypad layout) to the other respective character objects. Like that discussed earlier, the arrow directions of these respective arrow objects are made to be indicators for informing the user of a flick direction when performing a flick gesture from the finger contact point 10 position (the center of the keypad layout).

Herein, in the example in FIG. 36, numerals and symbols are assigned to respective numeral objects, but obviously these assignments are an example, and the assignments may be changed as discussed earlier, and other characters and symbols, other symbols, etc. may also be assigned as function information. Also, the numeral object group 24 may also not be displayed in cases such as when the user has mostly memorized the assignments of numerals, etc. to each numeral object. Furthermore, the display and non-display of the numeral object group 24 may also be appropriately switched according to an arbitrary setting by the user, for example.

If for example the user performs a flick gesture toward the disposed direction of a desired numeral while in a state wherein respective numerals, etc. are assigned to respective numeral objects in the numeral object group 24 as illustrated in the above FIG. 36, a mobile information device of the present embodiment determines that the numeral, etc. in the direction of that flick gesture has been selected by the user. Then, when a user-desired numeral is selected, a mobile information device of the present embodiment inputs the selected numeral, etc. into the text box 2, etc.

A detailed process flow for realizing numeral input as discussed above in a mobile information device of the present embodiment will be given later.

(Exemplary Menu Operation)

In an information input technique of the present embodiment, selection operations for tiered menu items, for example, are made to be realizable by for example one tap gesture and two flick gestures, excluding some exceptions. In the examples hereinafter, an example is given wherein the menu tiers have two tiers, but menu tiers in the present embodiment may also be made to have three tiers or a greater number of tiers.

Figure 41:
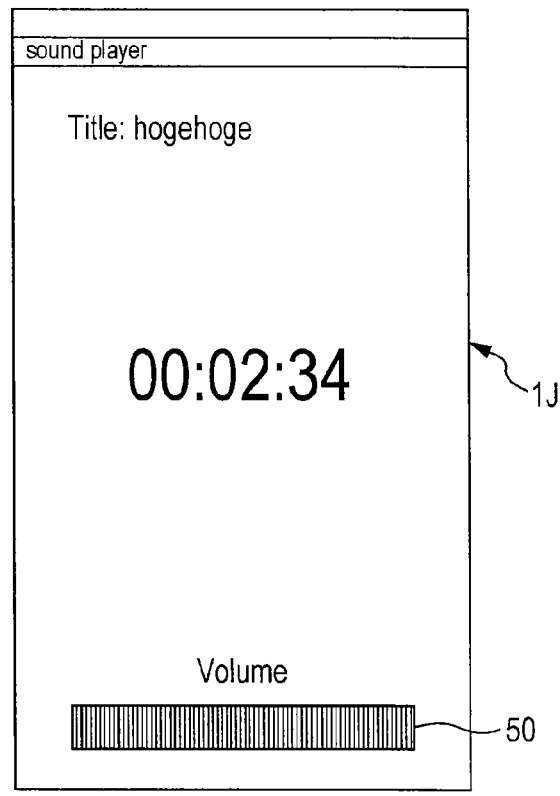
FIG. 41 is a diagram that illustrates a state wherein a bar object is displayed on a takeover mode screen after a volume control menu group is selected by the user during a music playback mode.
Figure 42:
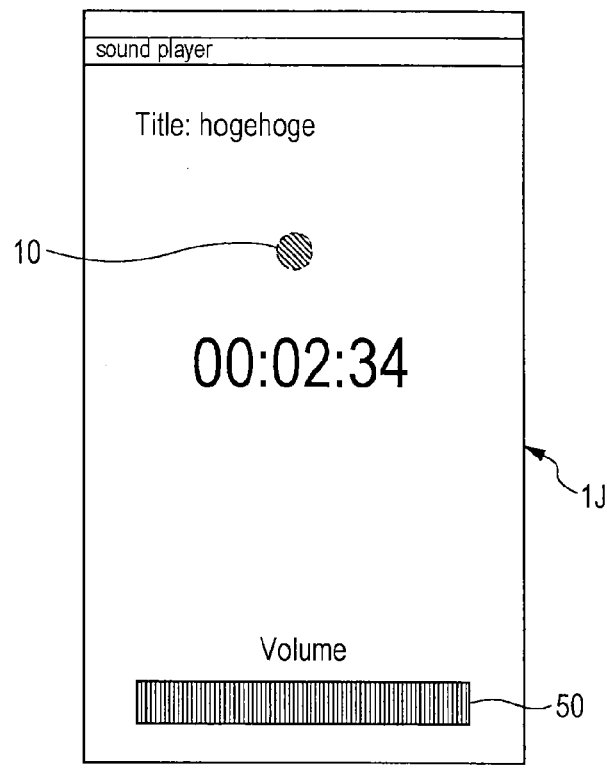
FIG. 42 is a diagram that illustrates the position of a finger contact point when the user contacts his or her finger with a desired position after a volume control menu group is selected during a music playback mode.
Figure 43:
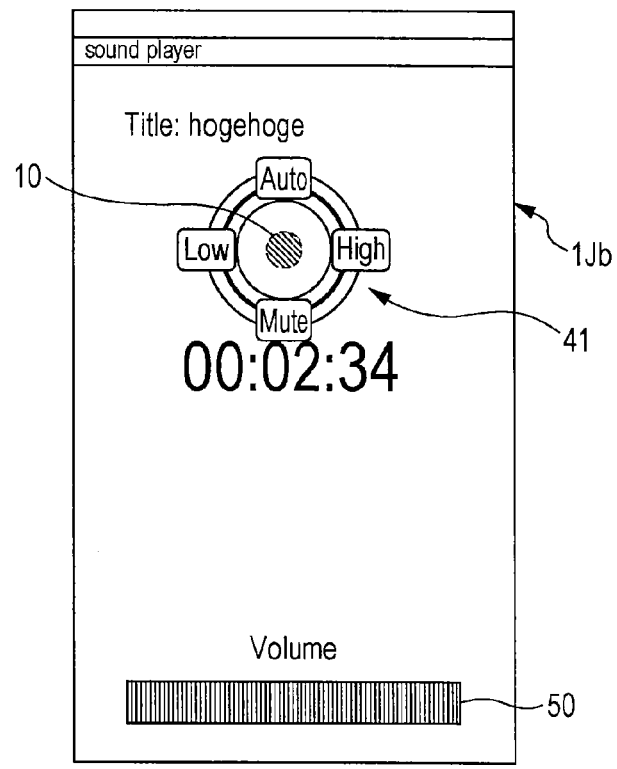
FIG. 43 is a diagram used to explain the position of a finger contact point when the user contacts his or her finger with a desired position, as well as a menu object group and flick directions corresponding to that position after a volume control menu group is selected during a music playback mode.
Figure 44:
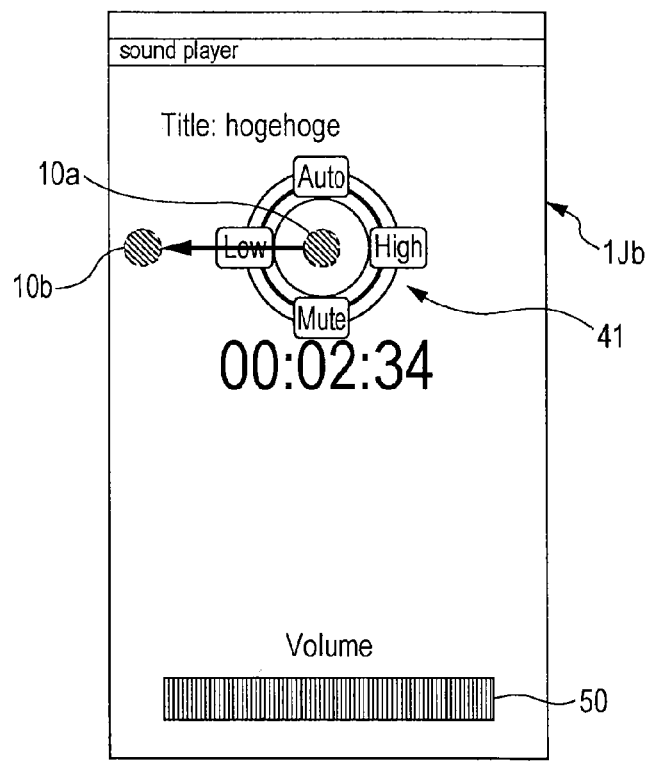
FIG. 44 is a diagram used to explain how a "Low" volume menu item is selected from among volume control menu items during a music playback mode.
Figure 45:
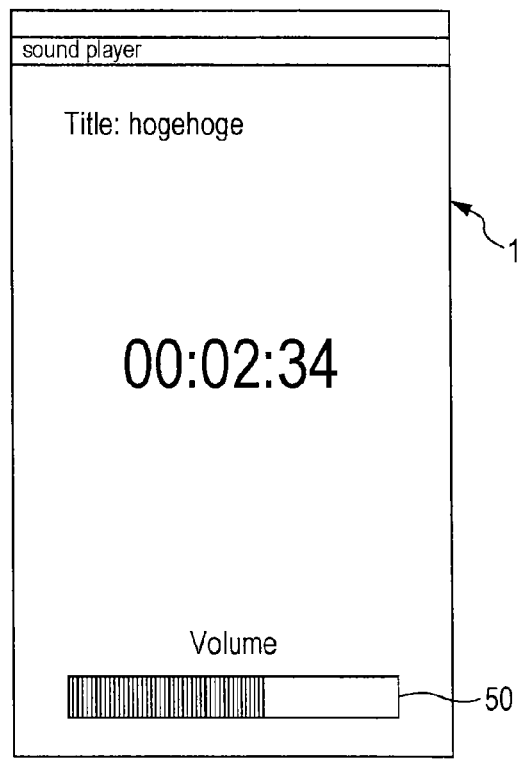
FIG. 45 is a diagram that illustrates a state wherein a bar object is displayed on a takeover mode screen after a "Low" volume menu item is selected from among volume control menu items during a music playback mode.

FIGS. 37 to 45 illustrate exemplary gesture operations on a touch panel and exemplary screen transitions when selecting menu items, taking menu items during a music playback mode as an example of menu selection operations in the case where the menu tiers consist of two tiers. Herein, in the description hereinafter, respective exemplary menu items like those illustrated in FIGS. 39 and 40 and in FIGS. 43 and 44 are given as an example of tiered menu items during a music playback mode, but the present embodiment is obviously not limited to this example. Also, in the example hereinafter, menu items and exemplary selection operations therefor during a music playback mode are given, but the present embodiment is not limited to this example, and it is needless to say that the present embodiment is applicable to various menu items and selection operations therefor which are usable on a mobile information device.

Figure 37:
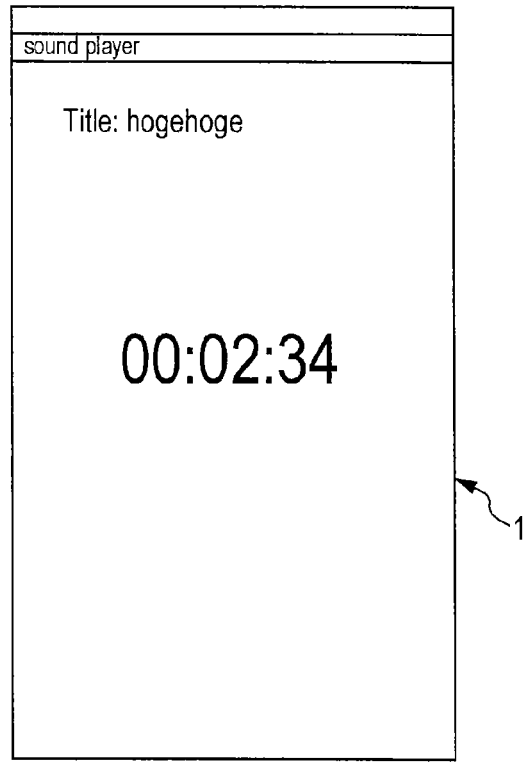
FIG. 37 is a diagram that illustrates an example wherein a mobile information device of the present embodiment has entered a music playback mode, and wherein the currently playing song title and playback time are displayed on a display screen.

FIG. 37 illustrates an example wherein a mobile information device of the present embodiment has entered a music playback mode, and wherein the currently playing song title and playback time are displayed on a display screen 1.

Figure 38:
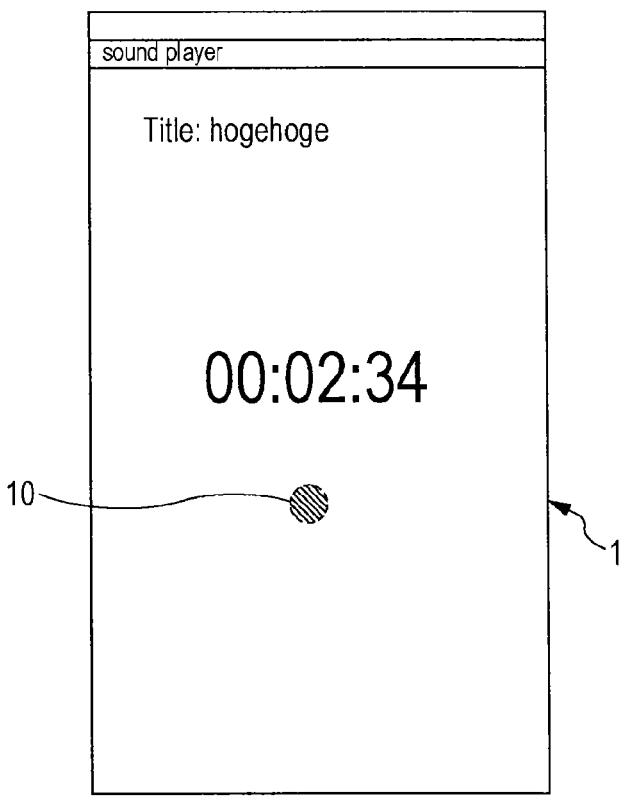
FIG. 38 is a diagram that illustrates the position of a finger contact point when the user contacts his or her finger with a desired position during a music playback mode.

If for example a desired position on a touch panel is tapped by the user as illustrated in FIG. 38 in the case where a mobile information device has entered a music playback mode, a mobile information device of the present embodiment displays various playback control items during the music playback on the display screen as respective menu items, while also transitioning to a full screen takeover mode such that these menu items enter a state of being selectable by the user's gesture operations. Then, in the case of a full screen takeover mode during the music playback, a mobile information device of the present embodiment displays a takeover mode screen 1Jb like that illustrated in FIG. 39. Herein, in the case of this example, music playback is executed in the background. Also, in the examples in FIG. 38 and FIG. 39, the finger contact point 10 is similar to that discussed earlier.

Figure 39:
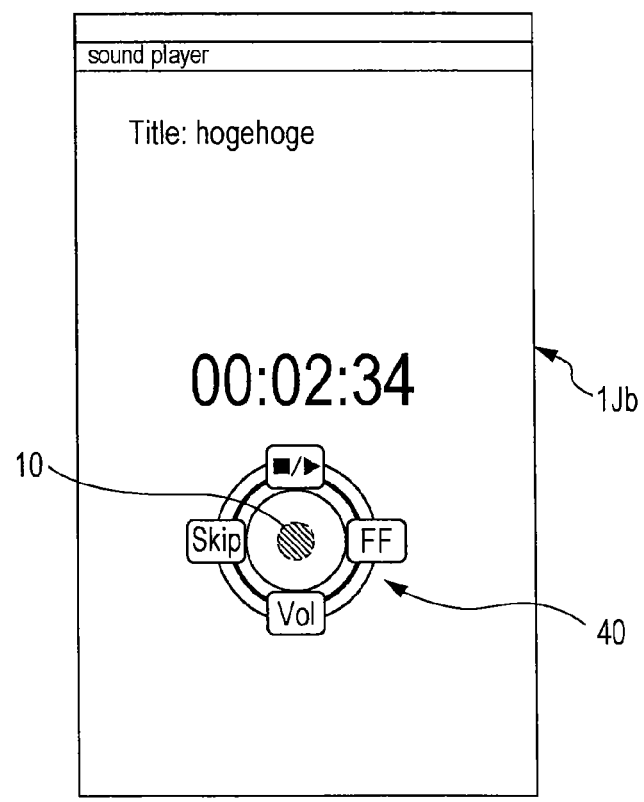
FIG. 39 is a diagram used to explain the position of a finger contact point when the user contacts his or her finger with a desired position, as well as a menu group object group and flick directions corresponding to that position during a music playback mode.

As an example herein, a group object group 40 like that illustrated in FIG. 39 is disposed on the takeover mode screen 1Jb in the case of the present embodiment.

The group object group 40 exemplified in FIG. 39 is made to be a group of group objects respectively representing groups in which respective menu items for various user-operable playback controls during music playback are tiered (hereinafter designated menu groups), the group objects being disposed for example on the circumference of concentric circles centered on a finger contact point 10. Obviously, the group object group 40 illustrated in FIG. 39 is merely an example, and respective group objects may also be disposed at positions based on a keypad layout as discussed earlier, for example. Also, in the case of the group object group 40 in FIG. 39, arrow objects, etc. pointing from the finger contact point 10 to the respective group objects are not drawn, but arrow objects may also be drawn as indicators for flick gestures, similarly to that discussed earlier.

In the case of the example in FIG. 39, the respective group objects constituting the group object group 40 include, as an example, a group object corresponding to a menu group for volume control, a group object corresponding to a menu group for skip control, a group object corresponding to a menu group for fast forward control, and a group object corresponding to a menu group for stop/play control. In other words, these menu groups are made to be groups of music playback control functions collected per category.

Assigned to the volume control menu group is for example a two-tier menu item with a menu item representing operations corresponding to volume control, and underneath it menu items for arbitrarily raising/lowering the volume during music playback. Assigned to the skip control menu group is for example a two-tier menu item with a menu item representing operations corresponding to skip control, and underneath it menu items, etc. for selecting play first, play from beginning, skip, random, etc., for example. Assigned to the fast forward control menu group is for example a two-tier menu item with a menu item representing operations corresponding to fast forward control, and underneath it menu items, etc. for selecting frame step back, rewind, fast forward, frame step forward, etc., for example. Assigned to the stop/play control menu group is for example a two-tier menu item with a menu item representing operations corresponding to stop/play control, and underneath it menu items, etc. for selecting stop and play, pause, off, etc., for example. In other words, these menu items are made to correspond to respective adjustment items in the category of the previously selected control function.

Furthermore, in this example in FIG. 39, the volume control menu group is disposed on the circumference of concentric circles centered on the finger contact point 10 in the downward direction of the finger contact point 10. Similarly, the skip control menu group is disposed on the circumference of the concentric circles in the left horizontal direction of the finger contact point 10. The stop/play control menu group is disposed on the circumference of the concentric circles in the upward direction of the finger contact point 10. The fast forward control menu group is disposed on the circumference of the concentric circles in the right horizontal direction of the finger contact point 10.

Herein, in this example, and similarly to that discussed earlier, it is also possible to provide a group object not assigned with a menu group in advance, and appropriately assign a user-desired menu group to that group object as function information, for example. Also, it is configured such that even group objects already assigned with a menu group can have their respective menu group assignments appropriately changed to other menu groups or other functions.

Also, in this example, and similarly to that discussed earlier, it is illustrated how a group object group 40 is displayed on a takeover mode screen 1Jb, but the group object group 40 may also not be displayed in cases such as when the user has memorized the positional relationships of the respective group objects and the assignments between each group object and menu group, for example. Also, in the present embodiment, the display and non-display of the group object group 40 may also be appropriately switched according to an arbitrary setting by the user, for example.

Figure 40:
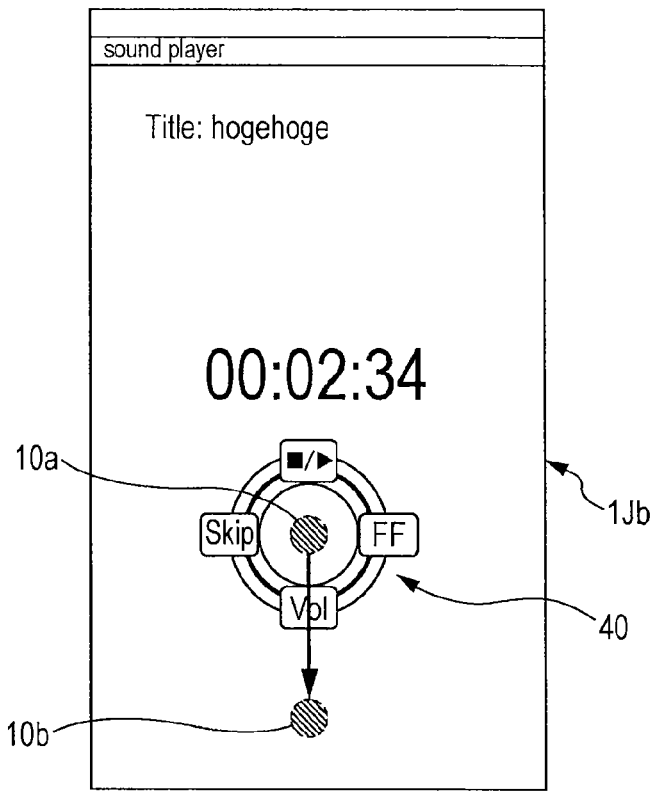
FIG. 40 is a diagram used to explain how a desired menu group is selected by the user by means of a flick gesture during a music playback mode.

Next, if a flick gesture is conducted toward the disposed direction of a user-desired menu group while in a state wherein respective menu groups are assigned on the circumference of concentric circles centered on the finger contact point 10 as illustrated in FIG. 30 discussed above, a mobile information device of the present embodiment determines that the menu group in the direction of that flick gesture has been selected by the user. Herein, in the case where volume adjustment is performed, for example, the flick gesture direction at this time becomes the downward direction from the finger contact point 10 as illustrated in FIG. 40, and thus the menu group corresponding to the volume control item is selected. Herein, in this example in FIG. 40, the finger contact points 10a and 10b in the drawing are similar to that discussed earlier.

If a user-desired menu group is selected as in the above FIG. 40, a mobile information device of the present embodiment goes back to a takeover mode screen 1Jb like that illustrated in FIG. 41, and in a state wherein the menu group selected by the user is remembered.

Also, in the case where a user-desired menu group is selected from the group object group 40, a mobile information device of the present embodiment is also made to be capable of displaying a given object related to the selected menu group on a takeover mode screen 1Jb. Herein, in the case where the volume control menu group from the group object group as in the example discussed above, a mobile information device is made to be capable of displaying for example a bar object 50 representing the volume as the given object related to volume control, as illustrated in FIG. 41.

Next, if for example the user's finger, etc. contacts a desired position on the touch panel as illustrated in FIG. 42 in the case where the volume control menu group has been selected, a mobile information device of the present embodiment causes a volume adjustment-related menu object group 41 like that illustrated in FIG. 43 to be displayed on the takeover mode screen 1Jb. Herein, in these examples in FIG. 42 and FIG. 43, the finger contact point 10 is similar to that discussed earlier.

In the present embodiment, the menu object group 41 illustrated in FIG. 43 is made to be a group of objects corresponding to respective menus belonging to the previously selected menu group for volume control, the objects being disposed on the circumference of concentric circles centered on a finger contact point 10 similarly to that discussed earlier. Herein, the menu object group 41 illustrated in FIG. 43 is merely an example, and respective menu objects may also be disposed at positions based on the above-discussed keyboard layout, for example. Also, in the case of the menu object group 41 in FIG. 43, arrow objects, etc. pointing from the finger contact point 10 to the respective menu objects are not drawn, but arrow objects may also be drawn as indicators for flick gestures, similarly to that discussed earlier.

In the case of the example in FIG. 43, the respective menu objects constituting the menu object group 41 include, as an example, a menu object corresponding to a "Low" volume menu item, a menu object corresponding to a "High" volume menu item, a menu object corresponding to a "Mute" volume menu item, and a menu object corresponding to an "Auto" volume menu item.

In other words, in this example in FIG. 43, a menu item for raising the volume is assigned to the "High" volume menu object, and a menu item for lowering the volume is assigned to the "Low" volume menu object. A menu item for turning on/off a volume mute function is assigned to the "Mute" volume menu object. A menu item for turning on/off a function that automatically adjusts the volume according to for example the external volume is assigned to the "Auto" volume menu object.

Then, if for example the user performs a flick gesture toward the disposed direction of a desired menu item while in a state wherein respective menu items are assigned on the circumference of concentric circles centered on a finger contact point 10 as in the above menu object group 41, a mobile information device of the present embodiment determines that the menu item in the direction of that flick direction has been selected by the user. For example, in the case where a flick gesture is made in the disposed direction of a menu object assigned with the "Low" volume menu item as illustrated in FIG. 44, a mobile information device of the present embodiment adjusts the volume in the direction of lower volume. Herein, the finger contact points 10a and 10b and the arrow linking them in FIG. 44 are similar to that discussed earlier.

After that, a mobile information device of the present embodiment causes the bar object 50 representing the volume to change to a display representing the volume level after the volume was lowered, while also going back to a takeover mode screen 1Jb.

Meanwhile, in the case where for example the "High" volume menu object is selected from the menu object group 41, a mobile information device of the present embodiment adjusts the volume in the direction of higher volume, while also causing the bar object 50 to change to a display representing the volume level after the volume was raised. As another example, in the case where the "Mute" volume menu object is selected from the menu object group 41, a mobile information device of the present embodiment adjusts the "Mute" volume on if for example the "Mute" volume was in an off state in its previous state, and in contrast, adjusts the "Mute" volume off if for example the "Mute" volume was in an on state in its previous state. As another example, in the case where the "Auto" volume menu object is selected from the menu object group 41, a mobile information device of the present embodiment adjusts the "Auto" volume on if for example the "Auto" volume was in an off state in its previous state, and in contrast, adjusts the "Auto" volume off if for example the "Auto" volume was in an on state in its previous state.

Besides the above, in the case where for example a fast forward control menu group is selected by the user from the group object group 40 illustrated in FIG. 39 discussed above, a menu object corresponding to a double speed fast forward menu item, a menu object corresponding to a triple speed fast forward menu item, respective menu objects corresponding to respective fast forward menu items even faster than the above, a menu object corresponding to a single speed rewind menu item, a menu object corresponding to a double speed rewind menu item, a menu object corresponding to respective rewind menu items even faster than the above, a menu object corresponding to a menu item for returning to single speed playback, etc. are for example disposed similarly to that discussed earlier as one example of a menu object group 41. Then, when the user selects a desired menu item from among the above with a flick gesture, a mobile information device of the present embodiment executes playback speed control according to the selected menu item. Herein, in the case where a playback speed adjustment is made in this way, given audio, etc. representing the playback speed may also be displayed on a takeover mode screen 1Jb.

Also, in the case where for example a skip control menu group is selected by the user from the group object group 40 illustrated in FIG. 39 discussed above, respective menu objects for play first, play from beginning, skip, random, etc. are for example disposed similarly to that discussed earlier as one example of a menu object group 41. Then, when the user selects a desired menu item from among the above with a flick gesture, a mobile information device of the present embodiment executes playback according to the selected menu item. Herein, in the case where a skip adjustment is made in this way, given audio, etc. representing the skip state may also be displayed on a takeover mode screen 1Jb.

Also, in the case where for example a stop/play control menu group is selected by the user from the group object group 40 illustrated in FIG. 39 discussed above, a menu object corresponding to a stop playback menu item, a menu object corresponding to a start playback menu item, a menu object corresponding to a pause menu item, a menu object corresponding to a cancel pause (off) menu item, etc. are for example disposed similarly to that discussed earlier as one example of a menu object group 41. Then, when the user selects a desired menu item from among the above with a flick gesture, a mobile information device of the present embodiment executes playback control according to the selected menu item. Herein, in the case where stop/play control is made in this way, given audio, etc. representing the stop/play control state may also be displayed on a takeover mode screen 1Jb.

A more detailed process flow, etc. for realizing menu operations like those discussed above will be given later.
(Exemplary Information Search Using a Phone Book)

In an information input technique of the present embodiment, information input operations for searching information stored inside a desired information storage unit such as for example an address book, phone book, etc. is realizable by for example at least one tap gesture and one flick gesture, excluding some exceptions.

Herein, in the description hereinafter, an example is given wherein the desired information storage unit is made to be a phone book inside a mobile information device, and wherein registered information (records) from that phone book is searched. Also, in the example hereinafter, an example is given wherein a name from the phone book is searched for, with the characters "KUSANO" taken as the search keyword as an example. Obviously, it is needless to say that information searching in the present embodiment is also applicable to the searching of information stored in various other information storage units.

FIGS. 46 to 55 illustrate exemplary gesture operations and exemplary screen transitions when searching for the registered information "KUSANO" from a phone book as an example. Herein, in the present embodiment, the operational mode of a mobile information device at this time is made to be an information search mode, and a phone book is made to be the search target in this information search mode.

Figure 46:
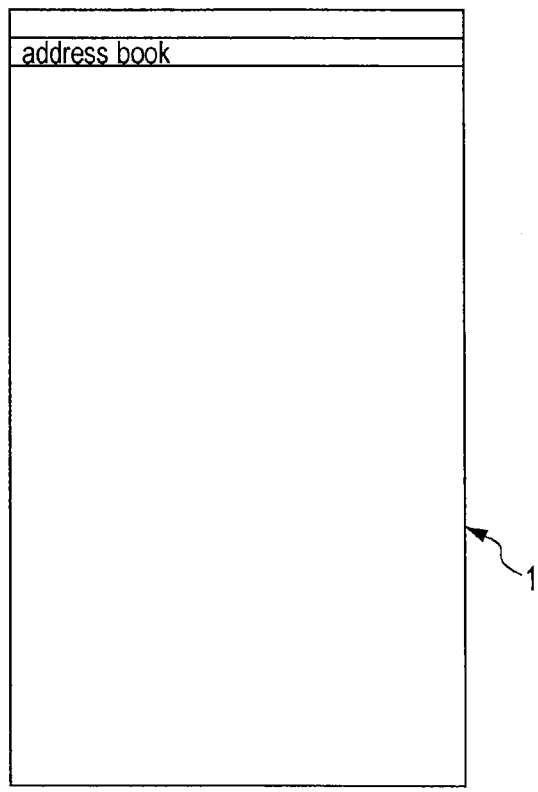
FIG. 46 illustrates an exemplary display screen during an information search mode for the case wherein the search target is set to a phone book.

FIG. 46 illustrates an exemplary display screen in the case where a mobile information device of the present embodiment has entered an information search mode and where the search target is set to a phone book.

Figure 47:
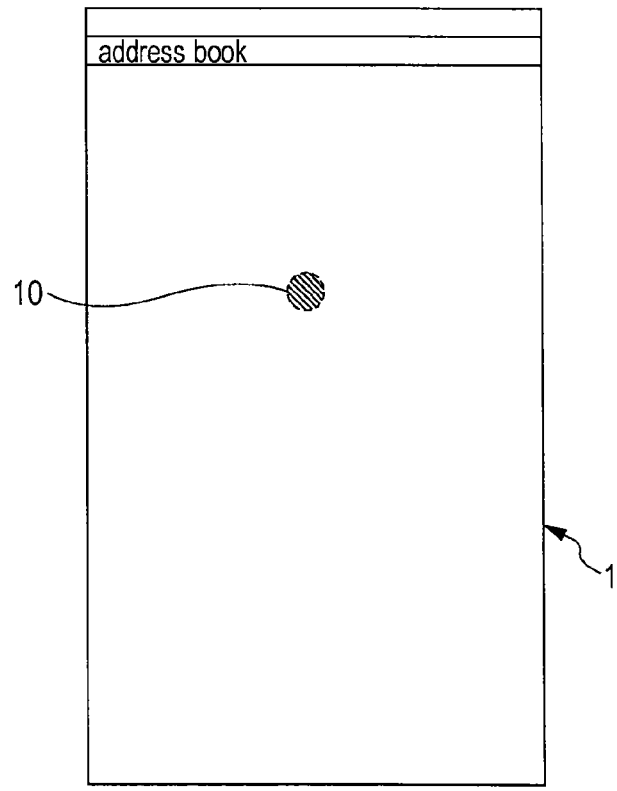
FIG. 47 is a diagram that illustrates the position of a finger contact point when the user contacts his or her finger with a desired position during an information search mode.

If for example a desired position on the touch panel is tapped by the user as illustrated in FIG. 47 in the case where a mobile information device has entered an information search mode that searches for registered information from a phone book, a mobile information device of the present embodiment transitions to a full screen takeover mode similar to the exemplary operation during character input in the Japanese character input mode discussed earlier. Herein, the takeover mode screen 1Jc in the case of this example is not provided with the function areas 12 to 15 discussed earlier, but obviously those function areas 12 to 15 may also be disposed.

Figure 48:
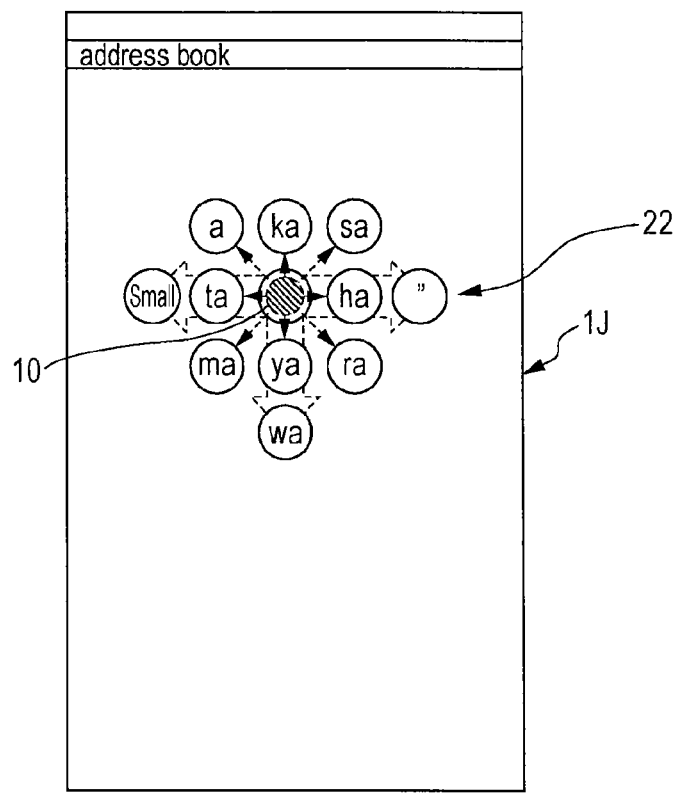
FIG. 48 is a diagram used to explain the position of a finger contact point when the user contacts his or her finger with a desired position, as well as a group object group and flick directions corresponding to that position during an information search mode.
Figure 49:
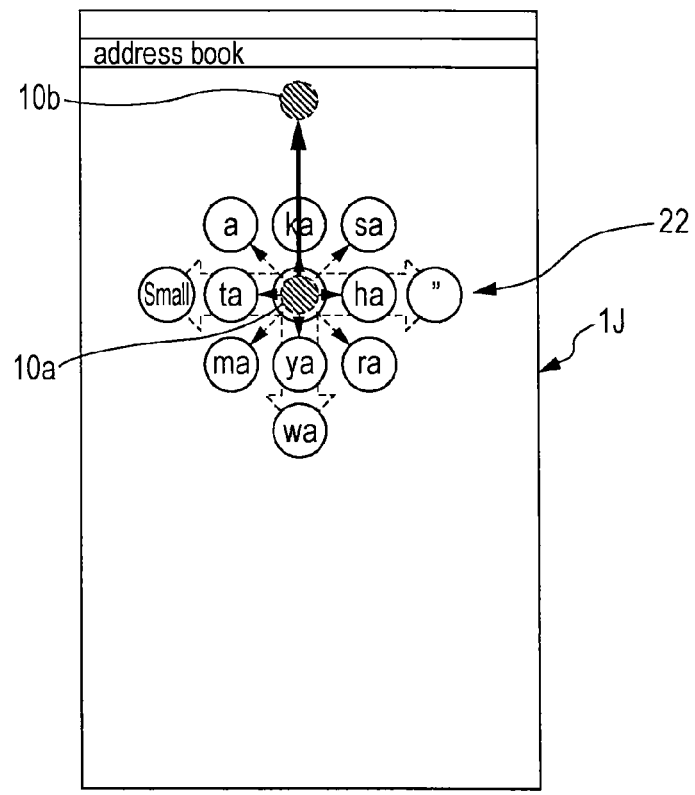
FIG. 49 is a diagram used to explain how a desired group object is selected by the user by means of a flick gesture during an information search mode.

If the user's finger, etc. contacts a desired position on the touch panel as illustrated in FIG. 47 after transitioning to a full screen takeover mode in the information search mode, a mobile information device causes a group object group 22 similar to that during Japanese input discussed earlier to be displayed on the takeover mode screen 1Jc, as illustrated in FIG. 48. Herein, the finger contact point 10 in FIG. 47 and FIG. 48 is similar to that discussed earlier. Also, similarly to that discussed earlier, the group object group 22 may also not be displayed in cases such as when the user has mostly memorized the positional relationships of the respective group objects, etc. Furthermore, in this example, and similarly to that discussed earlier, the display and non-display of the group object group 22 may also be appropriately switched according to an arbitrary setting by the user.

Next, if the user performs a flick gesture toward the disposed direction of also desired character group similarly to that discussed earlier while the group object group 22 is being displayed, a mobile information device of the present embodiment determines that the character group in the direction of that flick gesture has been selected by the user.

Herein, in the case of searching desired information from a desired information storage unit using for example a Japanese search keyword as in the present embodiment, the first flick gesture direction is made to be the direction selecting the character group of the consonant included in for example the first character of the character string constituting the search keyword. In other words, in the case where for example a registered name is searched from a phone book with "KUSANO" as the search keyword, the first flick gesture direction is first made to be the direction selecting the character group of the consonant "k" included in the first character "ku" of the hiragana reading "kusano" of the above "KUSANO". For this reason, the first flick gesture direction when inputting the above characters "KUSANO" is made to be the direction in which is disposed the character group of the consonant "k" included in the first character "ku" of the hiragana reading "kusano" of the above "KUSANO", or in other words the upward direction from the finger contact point 10, as illustrated by the example in FIG. 49.

Figure 50:
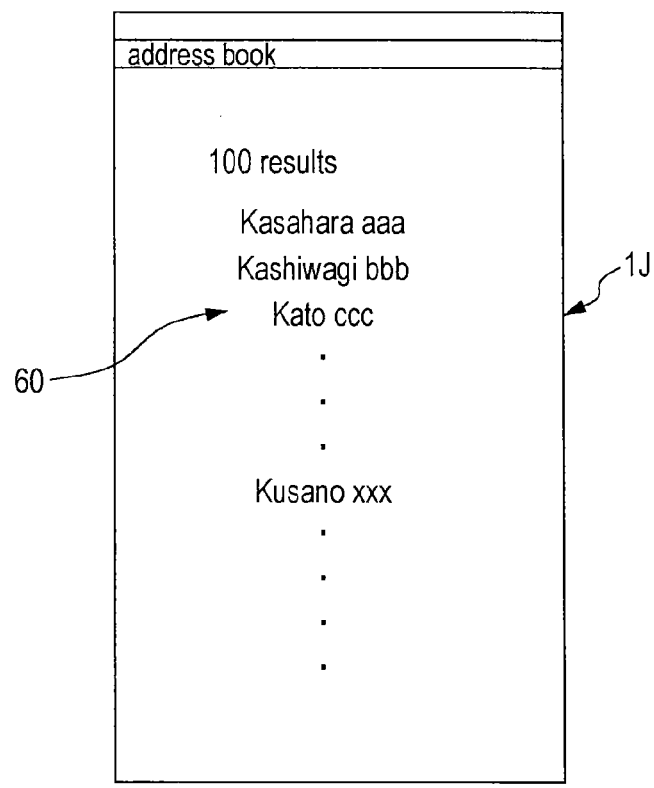
FIG. 50 is a diagram that illustrates an example wherein a search information list of registered names, etc. extracted from a phone book is displayed due to the consonant "k" being selected by the user during an information search mode.

If the character group of the consonant "k" is selected by a first flick gesture as described above, a mobile information device of the present embodiment extracts from a phone book a group of respectively registered names for which the consonant of the first character in the hiragana reading of the name registered in the phone book is the consonant "k", as illustrated in FIG. 50. Then, a mobile information device of the present embodiment displays on a takeover mode screen 1Jc a search information list (record list) 60 consisting of the registered name group extracted from the phone book. Herein, in the case where there is one registered name in the search information list 60 at this time, and when that registered name is the above "KUSANO", a phone book search taking "KUSANO" as the search keyword is terminated. A mobile information device of the present embodiment may also display information registered in a phone book in association with the name "KUSANO" (phone number, address, and other information, for example) on a display screen when the touch panel is for example tapped corresponding to where the above "KUSANO" is being displayed when a phone book search has finished is tapped.

Figure 51:
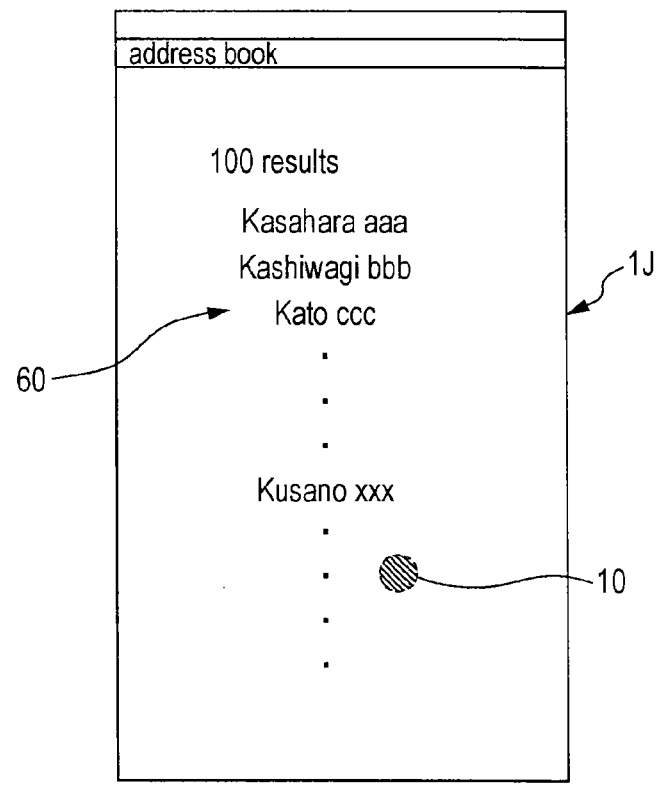
FIG. 51 is a diagram that illustrates the position of a finger contact point when the user contacts his or her finger with a desired position on a display screen of a search information list of registered names, etc. extracted from a phone book on the basis of the consonant "k" during an information search mode.
Figure 52:
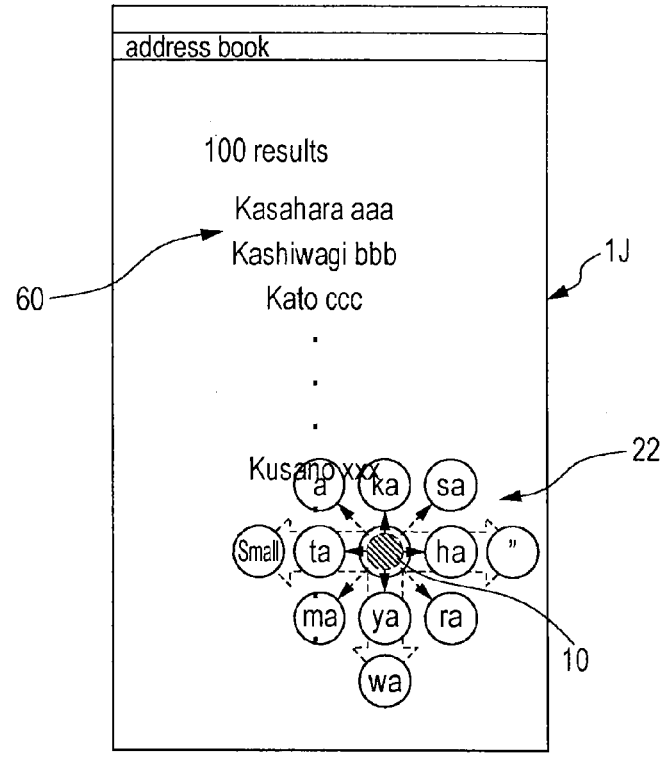
FIG. 52 is a diagram used to explain the position of a finger contact point when the user contacts his or her finger with a desired position, as well as a group object group and flick directions corresponding to that position on a display screen of a search information list based on the consonant "k" during an information search mode.
Figure 53:
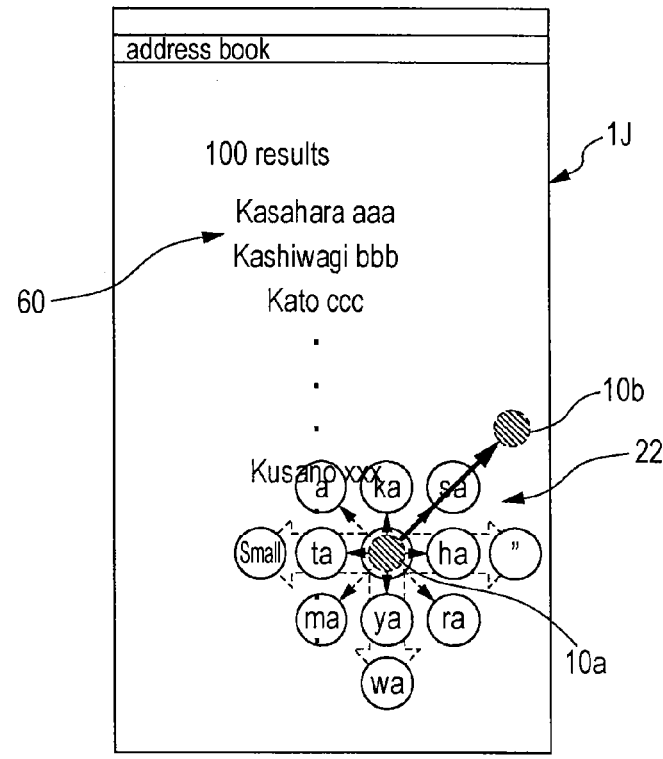
FIG. 53 is a diagram used to explain how a desired group object is selected by the user by means of a flick gesture on a display screen of a search information list based on the consonant "k" during an information search mode.

Next, if for example the user's finger, etc. additionally contacts a desired position on the touch panel as illustrated in FIG. 51 in the case where the search information list 60 comprises a plurality of names, etc., a mobile information device of the present embodiment causes a group object group 22 similar to FIG. 48 discussed earlier to be displayed on the takeover mode screen 1Jc, as illustrated in FIG. 52.

Then, if the user performs a flick gesture in the disposed direction of also desired character group similar to that discussed earlier while in a state wherein the search information list 60 and a group object group 22 is being displayed, a mobile information device of the present embodiment determines that the character group in the direction of that flick gesture has been selected by the user.

In this way, in the case where a flick gesture is additionally performed with respect to a group object group 22 while in a state wherein a search information list 60 has been obtained by a first information search, a mobile information device of the present embodiment executes processing to further refine the information from the search information list. In the present embodiment, a search that further refines information from a search information list obtained by a first information search is conducted by for example selecting the character group of the consonant included in the second character of the character string constituting the search keyword. In other words, in the case where for example the above "KUSANO" is made to be the search keyword, the second flick gesture direction is made to be the direction selecting the character group of the consonant "s" included in the second character "sa" of the hiragana reading "kusano" of "KUSANO". For this reason, the second flick gesture direction is made to be the direction in which is disposed the character group of the consonant "s" included in the second character "sa" of the hiragana reading "kusano" of the above "KUSANO", or in other words the direction approximately 45 degrees upward and to the right from the finger contact point 10, as illustrated by the example in FIG. 53.

Figure 54:
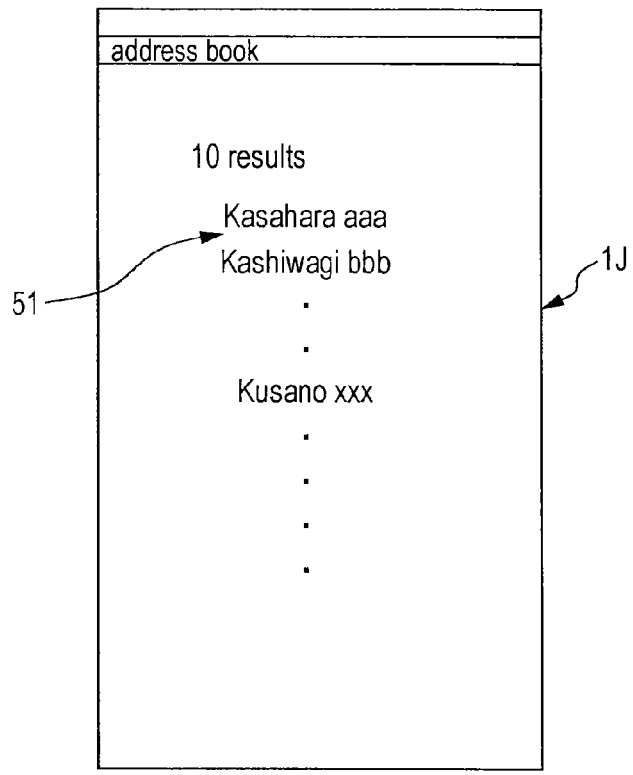
FIG. 54 is a diagram that illustrates an example wherein a search information list is displayed after the search is further refined due to the consonant "s" being additionally selected by a flick gesture on a display screen of a search information list based on the consonant "k" during an information search mode.

If the character group of the consonant "s" is selected by a second flick gesture as described above, a mobile information device of the present embodiment refines the search information list obtained by the first information search to a group of respectively registered names for which the consonant of the first character and the consonant of the second character in the hiragana reading of the name registered in the phone book are the consonant "k" and the consonant "s", respectively. Then, a mobile information device of the present embodiment displays on a takeover mode screen 1Jc a search information list 61 consisting of a name group refined from the search information list given by the first information search, or in other words a search information list given by the second information search, as illustrated in FIG. 54. In other words, during the information search, "consonant" selection in Japanese input is repeated, and refined searches are conducted so as to search for information that matches the sequence of these several selected "consonants".

Figure 55:
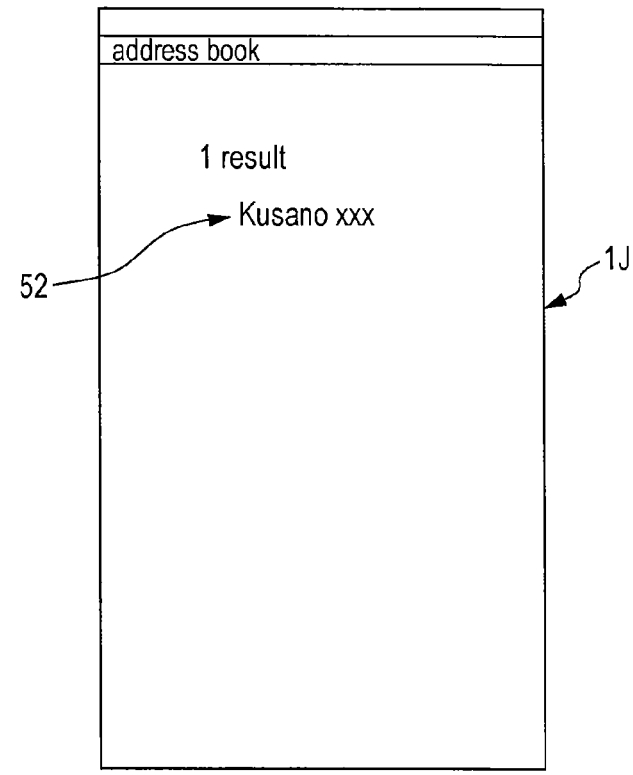
FIG. 55 is a diagram that illustrates an exemplary display when the search information becomes a single entry due to the search being further refined due to the consonant "n" being additionally selected by a flick gesture on a display screen of a search information list based on the consonant "k" and the consonant "s" during an information search mode.

Herein, since a plurality of names are still included in the information search list in the example in FIG. 54, refined searches are additionally conducted similarly to that discussed above. In other words, similarly to that discussed above, a tap gesture is performed, and the character group of the consonant "n" included in the third character "no" of the hiragana reading "kusano" of "KUSANO" is selected by a third flick gesture. In this way, if refined searches are additionally conducted on the search information list given by the second information search, a mobile information device of the present embodiment displays on a takeover mode screen 1Jc a search information list 62 where the registered name has become "KUSANO", as illustrated in FIG. 55. In so doing, a phone book search with the above "KUSANO" as the search keyword is ended. Then, similarly to that discussed above, a mobile information device of the present embodiment may also display information registered in a phone book in association with the name "KUSANO" (phone number, address, and other information) on a display screen in the case where the touch panel is for example tapped corresponding to where the above "KUSANO" is being displayed when a phone book search has finished.

A detailed process flow for realizing an information search like that discussed above in a mobile information device of the present embodiment will be given later.

(Information Input by Consecutive Flick Gestures)

Besides the examples of selecting desired characters and information by selection using several flick gestures as discussed above, a mobile information device of the present embodiment is also configured to enable similar selection of desired characters and information even in the case where for example several consecutive flick gestures are performed in a state wherein a finger, etc. is not released from a touch panel.

Figures 56, 57:
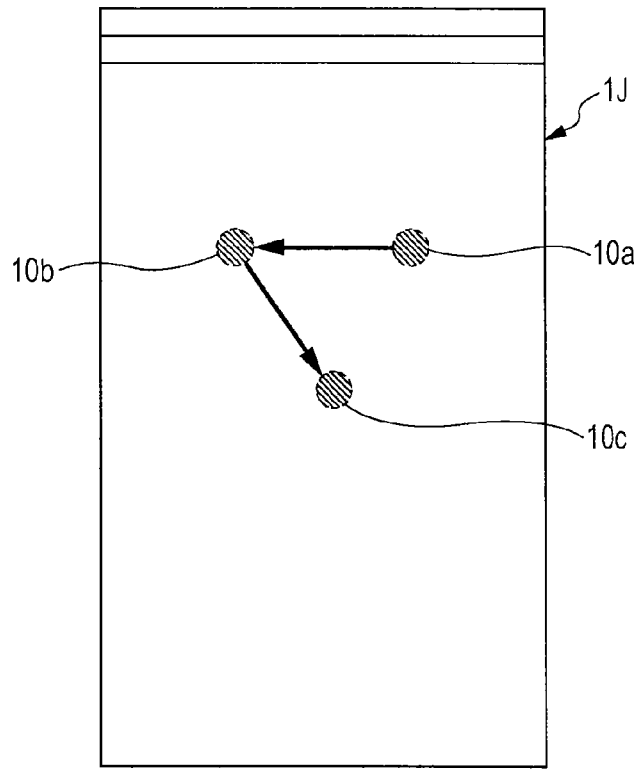
FIG. 56 is a diagram for explaining an example of consecutive flick gestures performed in a state wherein a finger is not released from a touch panel.
FIG. 57 is a diagram that illustrates an input event—input ID correspondence table for a mobile information device of the present embodiment to recognize tap gestures with respect to a touch panel and respective flick directions for flick gestures during respective character input modes.

FIG. 56 illustrates an example of flick gestures performed in a state wherein a finger is not released from a touch panel. Herein, the finger contact points 10a, 10b, and 10c in FIG. 56 are points for easily visualizing in the drawing the positions contacted by the user's finger, etc. on a display screen (on a touch panel), similarly to that discussed earlier.

This FIG. 56 illustrates an example wherein the user's finger, etc. at a desired position on a touch panel slides in the arrow direction extending from a finger contact point 10a to a finger contact point 10b while the user's finger is in a state of contact with the touch panel, and additionally, wherein the user's finger, etc. slides in the arrow direction extending from the finger contact point 10b to a finger contact point 10c while the user's finger is in a state of contact with the touch panel.

In other words, according to this example in FIG. 56, the arrow direction extending from the finger contact point 10a to the finger contact point 10b is input by the user, and subsequently, the arrow direction extending from the finger contact point 10*b* to the finger contact point 10*c* is input by the user. A mobile information device of the present embodiment in this case conducts for example group selection as discussed earlier according to the user input of the arrow direction extending from the finger contact point 10*a* to the finger contact point 10*b*, and conducts selection of information belonging to the previously selected group according to the subsequent user input of the arrow direction extending from the finger contact point 10*b* to the finger contact point 10*c*.

According to consecutive input like that illustrated in this FIG. 56, since group selection followed by information selection within the group becomes possible without releasing a finger from the touch panel, faster information input becomes possible. Herein, in this example in FIG. 56, object groups corresponding to a group and information within a group similar to that discussed earlier may also be displayed for example at the finger contact point 10*b*, in the vicinity of the finger contact point 10, etc.

Meanwhile, it is also possible to inform the user that a user operation has been received, etc. in an easily understandable way by conducting vibrator rumbling and changing the vibrator rumble pattern and type according to the particular stage of information input, etc. as feedback with respect to gesture operations from the user during various information input like that discussed above.

(Exemplary Correspondence Tables Between Character, Menu, Registered Information, Etc. and Flick Gesture Directions)

In order to realize processing for English character input, Japanese character input, numeral input, menu selection, information search, etc. as discussed above, a mobile information device of the present embodiment stores correspondence tables for respective character input modes like those described hereinafter in for example the memory unit 105 discussed earlier. Herein, the respective correspondence tables may be extracted into the memory unit 105 by activation of an information input control program of the present embodiment, or readied in the memory unit 105 in advance.

Figures 58, 59:
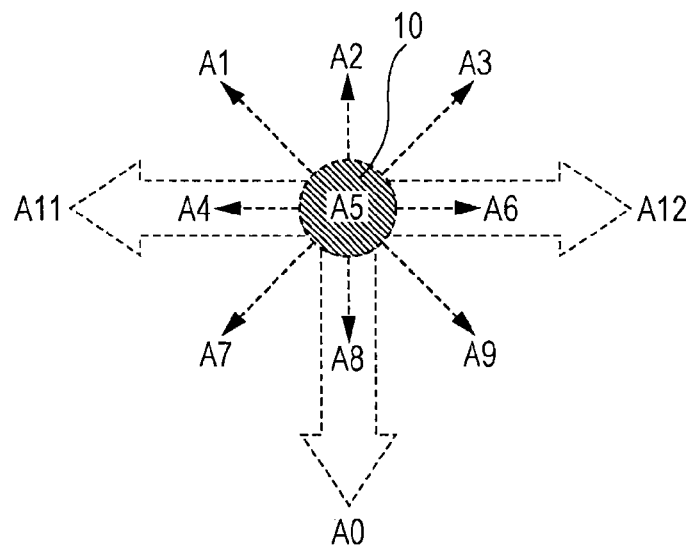
FIG. 58 is a visualization of flick directions corresponding to respective input IDs in FIG. 57.
FIG. 59 is a diagram that illustrates a correspondence table between input IDs and respective groups in an English character input mode.

FIG. 57 illustrates an input event—input ID correspondence table for a mobile information device of the present embodiment to recognize the above tap gestures with respect to a touch panel and respective flick directions for the above flick gestures during the respective character input modes discussed earlier. Meanwhile, FIG. 58 illustrates a diagram for visualizing directions corresponding to the input IDs in FIG. 57.

In the correspondence table in FIG. 57, the input events correspond to the tap gestures and the respective flick directions for the flick gestures. The input IDs are IDs individually assigned to each input event.

In other words, in the case where a gesture operation from the user is performed on the touch panel after transitioning to the full screen takeover mode, a mobile information device of the present embodiment determines which input event the gesture operation from the user was on the basis of the correspondence table illustrated in FIG. 57, and also recognizes the input ID corresponding to that input event.

Described specifically, in the case where a tap gesture is performed as an input event after transitioning to a full screen takeover mode, a mobile information device of the present embodiment references the input ID "5" corresponding to that input event from the correspondence table in FIG. 57. As illustrated in FIG. 58, the input ID "5" becomes the position of the finger contact point 10. As another example, in the case where a flick gesture is performed from the finger contact point 10 contacted by the user's finger on the touch panel toward the upper-left direction illustrated by the arrow A1 in FIG. 58 (in other words approximately 45 degrees upward and to the left), a mobile information device references the input ID "1" corresponding to the input event from the correspondence table in FIG. 57. As another example, in the case where a flick gesture is performed from the finger contact point 10 toward the upward direction illustrated by the arrow A2 in FIG. 58, a mobile information device references the input ID "2" corresponding to that input event from the correspondence table. Also, in the case where a flick gesture is performed from the finger contact point 10 toward the upper-right direction illustrated by the arrow A3 in FIG. 58 (in other words approximately 45 degrees upward and to the right), a mobile information device references the input ID "3" corresponding to that input event from the correspondence table. Similarly, a mobile information device of the present embodiment respectively references the input ID "4" at the time of an input event for a flick gesture in the left direction illustrated by the arrow A4 in FIG. 58 (left horizontal direction), the input ID "6" at the time of an input event for a flick gesture in the right direction illustrated by the arrow A6 in FIG. 58 (right horizontal direction), the input ID "7" at the time of an input event for a flick gesture in the lower-left direction illustrated by the arrow A7 in FIG. 58 (approximately 45 degrees downward and to the left), the input ID "8" at the time of an input event for a flick gesture in the downward direction illustrated by the arrow A8 in FIG. 58, and the input ID "9" at the time of an input event for a flick gesture in the lower-right direction illustrate by the arrow A9 in FIG. 58 (approximately 45 degrees downward and to the right). Also, a mobile information device respectively references the input ID "0" at the time of an input event for a fast flick gesture in the downward direction illustrated by the arrow A0 in FIG. 58, the input ID "11" at the time of an input event for a fast flick gesture in the left direction illustrated by the arrow A11 in FIG. 58 (left horizontal direction), and the input ID "12" at the time of an input event for a fast flick gesture in the right direction illustrated by the arrow A12 in FIG. 58 (right horizontal direction), for example. In this way, a mobile information device of the present embodiment references input IDs corresponding to respective input events from the correspondence table illustrated in FIG. 57.

Then, by referencing respective input ID correspondence tables like those illustrated in FIGS. 59 to 70 on the basis of input IDs corresponding to the input events, a mobile information device of the present embodiment selects character, numeral, or menu item groups corresponding to the input IDs, and additionally selects characters, menu items, etc. within the selected groups.

FIG. 59 illustrates a correspondence table between the input IDs and respective groups in an English character input mode.

In this correspondence table in FIG. 59, the group ID is an ID individually assigned to each group during an English character input mode (group ID). In the case of an English character input mode, the group ID "1" is associated with the input ID "1", the group ID "2" with the input ID "2", the group ID "3" with the input ID "3", the group ID "4" with the input ID "4", the group ID "5" with the input ID "5", the group ID "6" with the input ID "6", the group ID "7" with the input ID "7", the group ID "8" with the input ID "8", and the group ID "9" with the input ID "9", respectively. Meanwhile, group IDs are not assigned to the input ID "0", the input ID "11", and the input ID "12", and these input IDs are configured such that various applied uses, such as the function information, etc. discussed earlier, are applicable thereto.

FIG. 60 illustrates a correspondence table between the input IDs and IDs corresponding to English characters, etc. included in an respective group IDs referenced from the correspondence table in FIG. 59 (internal group IDs) during an English character input mode.

In the correspondence table illustrated in FIG. 60, internal group IDs "No. 1", "No. 2", "No. 3", "No. 4", "No. 5", "No. 6", "No. 7", "No. 8", and "No. 9" correspond to the respective internal group IDs in the correspondence tables in FIGS. 61 to 63. Furthermore, in the case of an English character input mode, the internal group ID "No. 1" is associated with the input ID "1", the internal group ID "No. 2" with the input ID "2", the internal group ID "No. 3" with the input ID "3", the internal group ID "No. 4" with the input ID "4", the internal group ID "No. 5" with the input ID "5", the internal group ID "No. 6" with the input ID "6", the internal group ID "No. 7" with the input ID "7", the internal group ID "No. 8" with the input ID "8", and the internal group ID "No. 9" with the input ID "9", respectively. Meanwhile, internal group IDs are not assigned to the input ID "0", the input ID "11", and the input ID "12", and these input IDs are configured such that various applied uses, such as the function information, etc. discussed earlier, are applicable thereto.

Herein, in the present embodiment, in the case where an English character input mode is the English character keypad-relative input mode discussed earlier, the internal group ID IDs illustrated in the above FIG. 60 are respectively associated with respective English characters for the English character keypad-relative input mode as illustrated by the correspondence table in FIG. 61.

In other words, the correspondence table illustrated in FIG. 61 illustrates a correspondence table of correspondences between the group IDs in FIG. 59 and the respective internal group IDs in FIG. 60, as well as respective English characters belonging to groups with respective group IDs.

Described specifically, in the case of the English character keypad-relative input mode discussed earlier, the group with the group ID "1" is for example a group corresponding to respective symbols such as ".", "_", "@", and "-", wherein the symbol "." is associated with the internal group ID "No. 2", the symbol "_" with the internal group ID "No. 4", the symbol "@" with the internal group ID "No. 6", and the symbol "-" with the internal group ID "NO. 8" of the group ID "1", respectively, as illustrated by the correspondence table in FIG. 61. Also, the group with the group ID "2" is a group corresponding to the respective English characters "a, b, c", wherein the English character "a" is associated with the internal group ID "No. 2", the English character "b" with the internal group ID "No. 6", and the English character "c" with the internal group ID "No. 8" of the group ID "2", respectively. Similarly, the group with the group ID "3" is a group corresponding to the respective English characters "d, e, f", wherein the English character "d" is associated with the internal group ID "No. 2", the English character "e" with the internal group ID "No. 6", and the English character "f" with the internal group ID "No. 8" of the group ID "3", respectively. The group with the group ID "4" is a group corresponding to the respective English characters "g, h, i", wherein the English character "g" is associated with the internal group ID "No. 2", the English character "h" with the internal group ID "No. 6", and the English character "i" with the internal group ID "No. 8" of the group ID "4", respectively. The group with the group ID "5" is a group corresponding to the respective English characters "j, k, 1", wherein the English character "j" is associated with the internal group ID "No. 2", the English character "k" with the internal group ID "No. 6", and the English character "1" with the internal group ID "No. 8" of the group ID "5", respectively. The group with the group ID "6" is a group corresponding to the respective English characters "m, n, o", wherein the English character "m" is associated with the internal group ID "No. 2", the English character "n" with the internal group ID "No. 6", and the English character "o" with the internal group ID "No. 8" of the group ID "6". Also, the group with the group ID "7" is a group corresponding to the respective English characters "p, q, r, s", wherein the English character "p" is associated with the internal group ID "No. 2", the English character "s" with the internal group ID "No. 4", the English character "q" with the internal group ID "No. 6", and the English character "r" with the internal group ID "No. 8" of the group ID "7". The group with the group ID "8" is a group corresponding to the respective English characters "t, u, v", wherein the English character "t" is associated with the internal group ID "No. 2", the English character "u" with the internal group ID "No. 6", and the English character "v" with the internal group ID "No. 8" of the group ID "8". The group with the group ID "9" is a group corresponding to the respective English characters "w, x, y, z", wherein the English character "w" is associated with the internal group ID "No. 2", the English character "z" with the internal group ID "No. 4", the English character "x" with the internal group ID "No. 6", and the English character "y" with the internal group ID "No. 8" of the group ID "9".

Also, in the present embodiment, in the case where an English character input mode is the English character 4 group-relative input mode discussed earlier, the internal group ID IDs illustrated in the above FIG. 60 are respectively associated with respective English characters for the English character 4 group-relative input mode as illustrated by the correspondence table in FIG. 62.

In other words, the correspondence table illustrated in FIG. 62 illustrates a correspondence table of correspondences between the group IDs in FIG. 59 and the respective internal group IDs in FIG. 60, as well as respective English characters belonging to groups with respective group IDs in the case where an English character input mode is the English character 4 group-relative input mode discussed earlier. Herein, in the case of an English character 4 group-relative input mode, internal group IDs are associated with the group ID "2", the group ID "4", the group ID "6", and the group ID "8".

Described specifically, in the case of the English character 4 group-relative input mode discussed earlier, the group with the group ID "2" is a group corresponding to the respective English characters "a, b, c, d, e, f, g", wherein the English character "e" is associated with the internal group ID "No. 1", the English character "a" with the internal group ID "No. 3", the English character "f" with the internal group ID "No. 4", the English character "b" with the internal group ID "No. 6", the English character "g" with the internal group ID "No. 7", the English character "d" with the internal group ID "No. 8", and the English character "c" with the internal group ID "No. 9" of the group ID "2", respectively, as illustrated by the correspondence table in FIG. 62. Similarly, the group with the group ID "4" is a group corresponding to the respective English characters "v, w, x, y, z", wherein the English character "x" is associated with the internal group ID "No. 1", the English character "v" with the internal group ID "No. 3", the English character "y" with the internal group ID "No. 4", the English character "z" with the internal group ID "No. 6", and the English character "w" with the internal group ID "No. 9" of the group ID "4", respectively. The group with the group ID "6" is a group corresponding to the respective English characters "h, i, j, k, l, m, n", wherein the English character "l" is associated with the internal group ID "No. 1", the English character "h" with the internal group ID "No. 3", the English character "m" with the internal group ID "No. 4", the English character "i" with the internal group ID "No. 6", the English character "n" with the internal group ID "No. 7", the English character "k" with the internal group ID "No. 8", and the English character "j" with the internal group ID "No. 9" of the group ID "6", respectively. The group with the group ID "8" is a group corresponding to the respective English characters "o, p, q, r, s, t, u", wherein the English character "s" is associated with the internal group ID "No. 1", the English character "o" with the internal group ID "No. 3", the English character "t" with the internal group ID "No. 4", the English character "p" with the internal group ID "No. 6", the English character "u" with the internal group ID "No. 7", the English character "r" with the internal group ID "No. 8", and the English character "q" with the internal group ID "No. 9" of the group ID "8", respectively.

Also, in the present embodiment, in the case where an English character input mode is the English word-relative input mode discussed earlier, the internal group ID IDs illustrated in the above FIG. 60 are respectively associated with respective English characters for the English word-relative input mode as illustrated by the correspondence table in FIG. 63.

In other words, the correspondence table illustrated in FIG. 63 illustrates a correspondence table of correspondences between the group IDs in FIG. 59 and the respective internal group IDs in FIG. 60, as well as respective English characters belonging to groups with respective group IDs in the case where an English character input mode is the English word-relative input mode discussed earlier. Herein, in the case of an English word-relative input mode, internal group IDs are not associated with the group ID "5", for example.

Described specifically, in the case of the English word-relative input mode discussed earlier, the group with the group ID "1" is a group corresponding to the English word "bang", wherein the English character "b" is associated with the internal group ID "No. 2", the English character "g" with the internal group ID "No. 4", the English character "a" with the internal group ID "No. 6", and the English character "n" with the internal group ID "No. 8" of the group ID "1", respectively, as illustrated by the correspondence table in FIG. 63. Similarly, the group with the group ID "2" is a group corresponding to the English word "chip", wherein the English character "c" is associated with the internal group ID "No. 2", the English character "p" with the internal group ID "No. 4", the English character "h" with the internal group ID "No. 6", and the English character "i" with the internal group ID "No. 8" of the group ID "2". The group with the group ID "3" is a group corresponding to the English word "desk", wherein the English character "d" is associated with the internal group ID "No. 2", the English character "k" with the internal group ID "No. 4", the English character "e" with the internal group ID "No. 6", and the English character "s" with the internal group ID "No. 8" of the group ID "3". The group with the group ID "4" is a group corresponding to the English word "from", wherein the English character "f" is associated with the internal group ID "No. 2", the English character "m" with the internal group ID "No. 4", the English character "r" with the internal group ID "No. 6", and the English character "o" with the internal group ID "No. 8" of the group ID "4". The group with the group ID "6" is a group corresponding to the English word "july", wherein the English character "j" is associated with the internal group ID "No. 2", the English character "y" with the internal group ID "No. 4", the English character "u" with the internal group ID "No. 6", and the English character "l" with the internal group ID "No. 8" of the group ID "6". The group with the group ID "7" is a group corresponding to the English word "wave", wherein the English character "w" is associated with the internal group ID "No. 2", the English character "e" with the internal group ID "No. 4", the English character "a" with the internal group ID "No. 6", and the English character "v" with the internal group ID "No. 8" of the group ID "7". The group with the group ID "8" is a group corresponding to the English word "taxy", wherein the English character "t" is associated with the internal group ID "No. 2", the English character "y" with the internal group ID "No. 4", the English character "a" with the internal group ID "No. 6", and the English character "x" with the internal group ID "No. 8" of the group ID "8". The group with the group ID "9" is a group corresponding to the English word "quiz", wherein the English character "q" is associated with the internal group ID "No. 2", the English character "z" with the internal group ID "No. 4", the English character "u" with the internal group ID "No. 6", and the English character "i" with the internal group ID "No. 8" of the group ID "9".

FIG. 64 illustrates a correspondence table between the input IDs and respective consonants in a Japanese character input mode.

In this correspondence table in FIG. 64, "a, k, s, t, n, h, m, y, r, w" are assigned to respective consonants as consonant IDs. Additionally, in the case of the Japanese character input mode, the consonant ID "w" is assigned to the input ID "0", and similarly, the consonant ID "a" to the input ID "1", the consonant ID "s" to the input ID "3", the consonant ID "t" to the input ID "4", the consonant ID "n" to the input ID "5", the consonant ID "h" to the input ID "6", the consonant ID "m" to the input ID "7", the consonant ID "y" to the input ID "8", and the consonant ID "r" to the input ID "9", respectively. Also, a small character conversion function applied use is assigned as a consonant ID to the input ID "11", and a dakuten conversion function applied use is assigned as a consonant ID to the input ID "12".

FIG. 65 illustrates a correspondence table between the input IDs and respective vowels in a Japanese character input mode.

In this correspondence table in FIG. 65, "a, i, u, e, o" and small characters such as "small ya", "small yu", "small yo", etc. are assigned to respective vowels as vowel IDs. Additionally, in the case of the Japanese character input mode, the vowel ID "a" is associated with the input ID "2", the vowel ID "i" with the input ID "3", the vowel ID "u" with the input ID "6", the vowel ID "o" with the input ID "8", and the vowel ID "e" with the input ID "e". Also, small characters are associated with the input ID "4".

FIG. 66 illustrates a correspondence table between consonant IDs and vowel IDs during a Japanese character input mode.

In other words, in this correspondence table in FIG. 66, the consonant IDs "a, k, s, t, n, h, m, y, r, w" correspond to respective "rows" of the gojuon syllabary, while the vowel IDs "a, i, u, e, o" corresponds to respective "columns" of the gojuon syllabary.

FIG. 67 illustrates a correspondence table between the input IDs and respective numerals in a numeral input mode.

In other words, in this correspondence table in FIG. 67, the respective numerals and two symbols "0, 1, 2, 3, 4, 5, 6, 7, 8, 9, *, #" are assigned to the respective input IDs "0, 1, 2, 3, 4, 5, 6, 7, 8, 9, 11, 12".

FIG. 68 illustrates a correspondence table with the IDs of respective menu groups in the case where the menu selection discussed earlier is conducted.

In this correspondence table illustrated in FIG. 68, the group ID is an ID individually assigned to respective menu groups during menu selection (group ID). In the case of the present embodiment, the group ID "2" is associated with the input ID "2", the group ID "4" with the input ID "4", the group ID "6" with the input ID "6", and the group ID "8" with the input ID "8", respectively. Meanwhile, it is configured such that various applied uses such as the function information, etc. discussed earlier are applicable to the other input IDs.

FIG. 69 illustrates a correspondence table between the input IDs and IDs corresponding to menu items belonging to respective group IDs referenced from the correspondence table in FIG. 68 (internal group IDs) in the case where menu selection is conducted.

Also, respective menu items like those illustrated by the correspondence table in FIG. 70 are respectively associated with the internal group IDs for menus illustrated in FIG. 69 as an example. Herein, in the case of this example, the respective menu items correspond to control items during music playback as an example.

In other words, in the case of exemplary menu operations related to music playback, a "Play" menu item with the internal group ID "No. 2", a "Pause" menu item with the internal group ID "No. 4", an "Off" menu item with the internal group ID "No. 6", and a "Stop" menu item with the internal group ID "No. 8" are respectively associated with the group with the group ID "1", as illustrated by the correspondence table in FIG. 70. Similarly, a "Play first" menu item with the internal group ID "No. 2", a "Play from beginning" menu item with the internal group ID "No. 4", a "Skip" menu item with the internal group ID "No. 6", and a "Random" menu item with the internal group ID "No. 8" are associated with the group with the group ID "4". A "Frame step back" menu item with the internal group ID "No. 2", a "Rewind" menu item with the internal group ID "No. 4", a "Fast forward" menu item with the internal group ID "No. 6", and a "Frame step forward" menu item with the internal group ID "No. 8" are associated with the group with the group ID "6". An "Auto" menu item with the internal group ID "No. 2", a "Low" menu item with the internal group ID "No. 4", a "High" menu item with the internal group ID "No. 6", and a "Mute" menu item with the internal group ID "No. 8" are associated with the group with the group ID "8".

By referencing respective correspondence tables like those discussed above, a mobile information device of the present embodiment computes an input ID from a flick gesture direction, and also computes a respective group ID and internal group ID for a respective operational mode from that input ID. Thus, a mobile information device of the present embodiment becomes capable of realizing processing for English character input, Japanese character input, numeral input, menu selection, information search, etc. like that discussed earlier.

Herein, in the respective correspondence tables discussed above, it is also possible to add new function assignments whereby what is called an "Undo" or other function is executed when a second action is selected by a tap, for example, by utilizing the empty parts in cases where there are combinations for which ID, etc. assignments do not yet exist.

(Process Flow when Executing Information Input Control Program)

Hereinafter, a process flowchart will be described for when a mobile information device of the present embodiment executes an information input control program of the present embodiment and conducts processing for the English character input, Japanese character input, numeral input, menu selection, information search, etc. discussed earlier. Herein, an information input control program of the present embodiment may be prepared at the time of factory shipment of a mobile information device. Also, a mobile information device is made to be capable of separately obtaining an information input control program of the present embodiment via the communication, external memory, external input and output terminals, etc., for example.

FIGS. 71 to 78 illustrate process flows for when a control-computation unit 104 in a mobile information device of the present embodiment executes an information input control program of the present embodiment. Herein, an information input control program in this case may be activated according to instructions from the user, or automatically activated at power on.

Figure 71:
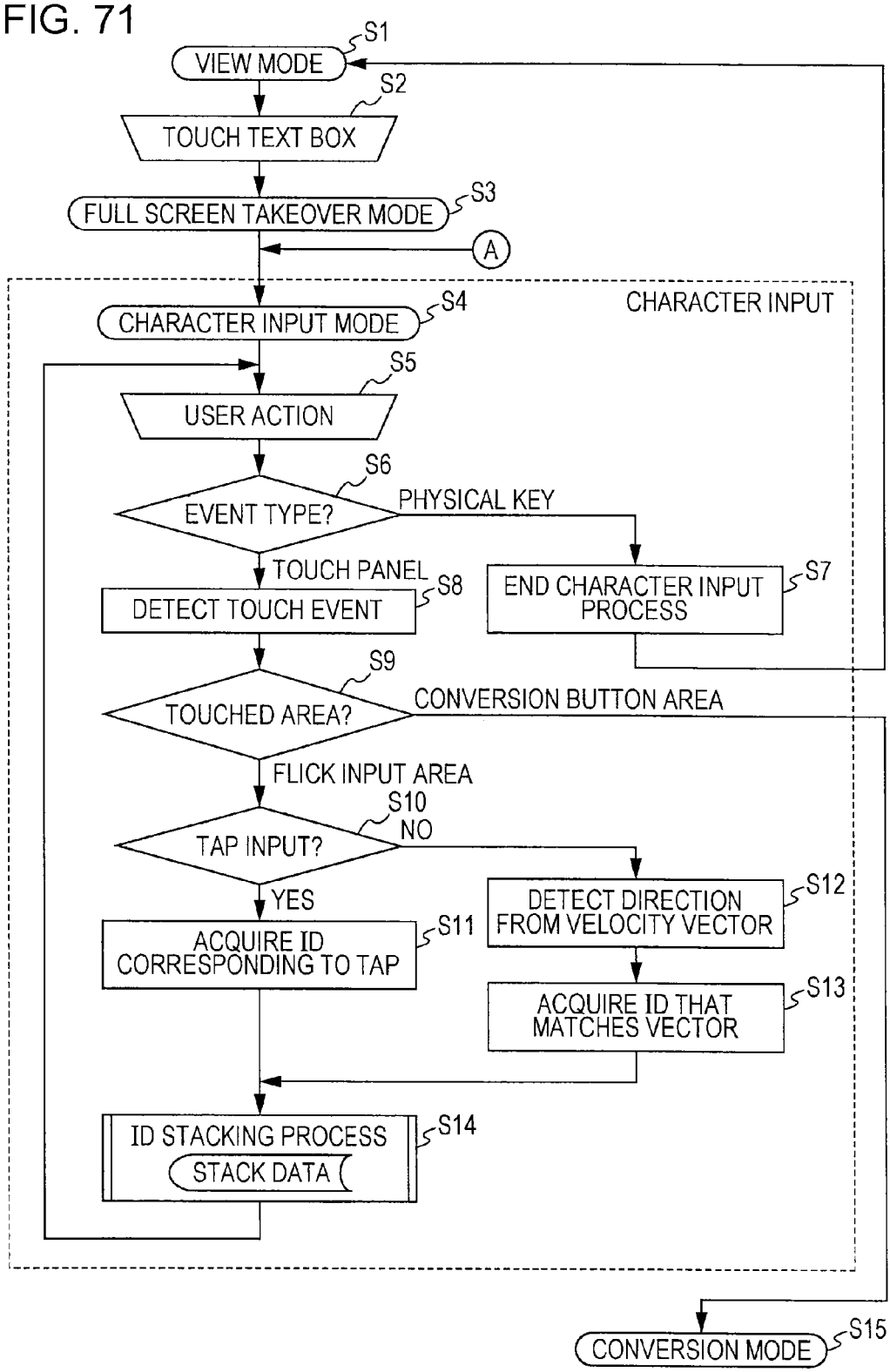
FIG. 71 is a flowchart that illustrates the flow of a series of processes during information input of characters, etc. in the present embodiment, and which illustrates the flow up to an ID addition processing part after proceeding from a browser view mode to a character input mode.
Figure 72:
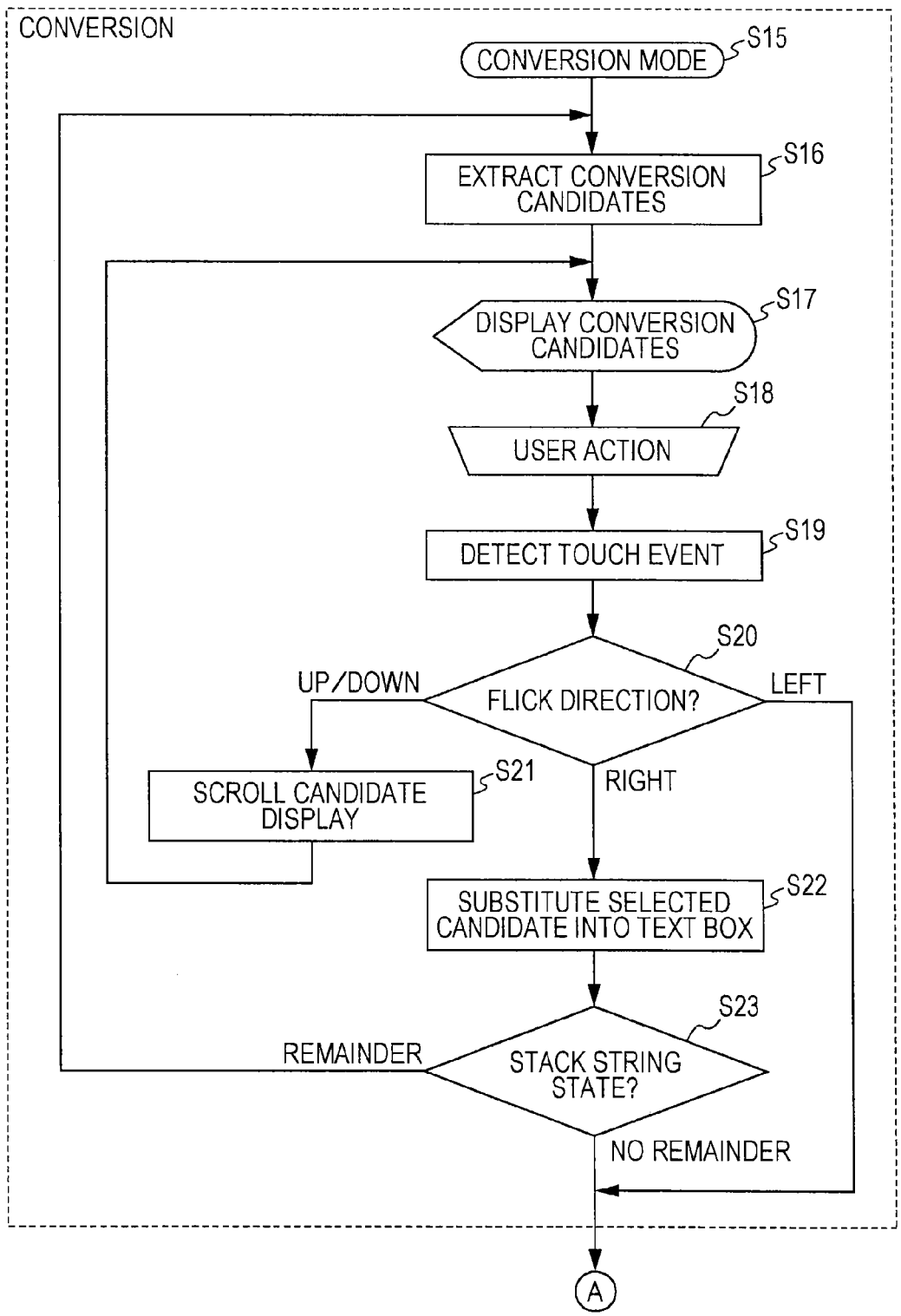
FIG. 72 is a flowchart that illustrates the flow of a series of processes during information input of characters, etc. in the present embodiment, and which illustrates the process flow after proceeding to a conversion mode of a Japanese character input mode from among the character input modes.

FIG. 71 and FIG. 72 are flowcharts that illustrate the flow of a series of processes during information input of characters, etc. in the present embodiment.

Herein, while details will be described with the following flowcharts, with information input of characters, etc. in the present embodiment, input IDs are individually assigned to flick gestures, and additionally, depending on the conditions of the prior stack, divided into the group IDs, consonant IDs, vowel IDs, etc. discussed earlier, for example. After that, input processing of characters, etc. is conducted by ID addition processing discussed later.

For example, as discussed earlier, English character input is conducted by two flicks per English character, wherein a character is input by selecting the group in which exists the character that the user wants to input (group ID) by a first flick, and selecting the character in that group that the user wants to input (internal group ID) by a second flick. Furthermore, the input ID, group ID, and internal group ID are stacked with each flick, and conversion from this stack to a character is conducted. As another example, as discussed earlier, Japanese hiragana input is conducted by two flicks per hiragana character, where the consonant of the character that the user wants to input is selected with a first flick, and the ID of that consonant is stacked. A vowel is selected with a second flick, and the ID of that vowel is stacked. Then, conversion from the stacked consonant ID and vowel ID into a character is conducted. For example, as discussed earlier, numeral input is conducted by one flick per numeral character. As another example, as discussed earlier, menu item selection is conducted by refining in order from the top menu tier by flicks. As a further example, as discussed earlier, information search from a phone book, etc. is conducted by refining relevant phone book records by a plurality of flicks, and causing selection when the number of search result records becomes smaller (or when the search results are refined to one).

In the flowchart in FIG. 71, an information input control program of the present embodiment is taken to be already activated, and the control-computation unit 104 has entered a standby state for a user operation on a touch panel in the case where for example the mobile information device enters a viewing mode for a browser screen including a text box like that discussed earlier as step S1.

Herein, in the case where for example as step S2 a touch panel is touched by the user, and the touch position was the text box, as the processing in step S3 the control-computation unit 104 transitions to the full screen takeover mode. Also, as step S4, at this time the control-computation unit 104 transitions to a character input mode whereby character input is made into the text box.

Upon transitioning to the character input mode, the control-computation unit 104 enters a standby state for a user operation on the touch panel in the full screen takeover mode. Then, if some kind of action from the user is performed as step S5, as the processing in step S6 the control-computation unit 104 determines whether that action is an input event with respect to a touch panel, or an input event on a physical key.

In the case where it is determined that the user action was an input event such as for example a press operation on a physical key, as the processing in step S7 the control-computation unit 104 cancels the full screen takeover mode while also returning from a character input mode to a browser viewing mode, and returns the process to step S1.

In contrast, in the case where it is determined that the user action was an input event on a touch panel, the control-computation unit 104 advances the process to step S8.

Advancing to the processing in step S8, in the case where a touch event wherein the user's finger, etc. contacts the touch panel is detected as the determined input event, as the processing in step S9 the control-computation unit 104 determines which area on the touch panel is the area touched by the touch event.

Then, the control-computation unit 104 advances the process to step S15 in FIG. 72 discussed later in the case where it is determined that the touched area is for example the convert/symbol instruction area 14 from among the function areas 12 to 15.

In contrast, the control-computation unit 104 advances the process to step S10 in the case where it is determined that the touched area is an area enabling information input of characters, etc. by the flick gestures, etc., or in other words is for example an area on the touch panel excluding the function areas 12 to 15.

Advancing to the processing in step S10, the control-computation unit 104 determines whether or not the touch event on the touch panel is the tap gesture.

The control-computation unit 104 advances the process to step S12 in the case where it is determined in the determination processing of the above step S10 that the touch event is not a tap gesture, or in other words is a flick gesture, for example.

Advancing to the processing in step S12, the control-computation unit 104 computes a velocity vector for the flick gesture, and also detects a flick direction from that velocity vector.

Next, as the processing in step S13, the control-computation unit 104 references the ID discussed earlier that matches the direction of the flick from a correspondence table discussed earlier, and advances the process to step S14. Herein, in the case where the flick gesture is a first flick gesture, the ID becomes an input ID and a group ID corresponding to that input ID.

Also, the control-computation unit 104 advances the process to step S11 in the case where it is determined in step S10 that the touch event is a tap gesture.

Advancing to the processing in step S11, the ID corresponding to that tap gesture is referenced from a correspondence table discussed earlier, and the process is advanced to step S14. Herein, the ID corresponding to a tap gesture in this case becomes the input ID and the group ID corresponding to that input ID.

Advancing to the processing in step S14, the control-computation unit 104 retains the ID as stack data, and then returns the process to step S5. Herein, the processing in step S14 differs according to whether the operational mode is the English character input mode, the Japanese character input mode, the numeral input mode, the menu selection mode, or the phone book search mode discussed earlier. The details thereof will be discussed later.

After the process is returned to step S5, in the case where it is determined in step S10 that the touch event is a second flick gesture, the ID referenced in step S13 becomes an internal group ID.

Next, the process advances to step S15 in FIG. 72 and the control-computation unit 104 transitions to a conversion mode due to it being determined in step S9 that the touched area is the convert/symbol instruction area 14. Herein, the conversion mode is a mode used during the kana-kanji conversion of a Japanese character input mode, for example. In this example of the flowchart in FIG. 72, kana-kanji conversion in a Japanese character input mode is given by way of example.

Upon transitioning to a conversion mode in step S15 in FIG. 72, the control-computation unit 104 advances to the processing in step S16. Upon advancing to the processing in step S16, the control-computation unit 104 extracts conversion candidates like those discussed earlier on the basis of an unconfirmed character string input by the previous group selection, etc., as conversion candidate extraction processing.

Next, as the processing in step S17, the control-computation unit 104 displays a list of the conversion candidates extracted in the previous step S16 on a display screen, and then advances the process to step S18.

Upon advancing to the processing in step S18, the control-computation unit 104 enters a standby state for a user operation on the touch panel. When some kind of action from the user is detected in S19 and that action is a flick gesture with respect to a touch panel, as the processing in step S20 the control-computation unit 104 determines the direction of that flick gesture.

Then, in the case where the direction of the flick is the upward or downward direction, as the processing in step S21 the control-computation unit 104 scrolls the candidate list in the upward or downward direction on a screen, and then returns the process to step S17.

Also, in the case where the direction of the flick is leftward, the control-computation unit 104 returns the process to step S4 in FIG. 71.

Also, in the case where the orientation row of the flick is rightward, as the processing in step S22 the control-computation unit 104 substitutes the conversion candidate selected by the rightward flick gesture into a text box.

After that, as the processing in step S23 the control-computation unit 104 determines whether or not the character string that has been input up to this time is in a stacked character string state having an unconfirmed character string that should be additionally converted. The control-computation unit 104 returns the process to step S16 in the case of an unconfirmed character string, and in contrast, returns the process to step S4 in FIG. 71 in the case of no unconfirmed character string to be converted.

Figure 73:
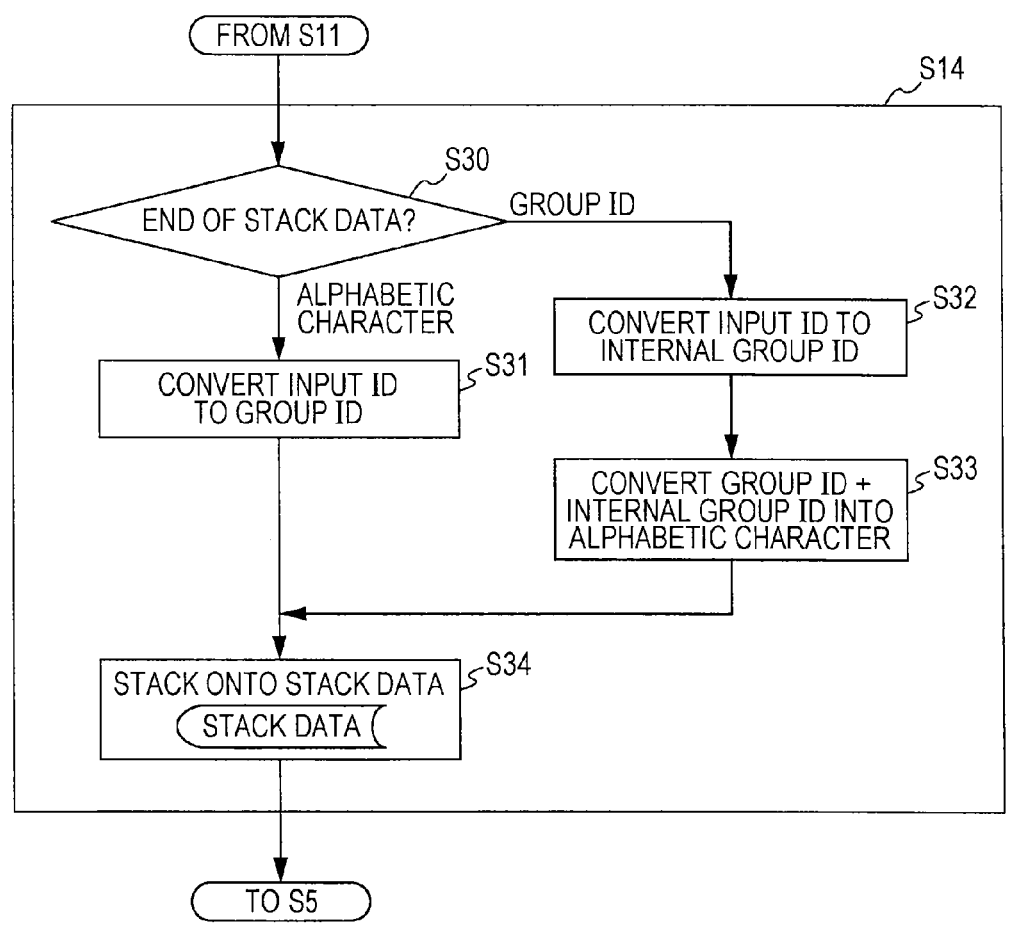
FIG. 73 is a flowchart that illustrates a detailed process flow in the ID addition processing part of FIG. 71 in the case where the character input mode is an English character input mode.

FIG. 73 illustrates a detailed process flow for the step S14 part of the above FIG. 71 in the case where a character input mode is an English character input mode.

In an English character input mode, upon advancing to the processing in step S14 in FIG. 73, as the processing in step S30 the control-computation unit 104 determines whether the stack data at the end of the stacked data discussed earlier is an English character discussed earlier or an ID (group ID). The control-computation unit 104 advances the process to step S32 in the case of a group ID.

Advancing to the processing in step S32, the control-computation unit 104 conducts conversion from an input ID to an internal group ID by referencing the correspondence table for English character input discussed earlier.

Next, as the processing in step S33, the control-computation unit 104 references the correspondence table for English character input and determines an English character from the previously selected group ID and the internal group ID. Then, as the processing in step S34, the control-computation unit 104 stacks that English character data as stack data.

In contrast, if it is determined in step S30 that the stack data at the end is an English character, the control-computation unit 104 advances the process to step S31.

Advancing to the processing in step S31, the control-computation unit 104 references the correspondence table for English character input and determines a group ID from an input ID. Then, as the processing in step S34, the control-computation unit 104 stacks a group ID as stack data.

After that, the control-computation unit 104 returns the process to step S5 in FIG. 71.

Figure 74:
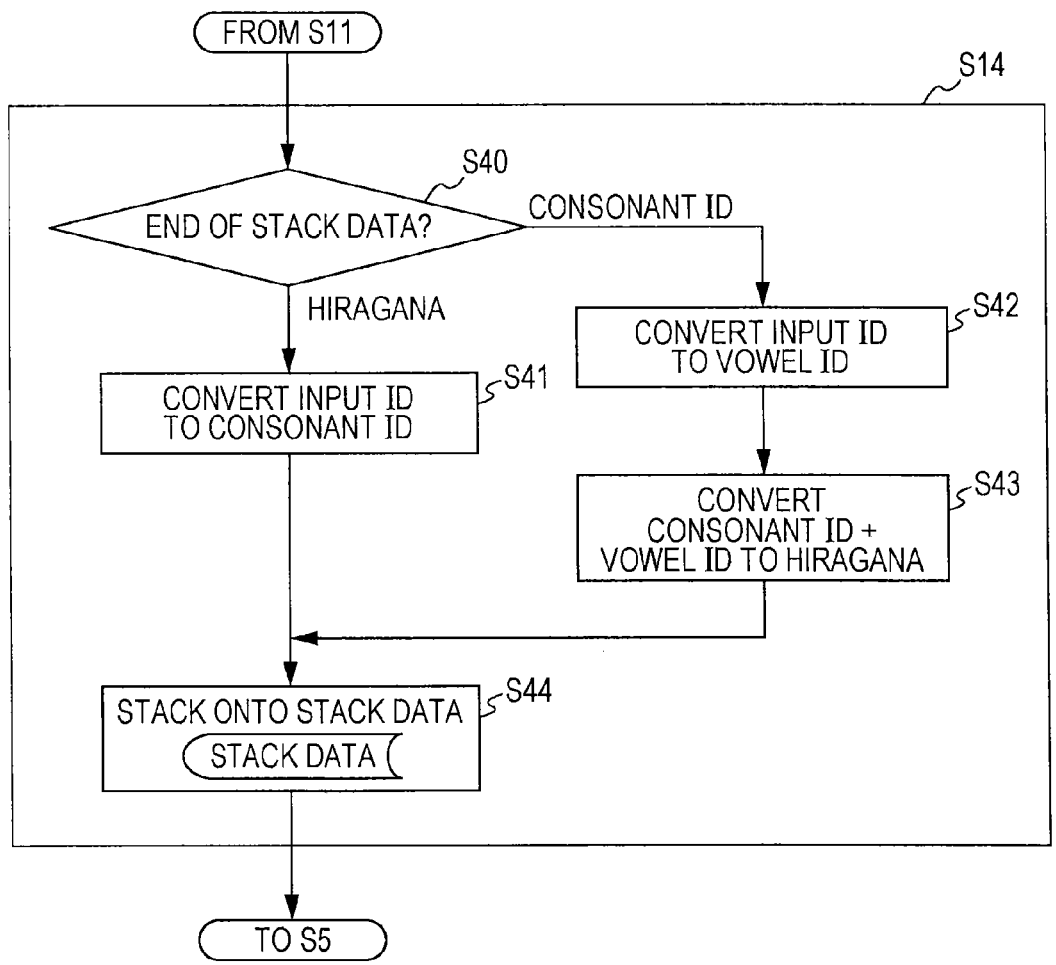
FIG. 74 is a flowchart that illustrates detailed process flow in the ID addition processing part of FIG. 71 in the case where the character input mode is a Japanese character input mode.

FIG. 74 illustrates a detail process flow for the step S14 part of FIG. 71 in the case where a character input mode is a Japanese character input mode.

In a Japanese character input mode, upon advancing to the processing in step S14 in FIG. 74, as the processing in step S40, the control-computation unit 104 determines whether the stack data at the end of the stacked data discussed earlier is a hiragana character discussed earlier or a consonant ID. The control-computation unit 104 advances the process to step S42 in the case of a consonant ID.

Upon advancing to the processing in step S42, the control-computation unit 104 conducts conversion from an input ID to a vowel ID by referencing the correspondence table for Japanese character input discussed earlier.

Next, as the processing in step S43, the control-computation unit 104 references the correspondence table for Japanese character input discussed earlier and determines a hiragana character from the previously selected consonant ID and vowel ID. Then, as the processing in step S34, the control-computation unit 104 stacks that hiragana character data as stack data.

In contrast, in the case where it is determined in step S40 that the stack data at the end is a hiragana character, the control-computation unit 104 advances the process to step S41.

Advancing to the processing in step S41, the control-computation unit 104 references the correspondence table for Japanese character input and determines a consonant ID from an input ID. Then, as the processing in step S44, the control-computation unit 104 stacks a consonant ID as stack data.

After that, the control-computation unit 104 returns the process to step S5 in FIG. 71.

Figure 75:
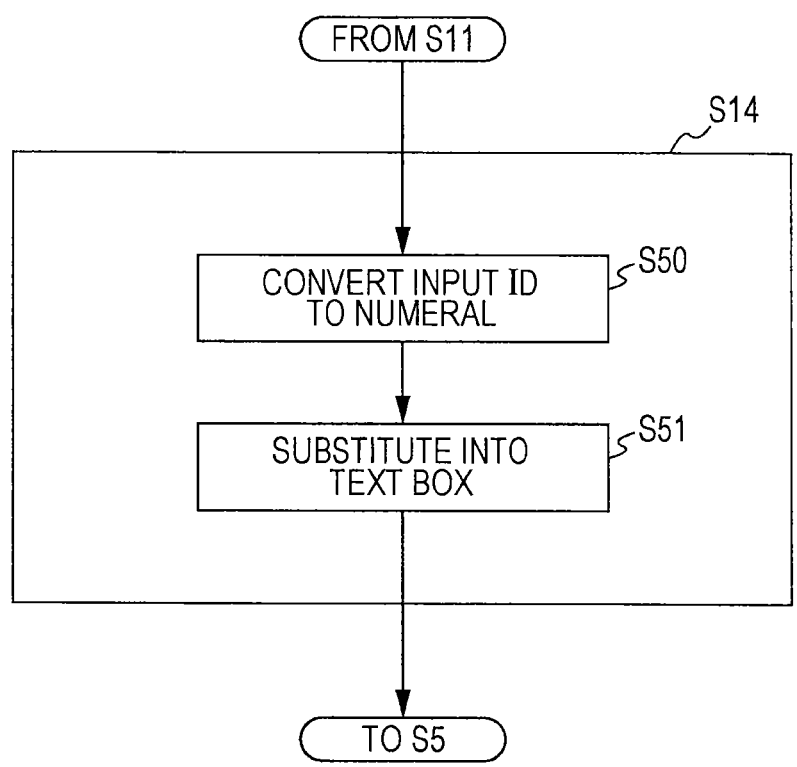
FIG. 75 is a flowchart that illustrates a detailed process flow in the ID addition processing part of FIG. 71 in the case where the character input mode is a numeral input mode.

FIG. 75 illustrates a detailed process flow for the step S14 part of FIG. 71 in the case where a character input mode is a numeral input mode.

In a numeral input mode, upon advancing to the processing in step S14 in FIG. 75, as the processing in step S50, the control-computation unit 104 references the correspondence table for a numeral input mode discussed earlier, and conducts conversion from an input ID to a numeral.

Then, as the processing in step S51, the control-computation unit 104 substitutes the numeral determined in step S50 into a text box.

Next, as the processing in step S43, the control-computation unit 104 references the correspondence table for Japanese character input and determines a hiragana character from the previously selected consonant ID and vowel ID. Then, as the processing in step S34, the control-computation unit 104 stacks that hiragana character as stack data.

In contrast, in the case where it is determined in step S40 that the stack data at the end is a hiragana character, the control-computation unit 104 advances the process to step S41.

Advancing to the processing in step S41, the control-computation unit 104 references the correspondence table for Japanese character input and determines a consonant ID from an input ID. Then, as the processing in step S44, the control-computation unit 104 stacks a consonant ID as stack data.

After that, the control-computation unit 104 returns the process to step S5 in FIG. 71.

Figure 76:
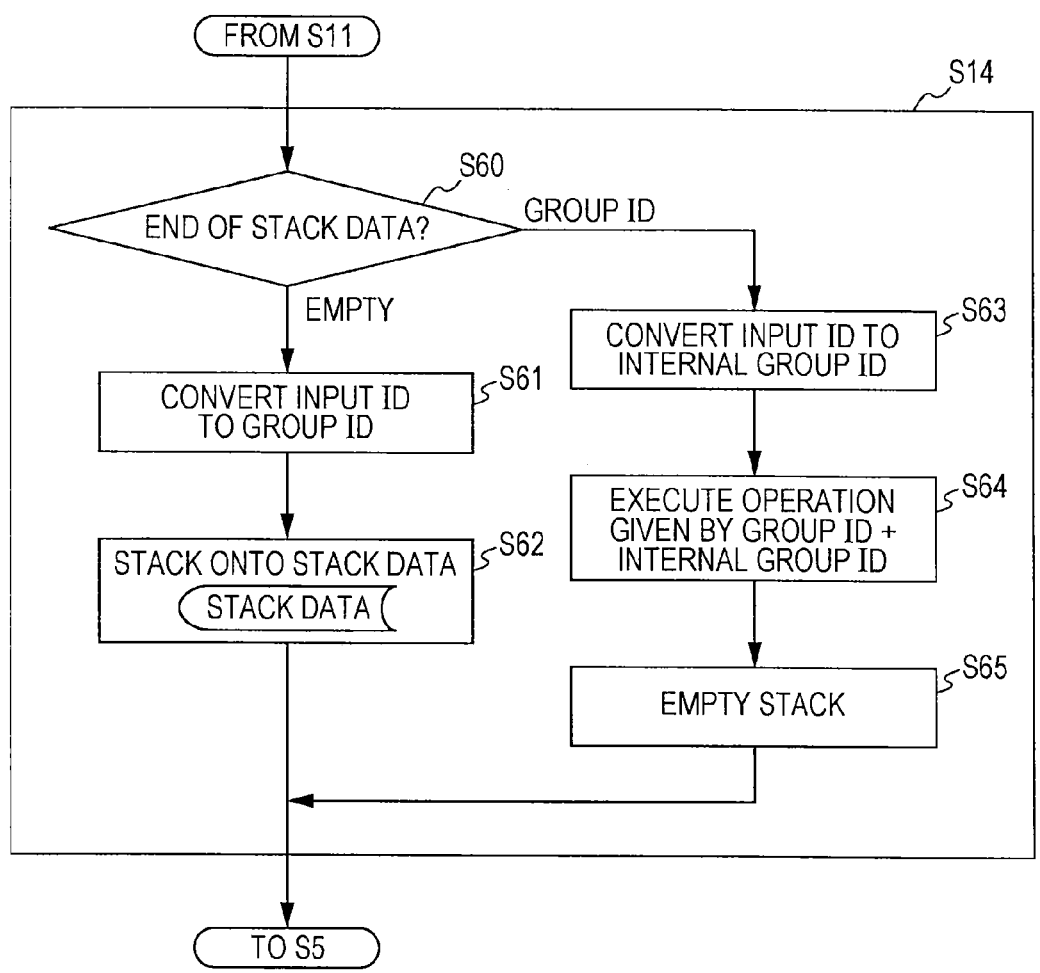
FIG. 76 is a flowchart that illustrates a detailed process flow in the ID addition processing part of FIG. 71 in the case where the operational mode is a menu item selection input mode.

FIG. 76 illustrates a detailed process flow for the step S14 part of FIG. 71 in the case where the operational mode is a menu item selection input mode.

In a menu selection mode, upon advancing to the processing in step S14 in FIG. 76, as the processing in step S60, the control-computation unit 104 determines whether the stack data at the end of the stacked data discussed earlier is in a blank state or a group ID. The control-computation unit 104 advances the process to step S63 in the case of a group ID.

Upon advancing to the processing in step S63, the control-computation unit 104 conducts conversion from an input ID to an internal group ID by referencing the correspondence table for menu selection discussed earlier.

Next, as the processing in step S64, the control-computation unit 104 references the correspondence table for menu selection, and executes processing according to a menu item obtained from the previously selected group ID and internal group ID. Then, as the processing in step S65, the control-computation unit 104 clears the stack data and then returns the process to step S5 in FIG. 71.

In contrast, in the case where it is determined in step S60 that the stack data at the end is blank, the control-computation unit 104 advances the process to step S61.

Upon advancing to the processing in step S61, the control-computation unit 104 references the correspondence table for menu selection and determines a group ID from an input ID. Then, as the processing in step S62, the control-computation unit 104 stacks a group ID as stack data.

After that, the control-computation unit 104 returns the process to step S5 in FIG. 71.

Figure 77:
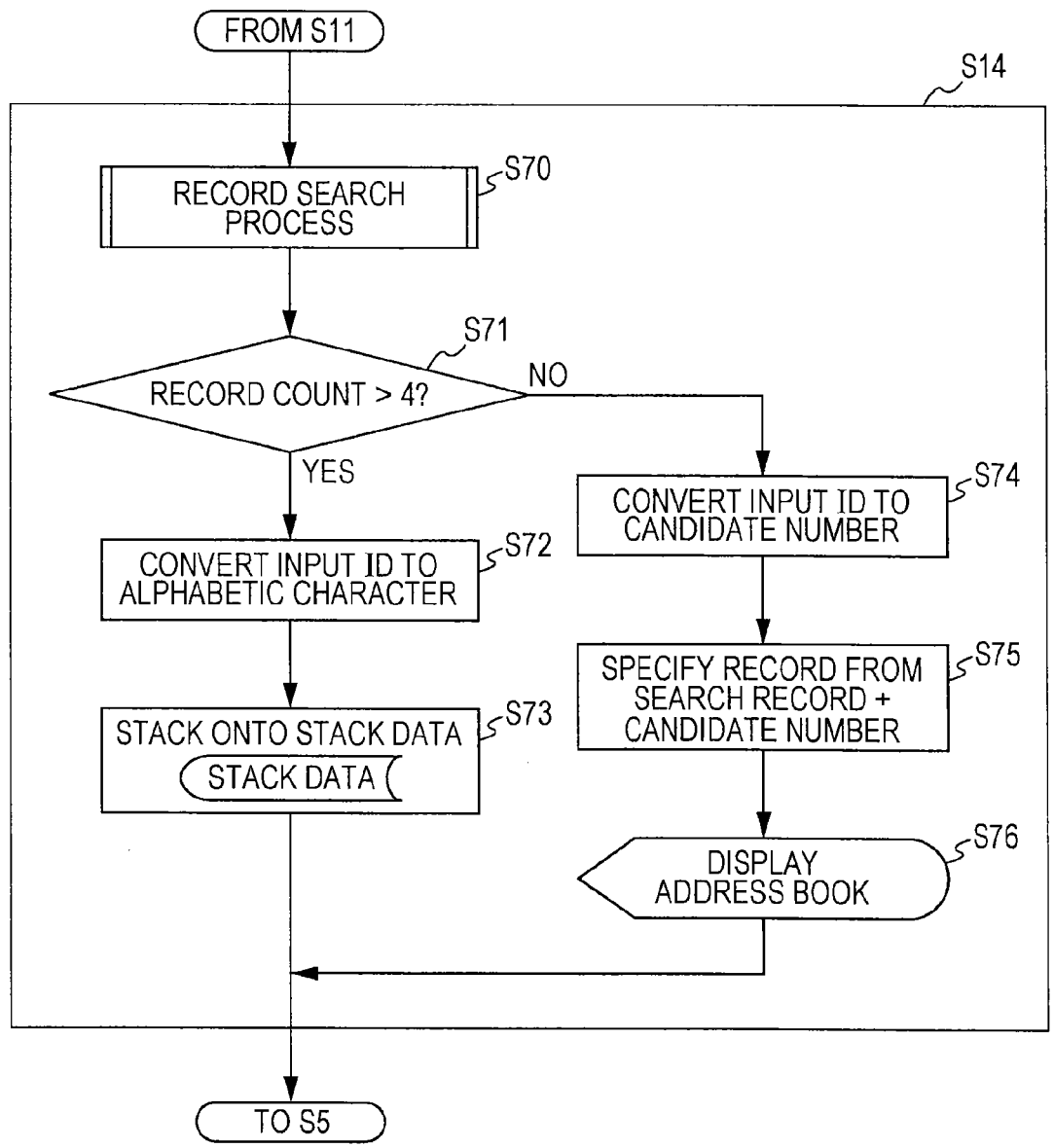
FIG. 77 is a flowchart that illustrates a detailed process flow in the ID addition processing part of FIG. 71 in the case where the operational mode is a phone book information search mode.

FIG. 77 illustrates a detailed process flow for the step S14 part of FIG. 71 in the case where the operational mode is the phone book information search mode discussed earlier.

In a phone book information search mode, upon advancing to the processing in step S14 in FIG. 77, as the processing in step S70, the control-computation unit 104 executes phone book registered record search processing, and advances the process to step S71.

Upon advancing to the processing in step S71, the control-computation unit 104 determines whether or not the number of search result records is greater than 4, for example. The control-computation unit 104 advances the process to step S72 in the case of greater than 4, and in contrast, advances the process to step S74 in the case of 4 or less.

Upon advancing to the processing in step S72, the control-computation unit 104 executes input ID to English character conversion processing, and stacks that data as stack data.

In contrast, upon advancing to the processing in step S74, the control-computation unit 104 converts an input ID into a candidate number. Next, as the processing in step S75, a record is specified from the records found by search and a candidate number.

Then, the control-computation unit 104 displays the specified phone book information on a display screen.

After that, the control-computation unit 104 returns the process to step S5 in FIG. 71.

Figure 78:
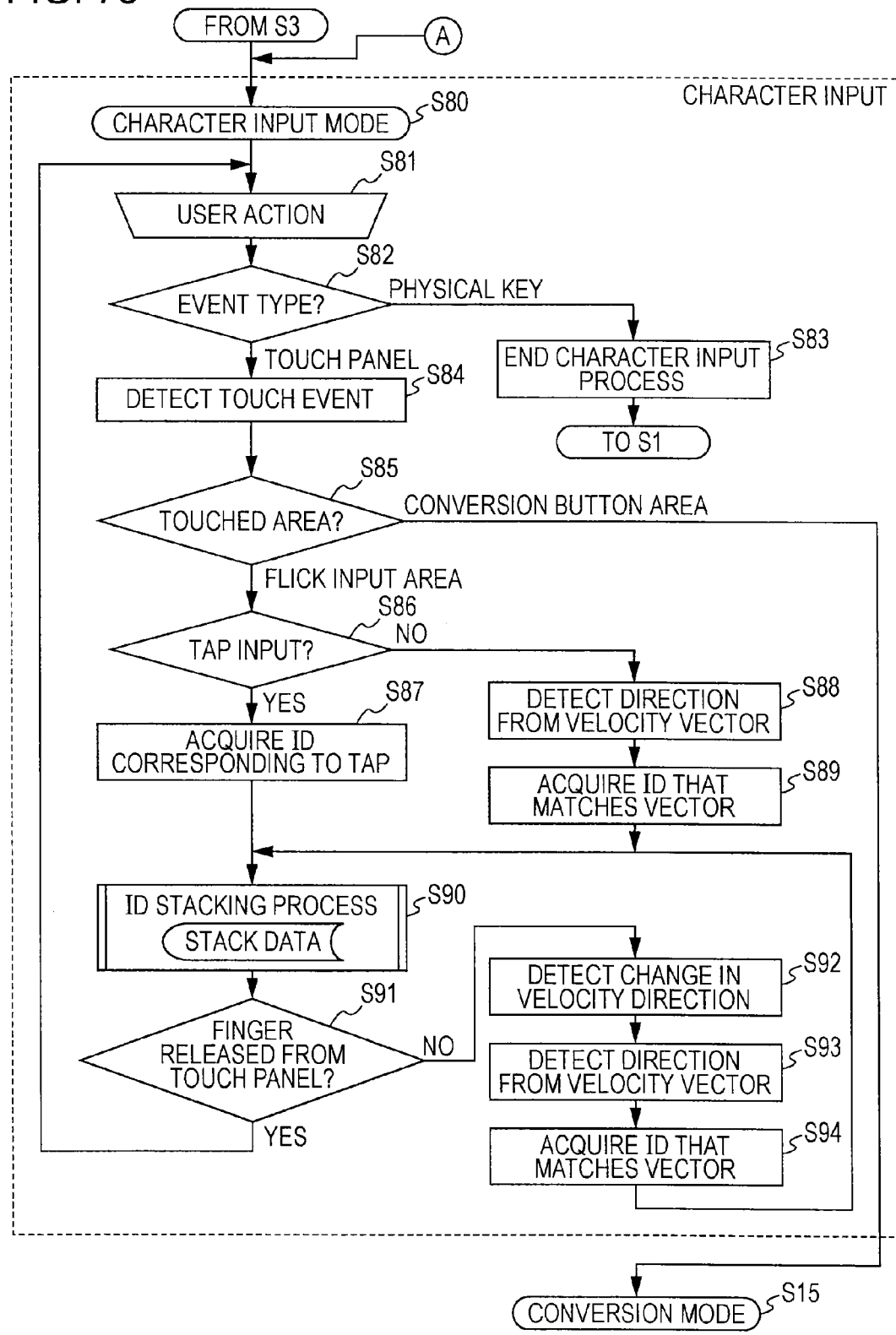
FIG. 78 is a flowchart that illustrates the flow up to an ID addition processing part after proceeding to a character input mode from among the process flows during desired information input by consecutive flick gestures.

FIG. 78 illustrates a flowchart of a process flow when inputting desired information by the consecutive flick gestures discussed earlier.

After processing similar to step S1 to step S3 in FIG. 71 is performed, when the process advances to step S80 in FIG. 78, the control-computation unit 104 transitions to a character input mode whereby character input is made into the text box.

After transitioning to the character input mode, the control-computation unit 104 enters a standby state for a user operation on the touch panel in the full screen takeover mode. The, if some kind of user action is performed as step S81, as the processing in step S82 the control-computation unit 104 determines whether that action is an input event with respect to a touch panel, or an input event on a physical key.

In the case where it is determined that the user action was an input event such as for example a press operation on a physical key, as the processing in step S83 the control-computation unit 104 cancels the full screen takeover mode while also returning from a character input mode to a browser viewing mode, and returns to processing similar to step S1 discussed earlier.

In contrast, in the case where it is determined that the user action was an input event on a touch panel, the control-computation unit 104 advances the process to step S84.

Advancing to the processing in step S84, in the case where a touch event wherein the user's finger, etc. contacts the touch panel is detected as the determined input event, as the processing in step S85 the control-computation unit 104 determines which area on the touch panel is the area touched by the touch event.

Then, the control-computation unit 104 advances the process to a step S15 similar to FIG. 72 discussed later in the case where it is determined that the touched area is for example the convert/symbol instruction area 14 from among the function areas 12 to 15.

In contrast, the control-computation unit 104 advances the process to step S86 in the case where it is determined that the touched area is an area enabling information input of characters, etc. by the flick gestures, etc.

Advancing to the processing in step S86, the control-computation unit 104 determines whether or not the touch event on the touch panel is the tap gesture.

The control-computation unit 104 advances the process to step S88 in the case where it is determined in the determination processing of the above step S86 that the touch event is not a tap gesture, or in other words is a flick gesture, for example.

Advancing to the processing in step S88, the control-computation unit 104 computes a velocity vector for the flick gesture, and also detects a flick direction from that velocity vector.

Next, as the processing in step S89, the control-computation unit 104 references the ID discussed earlier that matches the direction of the flick from a correspondence table discussed earlier, and advances the process to step S90. Herein, in the case where the flick gesture is a first flick gesture, the ID becomes an input ID and a group ID corresponding to that input ID.

Also, the control-computation unit 104 advances the process to step S87 in the case where it is determined in step S86 that the touch event is a tap gesture.

Advancing to the processing in step S87, the ID corresponding to that tap gesture is referenced from a correspondence table discussed earlier, and the process is advanced to step S90. Herein, the ID corresponding to a tap gesture in this case becomes the input ID and the group ID corresponding to that input ID.

Advancing to the processing in step S90, the control-computation unit 104 retains the ID as stack data, and then advances the process to step S91. Herein, the processing in step S90 is similar to step S14 discussed earlier.

Advancing to the processing in step S91, the control-computation unit 104 determines whether or not the user's finger was released from a touch panel. The control-computation unit 104 returns the process to step S81 in the case where it is determined that the finger was released, and advances the process to step S92 in the case where it is determined that the finger was not released.

Advancing to the processing in step S92, if the control-computation unit 104 detects a change in the velocity direction given by a flick gesture performed in a state where a finger is not released from the touch panel, the control-computation unit 104 advances the process to step S93.

Advancing to the processing in step S93, the control-computation unit 104 computes a velocity vector after the velocity direction changed, and also detects a flick direction from that velocity vector.

Then, as the processing in step S94, the control-computation unit 104 references an ID discussed earlier that matches the direction of the flick from a correspondence table discussed earlier, and then advances the process to step S90.

CONCLUSION

A mobile information device in accordance with an embodiment of the present disclosure as described above includes an input operation unit that includes a detection surface able to detect operation input by a user, an information assignment control unit that assigns respective given information to a plurality of directions on the detection surface approximately centered on a user-desired operation input position on the detection surface, and an information input control unit that inputs given information assigned to an approximately matching direction as information selected by the user when an operation input direction given by the user on the detection screen of the input operation unit approximately matches one of the plurality of directions assigned with the given information by the information assignment control unit.

Herein, in a mobile information device of the present embodiment, the detection surface of the input operation unit may for example consist of a transparent panel able to detect operation input by the user, and be provided approximately parallel to a display surface of a display unit provided with a display surface approximately the same as the detection surface.

Also, in a mobile information device of the present embodiment, the information assignment control unit may for example also assign given information to a user-desired operation input position on the detection surface. Then, in this case, the information input control unit inputs information assigned to the operation input position as information selected by the user when operation input given by the user on the detection surface of the input operation unit is a prescribed operation with respect to the user-desired operation input position.

Also, in a mobile information device of the present embodiment, the given information may for example be information tiered in a plurality of character groups consisting of a plurality of character information, and respective character information belonging to each of those character groups. Then, in this case, the information assignment control unit assigns respective character groups to the respective directions according to operation input at a user-desired position on the detection screen, and when an operation input direction given by the user approximately matches one of the plurality of directions assigned with the character groups by the information assignment control unit, the information input control unit takes the character group assigned to the approximately matching direction as a character group selected by the user. Subsequently, after selection of the character group has been made, the information assignment control unit assigns respective character information belonging to the selected character group to the respective directions according to operation input at a user-desired position on the detection screen, and when an operation input direction given by the user approximately matches one of the plurality of directions assigned with the character information by the information assignment control unit, the information input control unit takes the character information assigned to the approximately matching direction as character information selected by the user.

Also, in a mobile information device of the present embodiment, the given information may for example be information tiered in a plurality of consonant information and a plurality of vowel information. Then, in this case, the information assignment control unit assigns respective consonant information to the respective directions according to operation input at a user-desired position on the detection screen, and when an operation input direction given by the user approximately matches one of the plurality of directions assigned with the consonant information by the information assignment control unit, the information input control unit takes the consonant information assigned to the approximately matching direction as consonant information selected by the user. Subsequently, after selection of the consonant information has been made, the information assignment control unit assigns the selected consonant information to the respective directions according to operation input at a user-desired position on the detection screen, and when an operation input direction given by the user approximately matches one of the plurality of directions assigned with the vowel information by the information assignment control unit, the information input control unit takes the vowel information assigned to the approximately matching direction as vowel information selected by the user, and takes character information consisting of a combination of the consonant information and vowel information as input information.

Also, in a mobile information device of the present embodiment, the given information may for example consist of a plurality of numeral information. Then, in this case, according to operation input at a user-desired position on the detection screen, the information assignment control unit assigns respective numeral information to the user-desired operation input position and the respective directions. Furthermore, when an operation input given by the user on the detection screen of the input operation unit is a prescribed operation with respect to the user-desired operation input position, the information input control unit takes information assigned to the operation input position as numeral information selected by the user, and when an operation input given by the user on the detection screen of the input operation unit is an operation input direction that approximately matches one of the plurality of directions, the information input control unit takes the numeral information assigned to the approximately matching direction as numeral information selected by the user.

Also, in a mobile information device of the present embodiment, the given information may for example be information tiered in a plurality of menu groups consisting of a plurality of menu information corresponding to respective given functions, and respective menu information belonging to each of those menu groups. Then, in this case, the information assignment control unit assigns respective menu groups to the respective directions according to operation input at a user-desired position on the detection screen, and when an operation input direction given by the user approximately matches one of the plurality of directions assigned with the menu groups by the information assignment control unit, the information input control unit takes the menu group assigned to the approximately matching direction as a menu group selected by the user. Subsequently, after selection of the menu group has been made, the information assignment control unit assigns respective menu information belonging to the selected menu group to the respective directions according to operation input at a user-desired position on the detection screen, and when an operation input direction given by the user approximately matches one of the plurality of directions assigned with the menu information by the information assignment control unit, the information input control unit takes the menu information assigned to the approximately matching direction as menu information selected by the user.

Also, in a mobile information device of the present embodiment, the given information may for example be storage-related information related to stored information inside a given information storage unit. Then, in this case, the information assignment control unit assigns respective storage-related information to the respective directions according to operation input at a user-desired position on the detection screen. Furthermore, when an operation input direction given by the user approximately matches one of the plurality of directions assigned with the storage-related information by the information assignment control unit, the information input control unit takes the storage-related information assigned to the approximately matching direction as storage-related information selected by the user, and extracts the stored information from the given information storage unit on the basis of that storage-related information.

Also, the given information storage unit may for example be a phone book information storage unit that takes registered information in a phone book as the stored information.

Then, in this case, the storage-related information is information for specifying the registered information in a phone book.

Also, in an information input method of an embodiment of the present disclosure, when operation input is made with respect to a user-desired position on a detection surface with respect to an input operation unit that includes a detection surface able to detect operation input by a user, an information assignment control unit assigns respective given information to a plurality of directions on the detection surface approximately centered on the user-desired operation input position, and when an operation input direction given by the user on the detection screen of the input operation unit approximately matches one of the plurality of directions assigned with given information by the information assignment control unit, an information input control unit inputs given information assigned to the approximately matching direction as information selected by the user.

Also, an information input control program of an embodiment of the present disclosure causes a computer installed in a mobile information device to function as an information assignment control unit that assigns respective given information to a plurality of directions on a detection surface approximately centered on a user-desired operation input position when operation input is made with respect to a user-desired position on a detection surface with respect to an input operation unit that includes a detection surface able to detect operation input by a user, and an information input control unit that inputs given information assigned to an approximately matching direction as information selected by the user when an operation input direction given by the user on the detection screen of the input operation unit approximately matches one of the plurality of directions assigned with the given information by the information assignment control unit.

Also, a storage medium of an embodiment of the present disclosure is realized by storing an information input control program that causes a computer installed in a mobile information device to function as an information assignment control unit that assigns respective given information to a plurality of directions on a detection surface approximately centered on a user-desired operation input position when operation input is made with respect to a user-desired position on a detection surface with respect to an input operation unit that includes a detection surface able to detect operation input by a user, and an information input control unit that inputs given information assigned to an approximately matching direction as information selected by the user when an operation input direction given by the user on the detection screen of the input operation unit approximately matches one of the plurality of directions assigned with the given information by the information assignment control unit.

Additionally, in the present embodiment, input of characters, menu selection, information search, etc. is possible just with at least one tap gesture and flick gesture. Also, in the present embodiment, association between for example flick gesture directions and what is called a keypad layout is made to be possible, enabling desired information input by flick directions from the center key (for example, the "5" key on a keypad).

In other words, according to the present embodiment, the user becomes able to input the desired place of characters, etc. by touching an arbitrary place on a touch panel (display screen) that has entered a full screen takeover mode, without doing work such as touching a virtual key displayed on a display screen after visually confirming that virtual key.

Consequently, the user is able to input at an arbitrary place without needing to confirm the place to be touched, even if the user is someone for whom input in small places is difficult, such as a user who often inputs with the pad of his or her finger because his or her fingernails are long, for example.

Also, according to the present embodiment, in the case where flick directions and a keypad layout are approximately associated, the user is able to conduct input without looking at the screen by memorizing the keypad layout.

Also, according to the present embodiment, there is extremely little guide information displayed on screen during input. For this reason, the display screen is not occupied by guide information, and the user is able to perform input comfortably.

Also, according to the present embodiment, the device that detects the user's gesture operations is not limited to being a touch panel (touch screen), and may be any device such as what is called a touch pad, for example, as long as it is a device capable of detecting flick gestures.

Also, in the case of the present embodiment, since operations other than input of characters, etc. are made to be prevented by a full screen takeover mode, it is possible to prevent accidental operations whereby another function such as jumping to a link destination, for example, is accidentally executed.

Furthermore, in the present embodiment, in the case where information input is performed by the consecutive flick gestures discussed earlier, the user becomes able to input desired information without releasing his or her finger from a touch panel.

As discussed above, according to the present embodiment, in an information device provided with a touch panel, etc. on a display panel, for example, the work of visual confirmation by the user can be decreased and also the burden of timing matching during input is mostly made unnecessary in the case of inputting characters, etc. using the touch panel. An information input apparatus enabling a significant reduction in user burden is provided.

Meanwhile, a mobile information device of the present embodiment is also applicable to a smartphone, or for example a PDA (Personal Digital Assistant) or compact notebook type personal computer, a portable game console, a tablet device portable navigation device, etc.

Also, the description of the embodiment discussed above is one example of the present disclosure. For this reason, the present disclosure is not limited to embodiment discussed above, and it is obvious that various modifications depending on the design, etc. are possible if within a scope that does not depart from the technical ideas in accordance with the present disclosure.

Furthermore, it is to be understood by those skilled in the art that various modifications, combinations, and other embodiments may occur depending on the design and other factors insofar as they are within the scope of the claims of the present disclosure or equivalents thereof.

What is claimed is:

1. An information input apparatus comprising:
   a display; and
   circuitry configured to
   detect a first input operation;
   assign information to each of a plurality of directions from a position on the display, the information assigned to at least one of the plurality of directions including information specifying a reproduction of at least one of audio and video content;

detect a second input operation corresponding to one of the plurality of directions;

control the display to display, in response to the second input operation, a plurality of menu items further specifying said reproduction of said at least one of the audio and video content, the plurality of menu items being displayed at a location on the display selectable by a user through a selection operation performed on the display independently of the first input operation and the second input operation;

detect a third input operation corresponding to one of the plurality of menu items; and reproduce the at least one of the audio and video content in accordance with the one of the plurality of menu items.

2. The information input apparatus of claim 1, wherein the display includes a transparent panel configured to detect a touch input.

3. The information input apparatus of claim 1, wherein the display includes a display surface configured to be controlled by the circuitry.

4. The information input apparatus of claim 1, wherein the circuitry is configured to control the display to display the information assigned to each of the plurality of directions when the circuitry detects the first input operation.

5. The information input apparatus of claim 1, wherein the circuitry is configured to operate in another mode in which the information assigned to each of the plurality of directions includes a character group identifying a plurality of characters.

6. The information input apparatus of claim 5, wherein the circuitry is configured to select a character group assigned to the one of the plurality of directions corresponding to the second input operation.

7. The information input apparatus of claim 6, wherein the circuitry is configured to assign each of the characters included in the selected character group to one of the plurality of directions.

8. The information input apparatus of claim 7, wherein the circuitry is configured to control the display to display each of the characters identified by the selected character group assigned to each of the plurality of directions.

9. The information input apparatus of claim 7, wherein the circuitry is configured to detect a character input operation corresponding to one of the plurality of directions.

10. The information input apparatus of claim 9, wherein the circuitry is configured to select the character assigned to the one of the plurality of directions corresponding to the character input operation as an input.

11. The information input apparatus of claim 1, wherein the information assigned to each of the plurality of directions includes menu items configured to control said reproduction of said at least one of audio and video content.

12. The information input apparatus of claim 1, wherein the circuitry is configured to control the user interface to display the menu items assigned to each of the plurality of directions when the circuitry detects the first input operation.

13. The information input apparatus of claim 12, wherein the circuitry is configured to select a menu function or a menu group corresponding to the second input operation as an input.

14. The information input apparatus of claim 13, wherein when the selected direction corresponds to the menu group, the circuitry is configured to assign each of the plurality of menu items identified by the menu group to one of the plurality of directions.

15. The information input apparatus of claim 14, wherein the circuitry is configured to control the display to display each of the menu items identified by the selected menu group assigned to each of the plurality of directions.

16. The information input apparatus of claim 14, wherein the display is configured to detect the third input operation corresponding to one of the plurality of directions.

17. The information input apparatus of claim 16, wherein the circuitry is configured to select the menu item assigned to the one of the plurality of directions corresponding to the third input operation as the one of the plurality of menu items.

18. A method of controlling a user interface of an information input apparatus having circuitry and a display, the method comprising:

detecting, by the circuitry of the information input apparatus, a first input operation by a user;

assigning, by the circuitry of the information input apparatus, information to each of a plurality of directions, the information assigned to at least one of the plurality of directions including information specifying a reproduction of at least one of audio and video content;

detecting, by the circuitry, a second input operation corresponding to one of the plurality of directions;

controlling the display, by the circuitry, to display, in response to the second input operation, a plurality of menu items further specifying said reproduction of said at least one of the audio and video content, the plurality of menu items being displayed at a location on the display selectable by the user through a selection operation performed on the display independently of the first input operation and the second input operation;

detecting, by the circuitry, a third input operation corresponding to one of the plurality of menu items; and reproducing, by the circuitry, the at least one of the audio and video content in accordance with the one of the plurality of menu items.

19. A non-transitory computer-readable medium including computer program instructions, which when executed by an information input apparatus having a display, cause the information input apparatus to perform a method, the method comprising:

detecting a first input operation by a user;

assigning information to each of a plurality of directions, the information assigned to at least one of the plurality of directions including information specifying a reproduction of at least one of audio and video content;

detecting a second input operation corresponding to one of the plurality of directions; controlling the display to display, in response to the second input operation, a plurality of menu items further specifying said reproduction of said at least one of the audio and video content, the plurality of menu items being displayed at a location on the display selectable by the user through a selection operation performed on the display independently of the first input operation and the second input operation;

detecting a third input operation corresponding to one of the plurality of menu items; and reproducing the at least one of the audio and video content in accordance with the one of the plurality of menu items.

* * * * *